US009204111B2

(12) United States Patent
Smart et al.

(10) Patent No.: US 9,204,111 B2
(45) Date of Patent: Dec. 1, 2015

(54) MODULAR IMAGING SYSTEM WITH WIRELESS TRANSMISSION AND LOCKING CONNECTOR

(75) Inventors: Kenneth Thomas Smart, Toronto (CA); Johan Daniel Krommenhoek, Scarborough (CA)

(73) Assignee: Eomax Corporation, Toronto, Ontario (CA)

(*) Notice: Subject to any disclaimer, the term of this patent is extended or adjusted under 35 U.S.C. 154(b) by 1598 days.

(21) Appl. No.: 12/075,247

(22) Filed: Mar. 10, 2008

(65) Prior Publication Data

US 2011/0221907 A1    Sep. 15, 2011

(51) Int. Cl.

| H04N 7/18 | (2006.01) |
|---|---|
| F16M 11/28 | (2006.01) |
| F16M 11/10 | (2006.01) |
| F16M 11/18 | (2006.01) |
| F16M 11/24 | (2006.01) |
| F16M 11/20 | (2006.01) |
| H04N 21/4223 | (2011.01) |
| H04N 21/4363 | (2011.01) |

(52) U.S. Cl.
CPC ............... *H04N 7/185* (2013.01); *F16M 11/10* (2013.01); *F16M 11/18* (2013.01); *F16M 11/2021* (2013.01); *F16M 11/245* (2013.01); *F16M 11/28* (2013.01); *H04N 21/4223* (2013.01); *H04N 21/4363* (2013.01)

(58) Field of Classification Search
CPC ............ H04N 17/185; H04N 21/4223; H04N 21/4363; F16M 11/245; F16M 11/10; F16M 11/2021; F16M 11/18; F16M 11/28
USPC ........................................................ 348/158
See application file for complete search history.

(56) References Cited

U.S. PATENT DOCUMENTS

| 5,318,257 A * | 6/1994 | Tani ............................ 248/125.1 |
| 5,896,574 A | 4/1999 | Bass |
| 6,101,339 A * | 8/2000 | Miki et al. ..................... 396/301 |
| 6,205,199 B1 | 3/2001 | Polichar |
| 6,456,261 B1 | 9/2002 | Zhang |

(Continued)

OTHER PUBLICATIONS

Nikon D2H Review and WT-1 Wireless Transmitter. Phil Askey. http://www.dpreview.com/reviews/nikond2h. pp. 1-7. Dec. 2003.*

(Continued)

*Primary Examiner* — John MacIlwinen
(74) *Attorney, Agent, or Firm* — Brenda Pomerance

(57) ABSTRACT

A modular imaging system includes a camera module having a camera and an electrical interface for providing a video signal representing an image picked up by the camera, a wireless transmitter module having an electrical interface for receiving the video signal from the camera module and generating a high frequency signal, a wireless receiver module for receiving the high frequency signal from the wireless transmitter module and producing a baseband signal, and a display module for receiving the baseband signal and displaying the baseband signal on a display. A secondary interlock mechanism includes a U-shaped collar having eccentrically shaped holes and a depression for receiving a spring, and a module having alignment pin receptacles for receiving alignment pins having radial channels, and having the U-shaped collar inserted into the module and the spring so that the eccentrically shaped holes engage with the radial channels on the alignment pins to restrain the alignment pins from moving due to the force exerted on the U-shaped collar from the spring.

36 Claims, 67 Drawing Sheets

(56) References Cited

U.S. PATENT DOCUMENTS

| | | | |
|---|---|---|---|
| 7,211,778 | B1 | 5/2007 | Smith |
| 7,333,073 | B2 | 2/2008 | Repetto |
| 7,905,667 | B2 * | 3/2011 | Barker .......................... 396/419 |
| 2003/0112338 | A1 | 6/2003 | Pelletier |
| 2004/0032506 | A1 * | 2/2004 | Silverbrook et al. ..... 348/207.99 |
| 2007/0015485 | A1 | 1/2007 | DeBiasio |
| 2007/0070206 | A1 * | 3/2007 | Clark ....................... 348/207.99 |
| 2007/0206090 | A1 * | 9/2007 | Barraud et al. ............. 348/14.02 |
| 2008/0100712 | A1 * | 5/2008 | Hayes et al. .............. 348/207.99 |
| 2008/0250459 | A1 * | 10/2008 | Roman .......................... 725/62 |
| 2009/0174771 | A1 * | 7/2009 | Royz et al. .................... 348/143 |
| 2010/0295960 | A1 * | 11/2010 | Furlan et al. ............... 348/222.1 |

OTHER PUBLICATIONS

Zistos Portable Video Systems: Systems Catalog, 34 pages.

Eomax Wolf Pack Operator's Manual Version 2.00, sections 1-10 but missing sections 4.1, 4.5, 4.6, 5.1-5.4, 6.2, 6.3, 8.1, 70 pages.

Zistos Portable Video Systems: Systems Catalog, 34 pages, published on or before Jan. 2007.

Eomax Wolf Pack Operator's Manual Version 2.00, sections 1-10 but missing sections 4.1, 4.5, 4.6, 5.1-5.4, 6.2, 6.3, 8.1, 70 pages, published on or before Jan. 2007.

European Search Report dated Jan. 7, 2015 in corresponding EP application No. 09719341.1 (4 pages).

\* cited by examiner

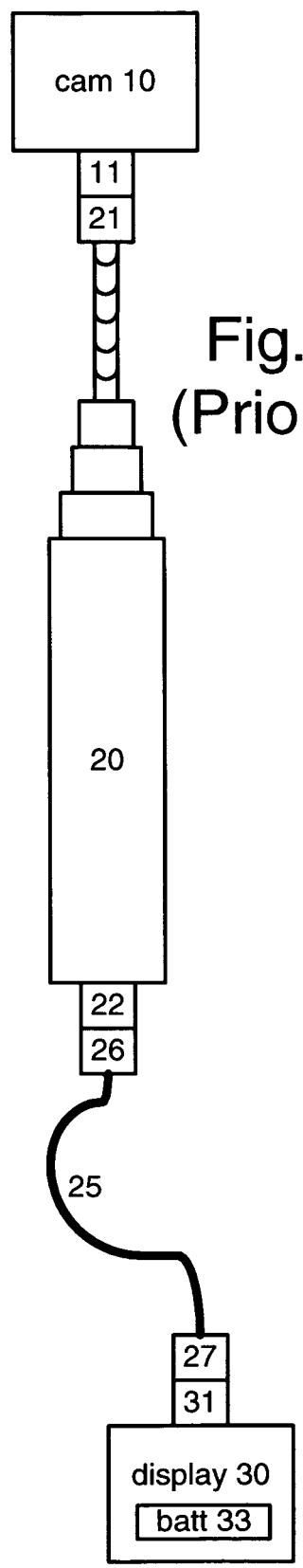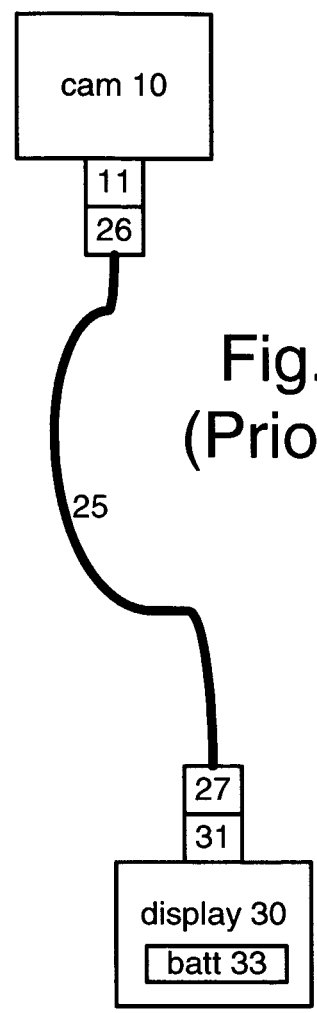
Fig. 2A (Prior Art)
Fig. 2B (Prior Art)

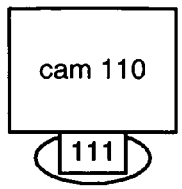
Fig. 3A (Prior Art)
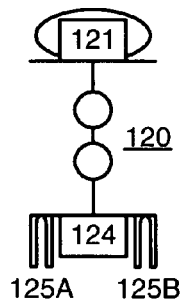
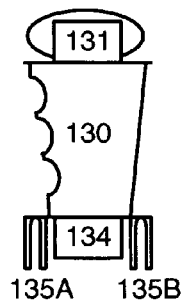
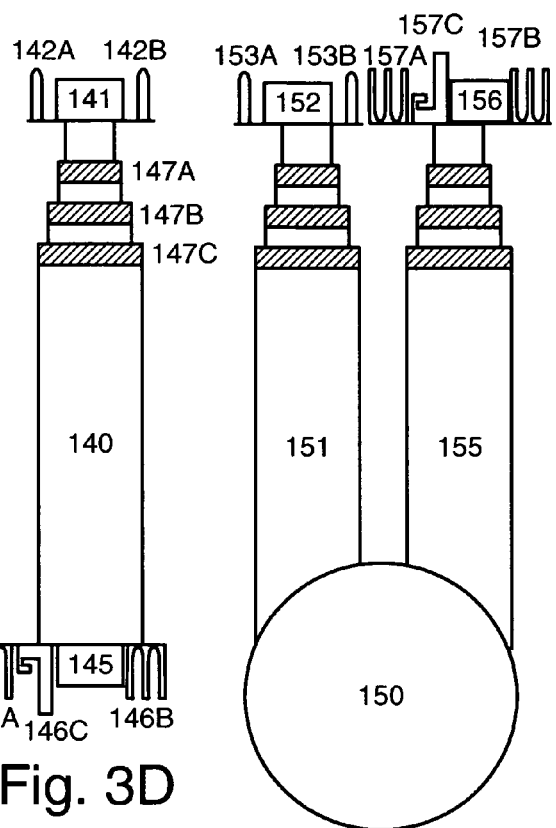
Fig. 3B (Prior Art)
Fig. 3C (Prior Art)
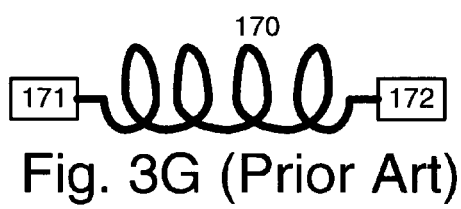
Fig. 3G (Prior Art)
Fig. 3D (Prior Art)
Fig. 3E (Prior Art)
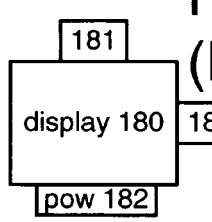
Fig. 3H (Prior Art)
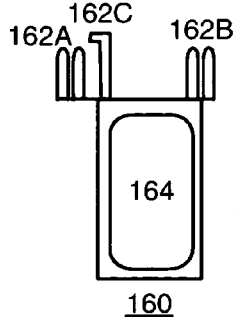
Fig. 3F (Prior Art)
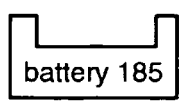
Fig. 3I (Prior Art)

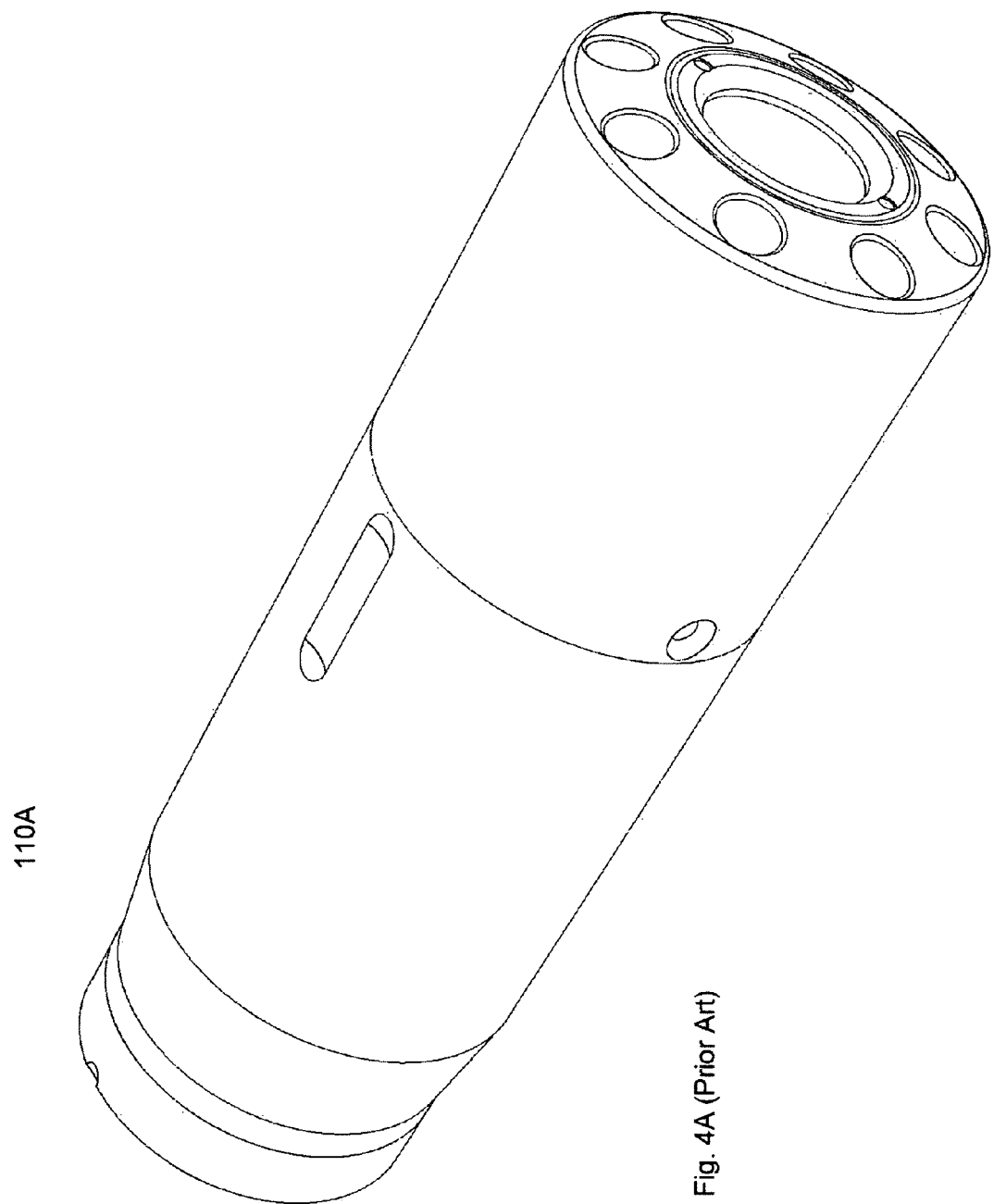

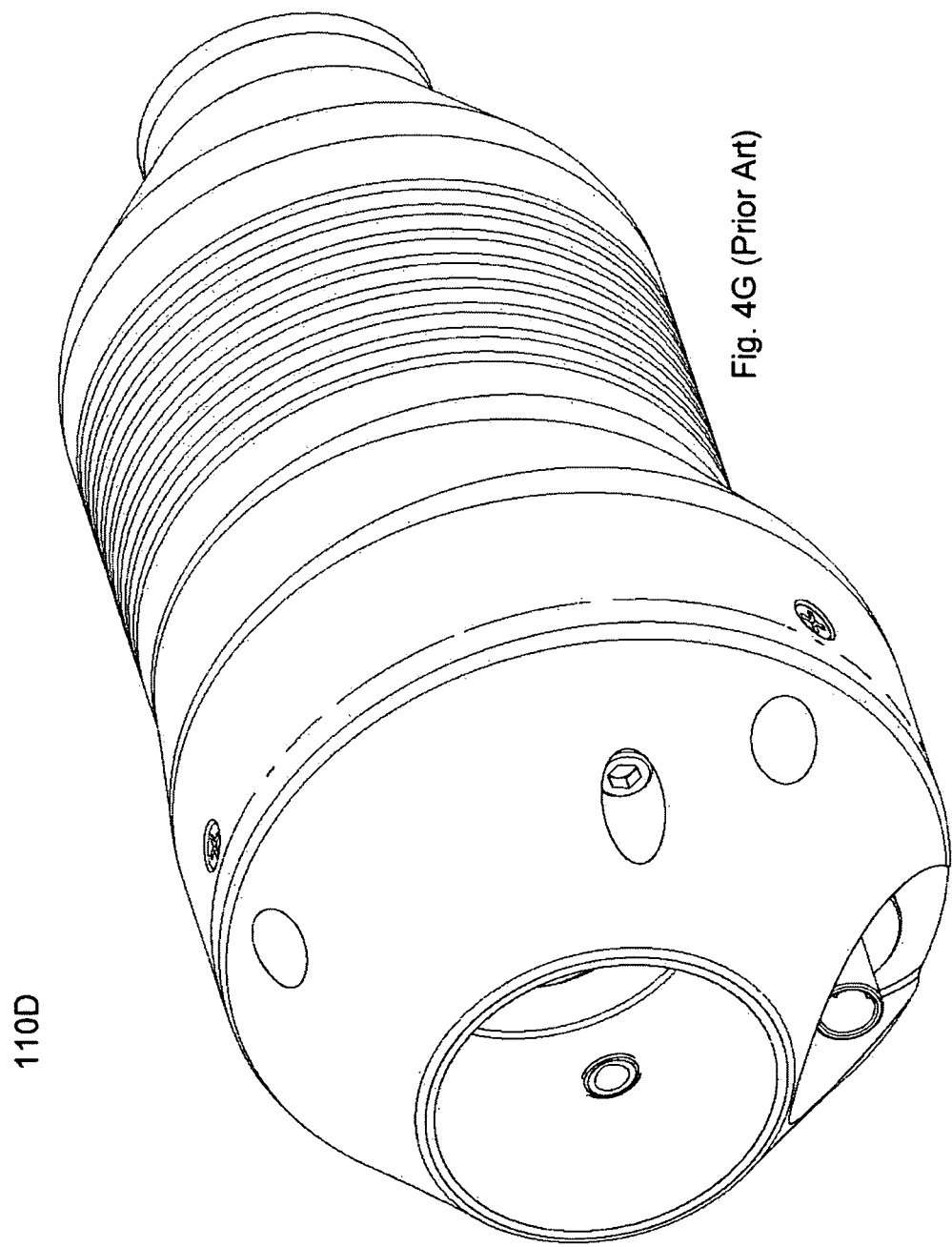

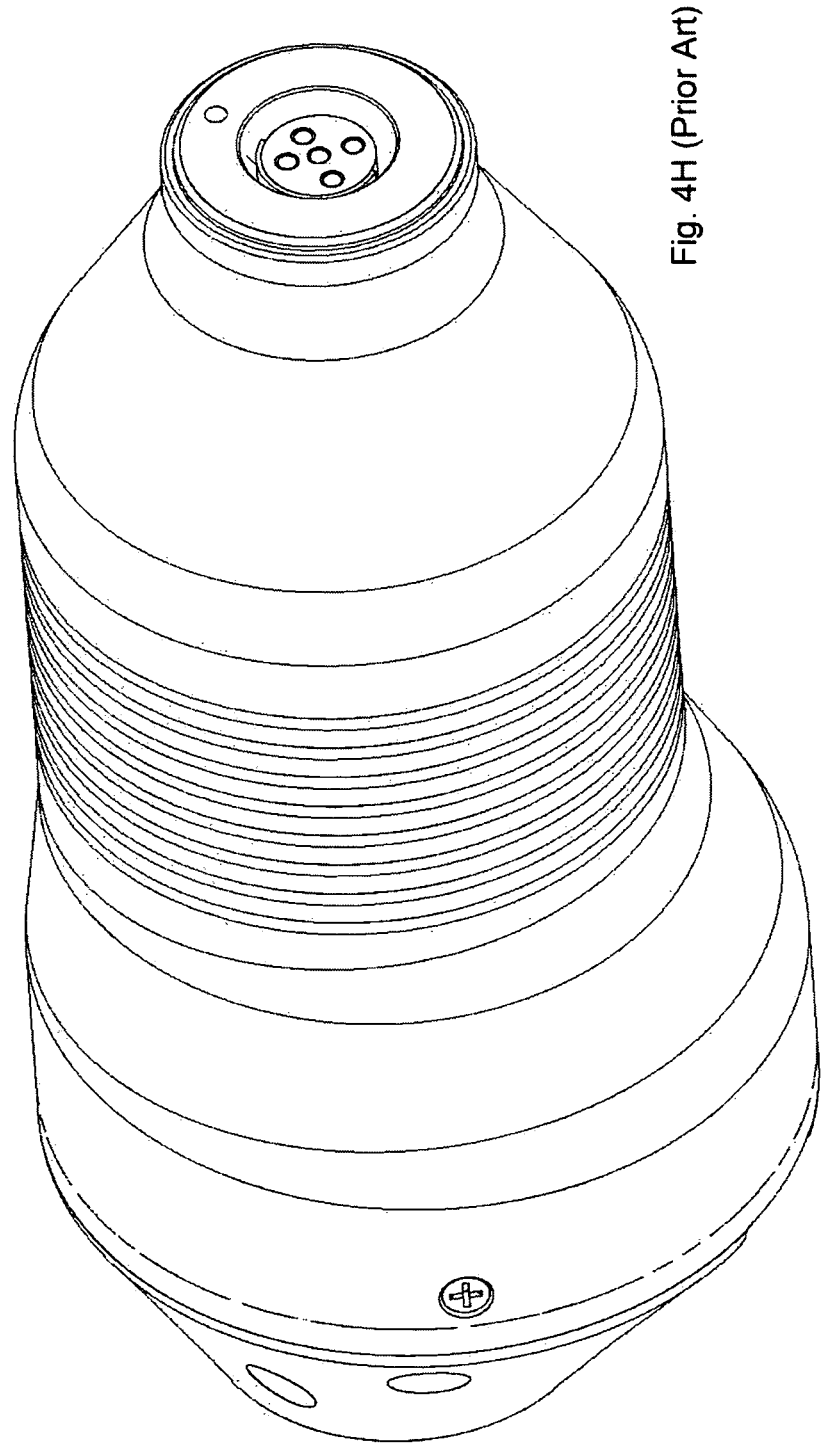

130

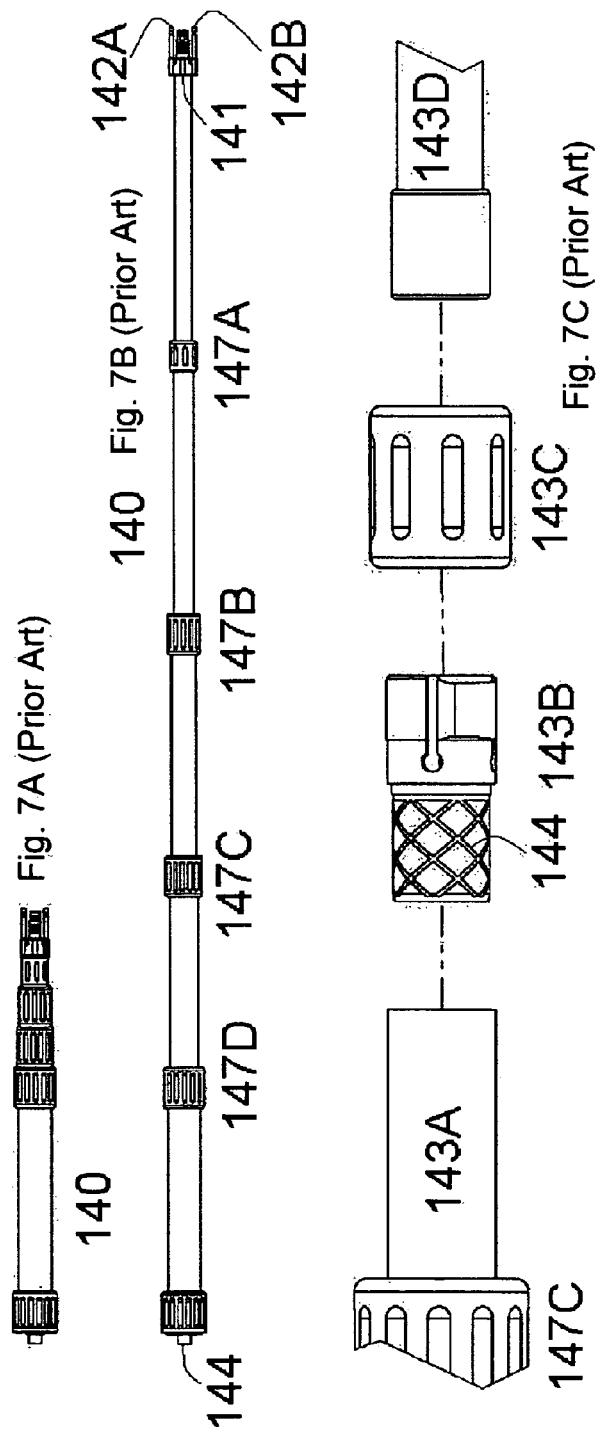

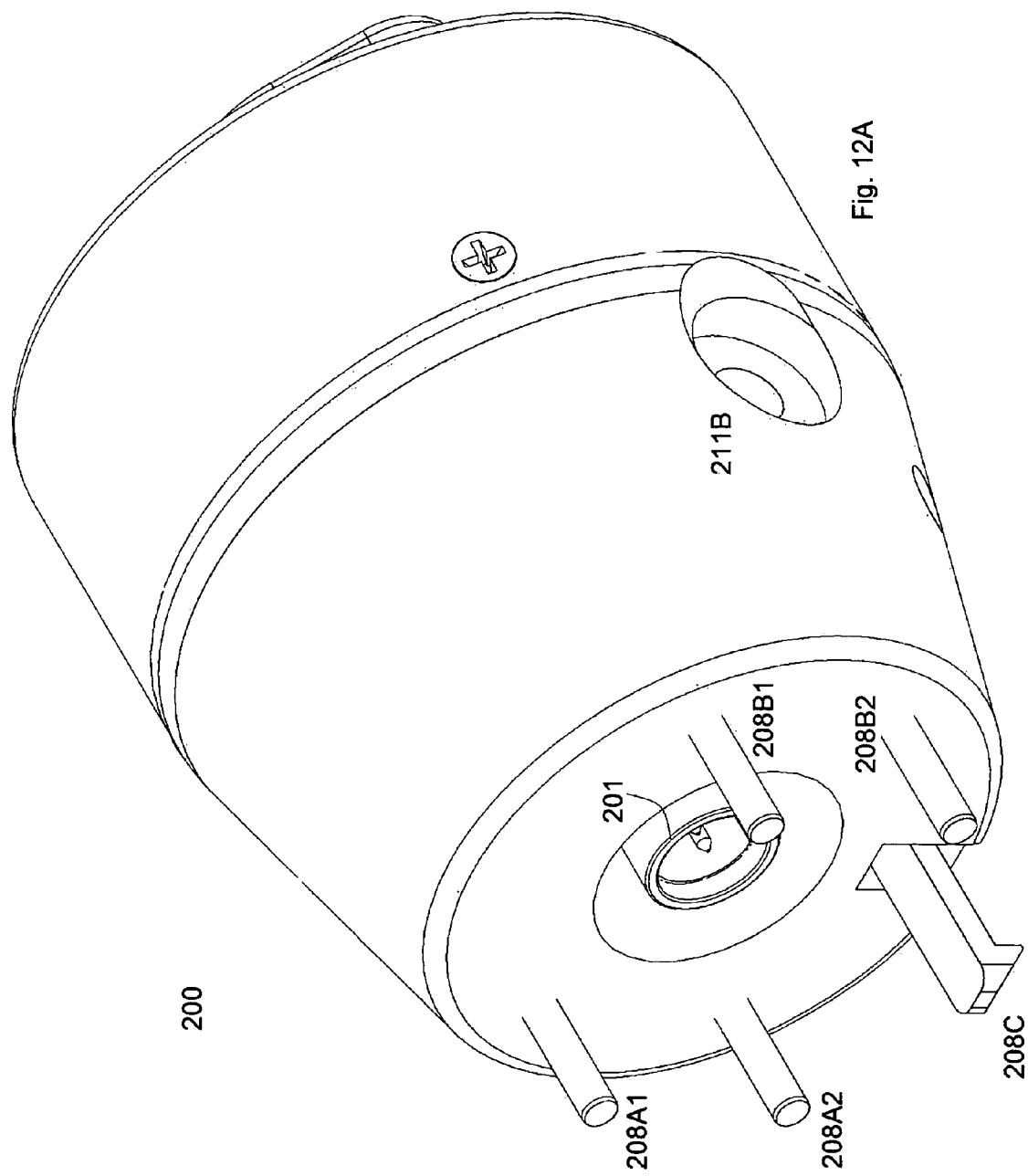

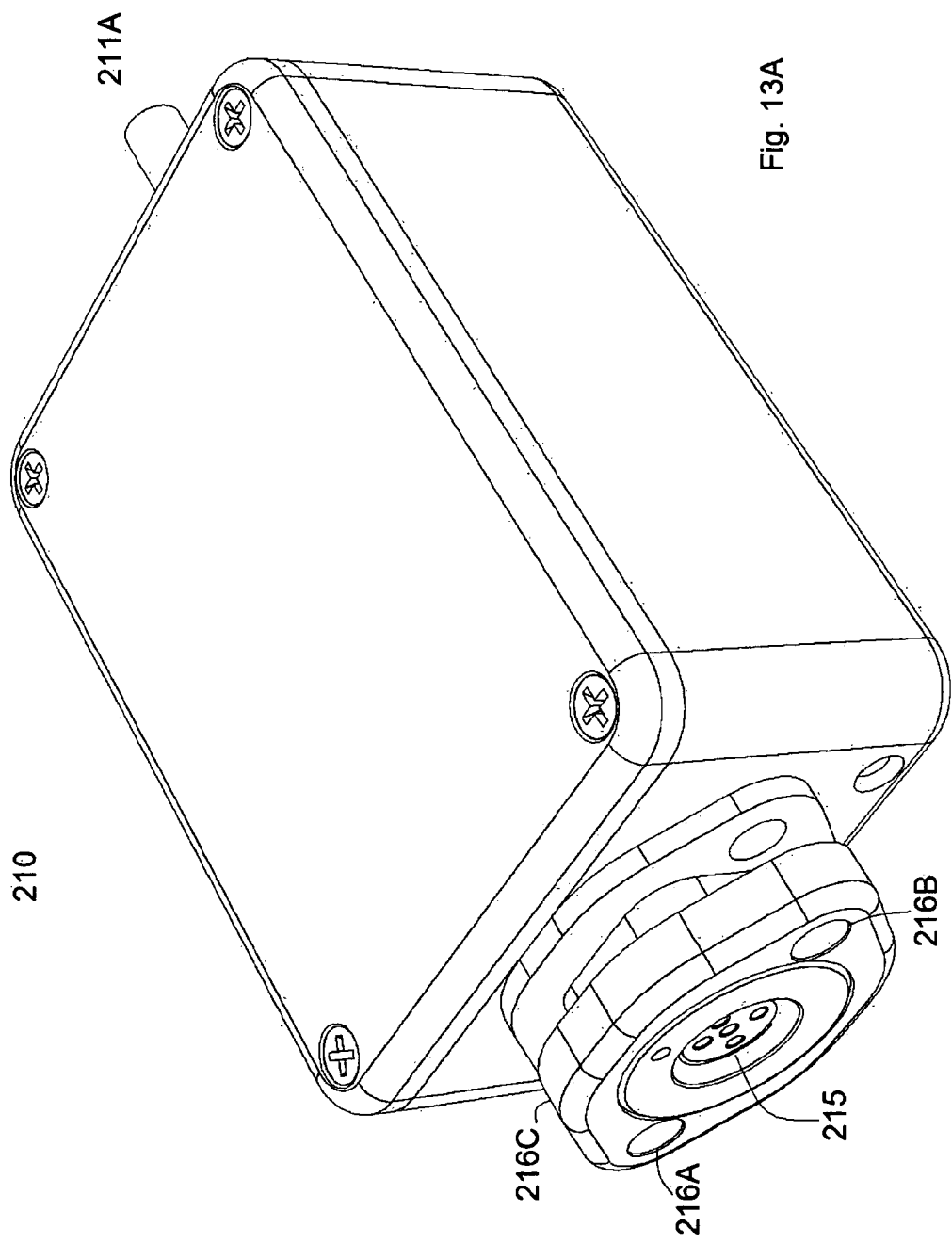

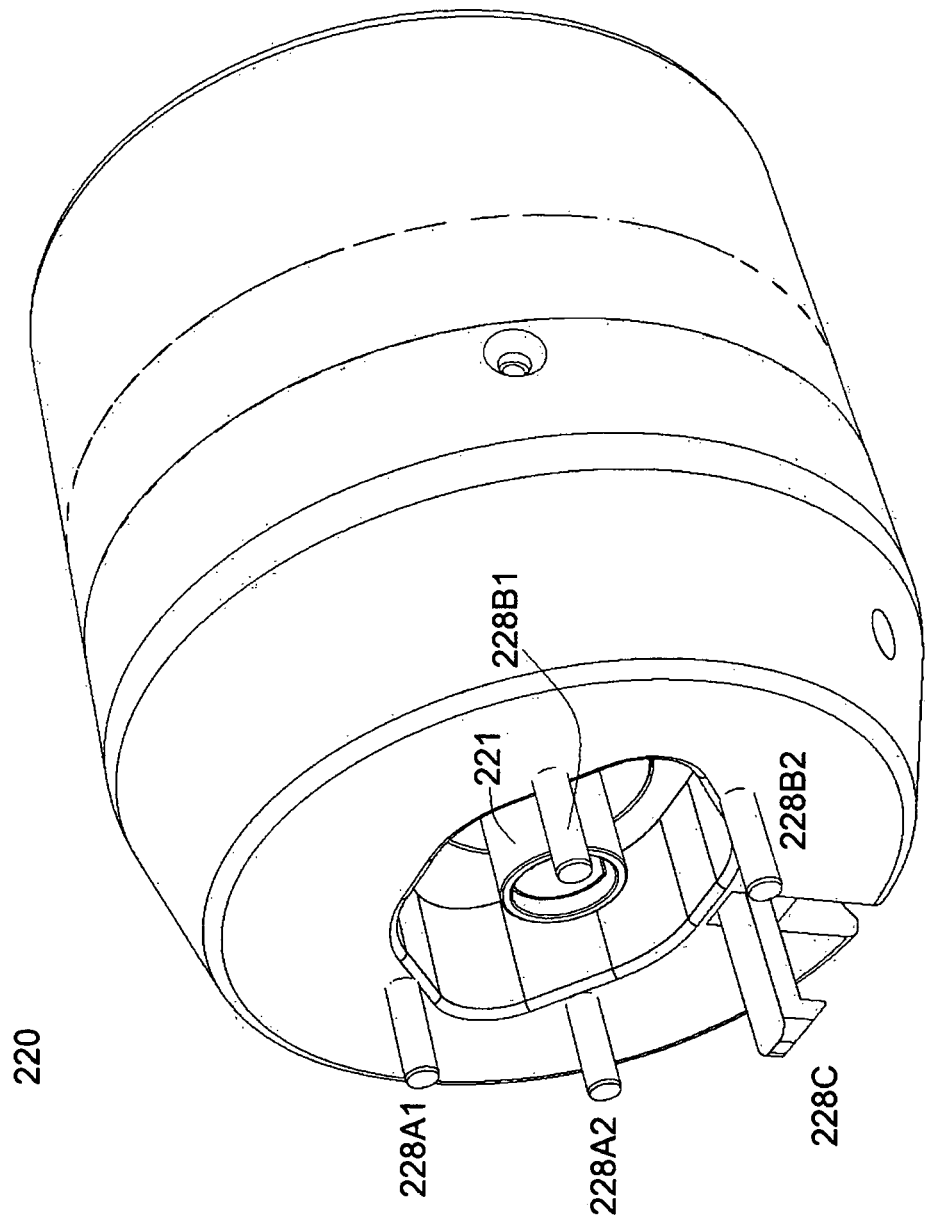

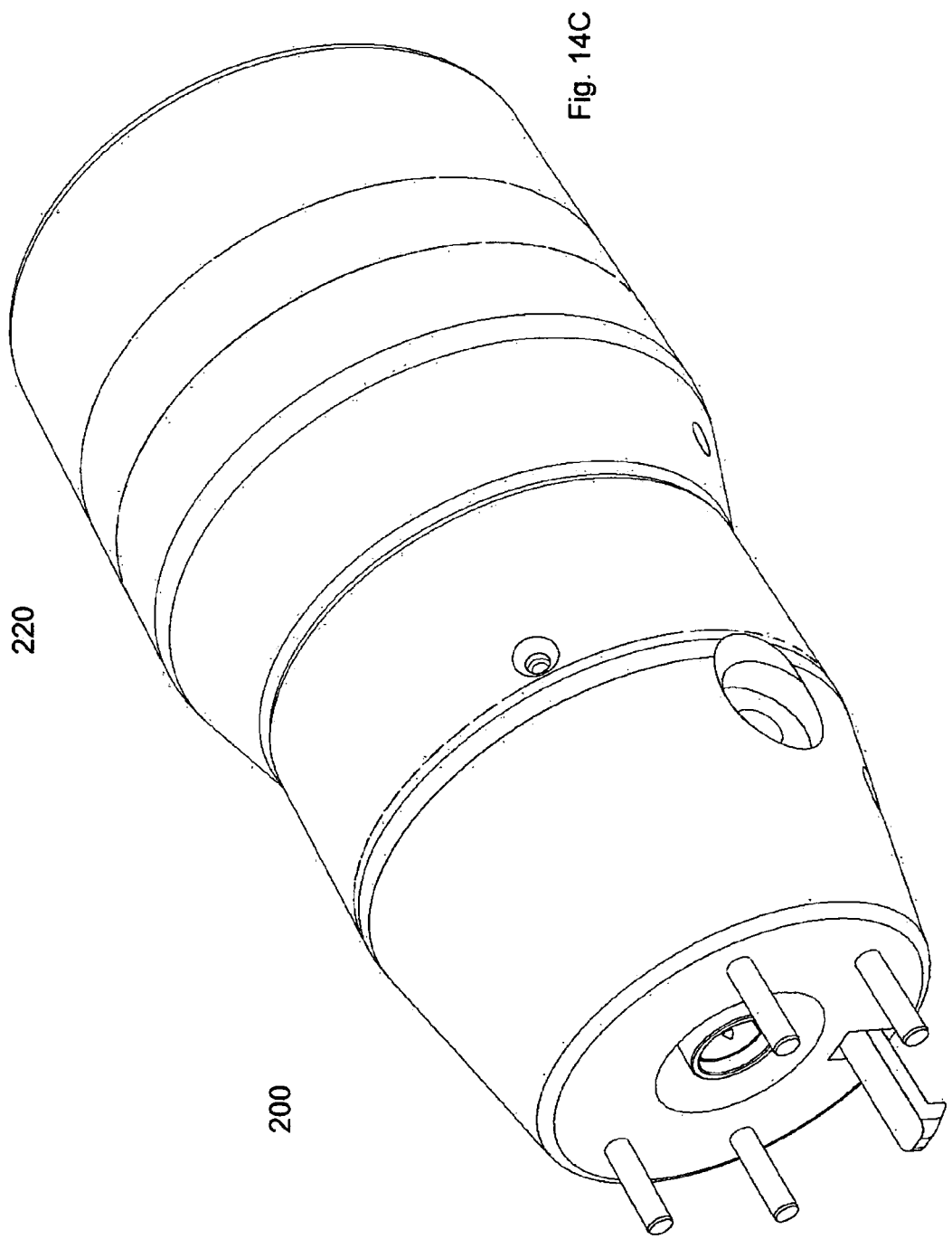

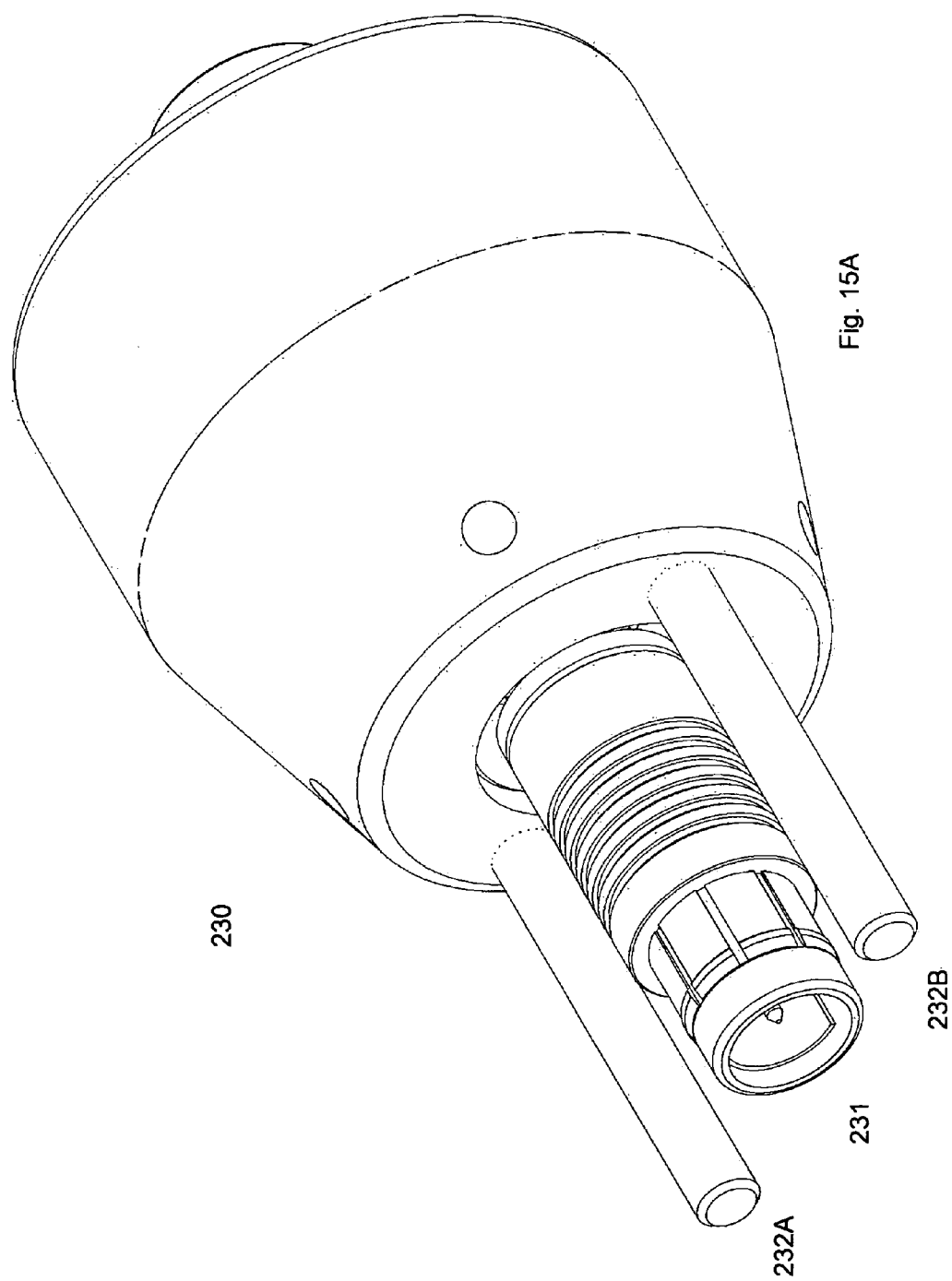

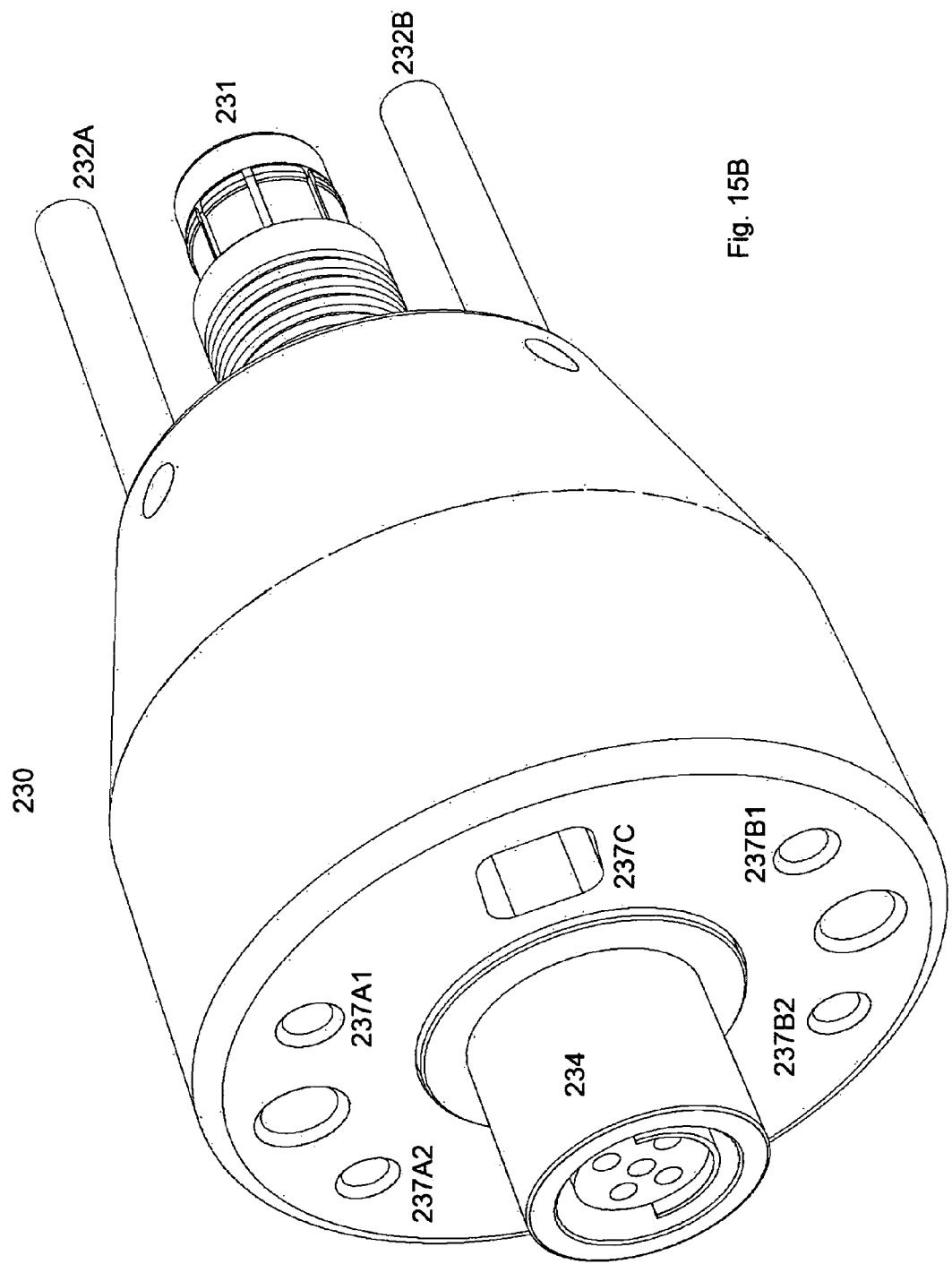

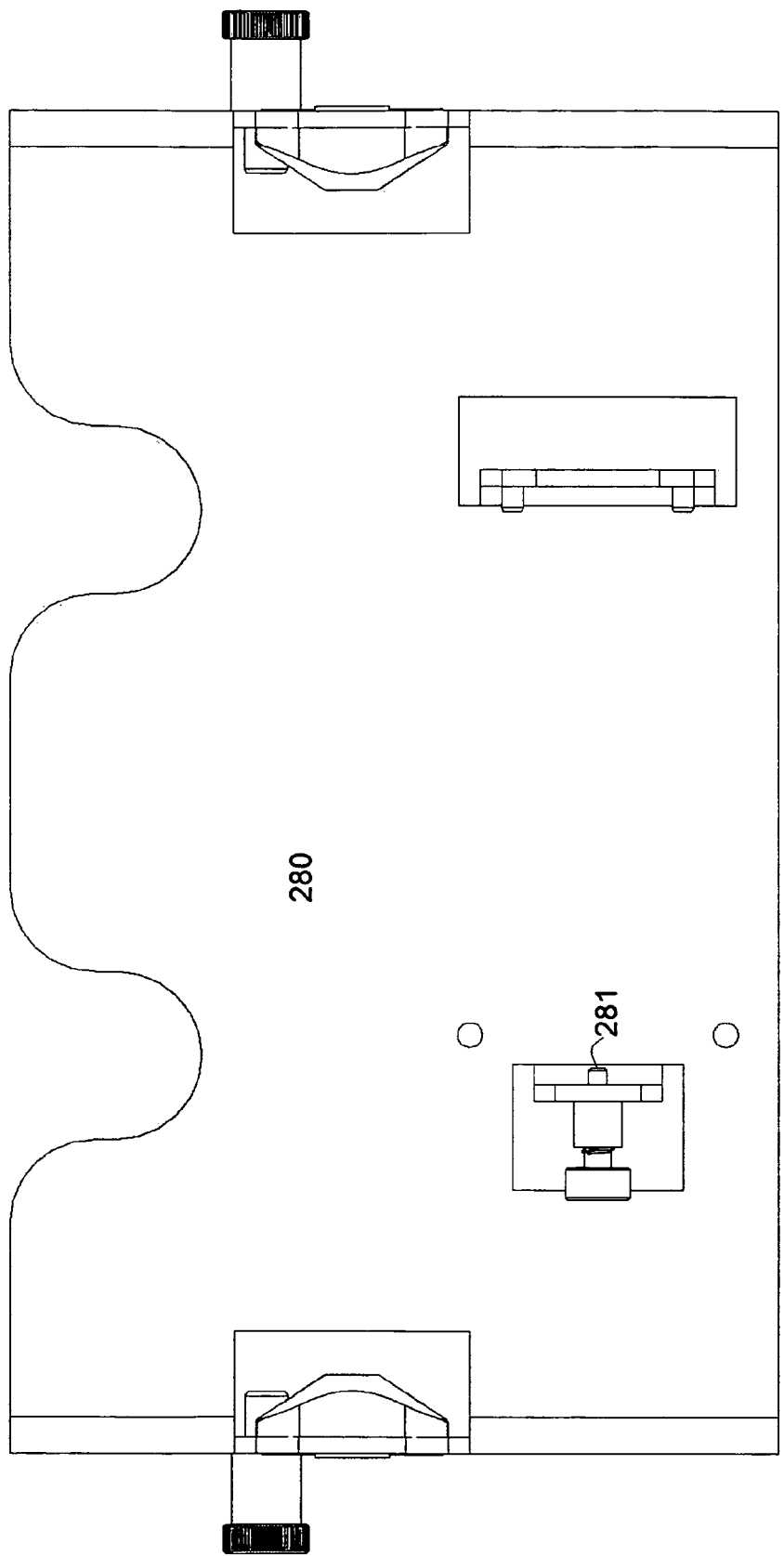

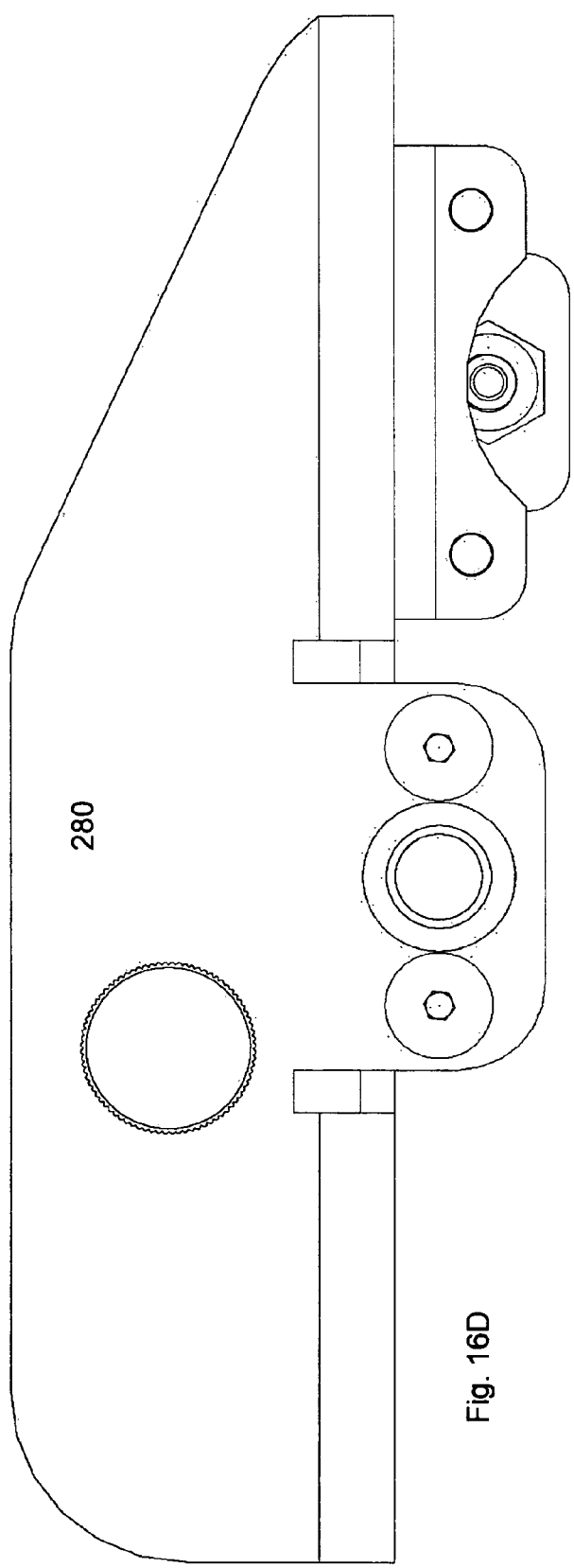

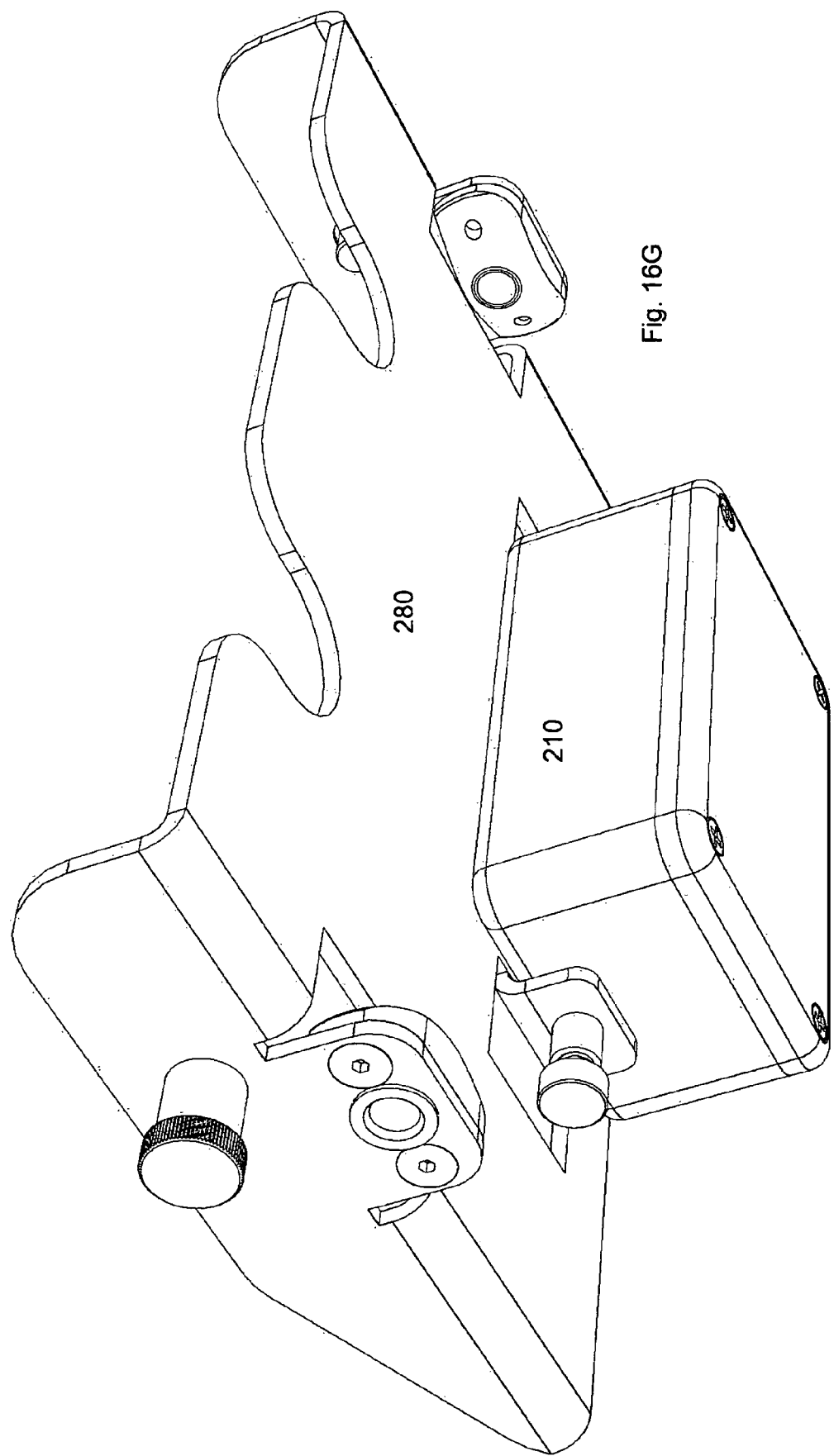

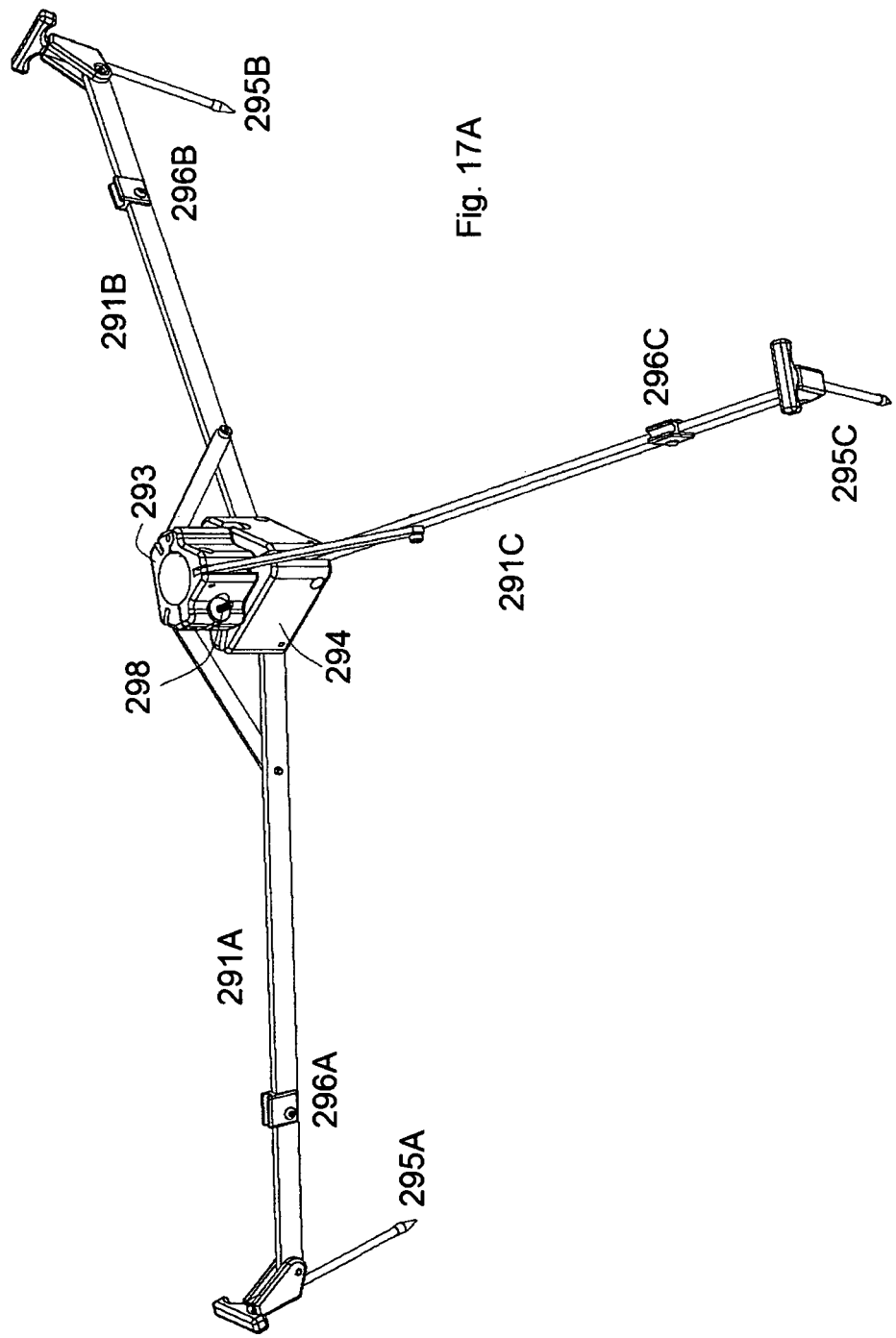

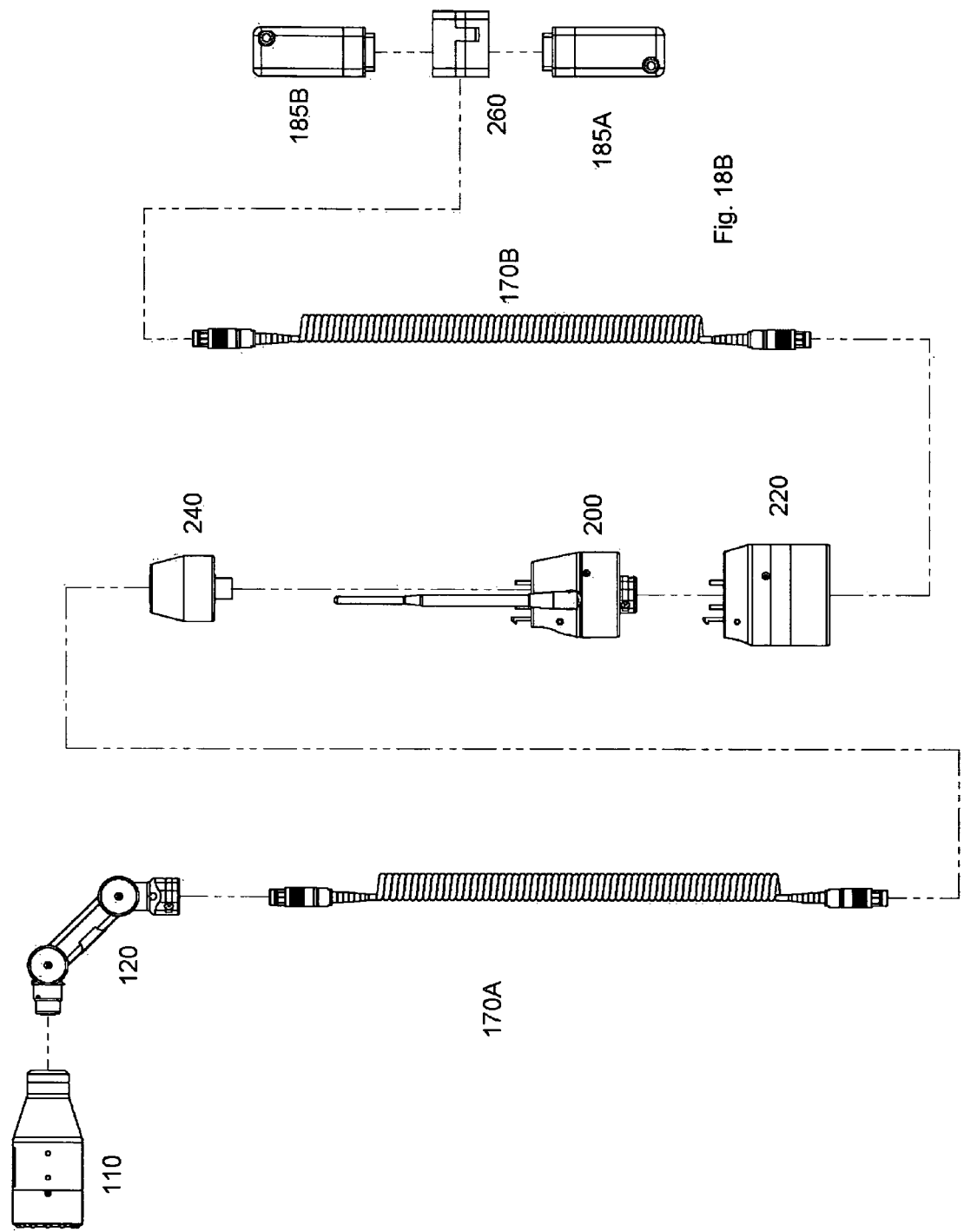

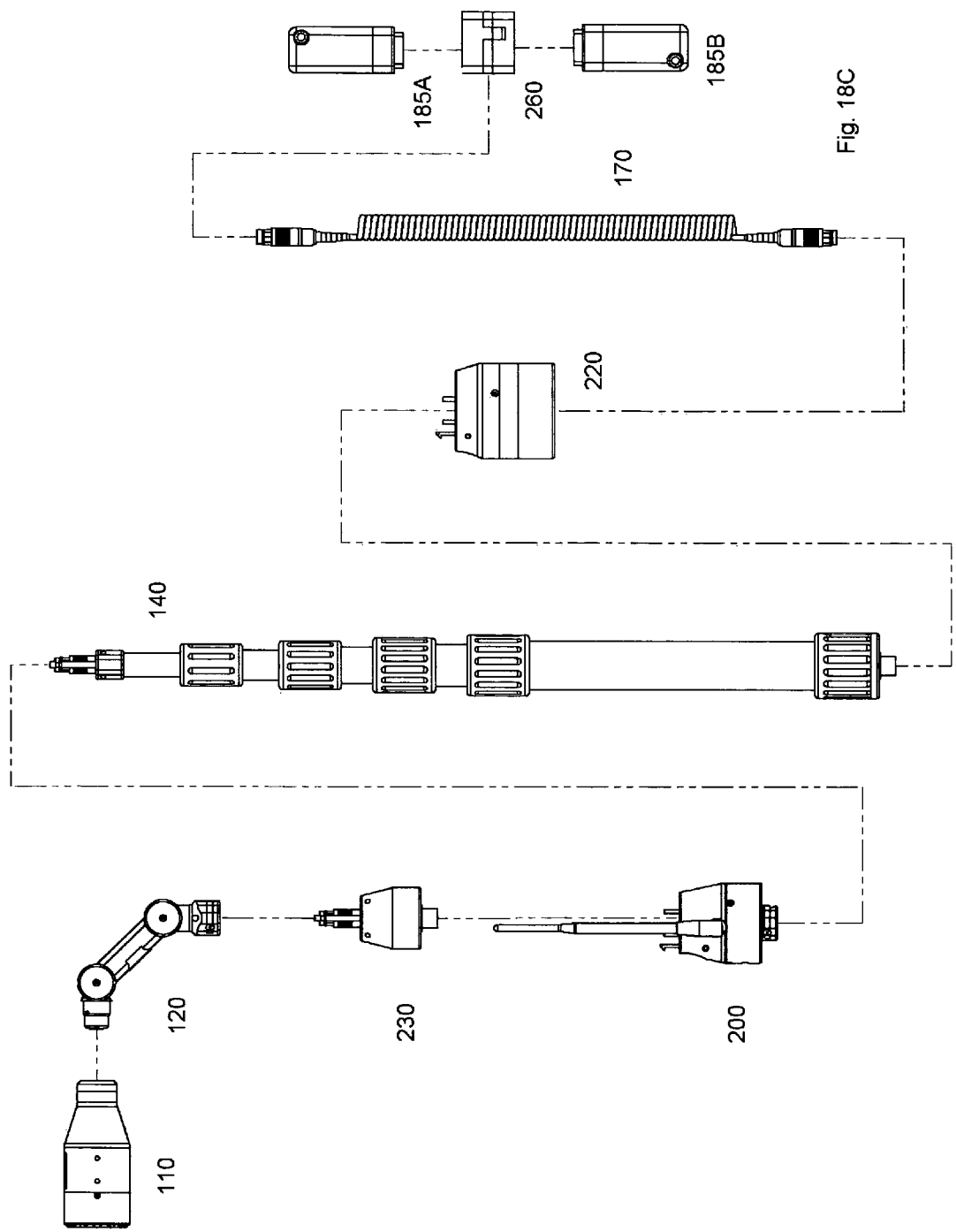

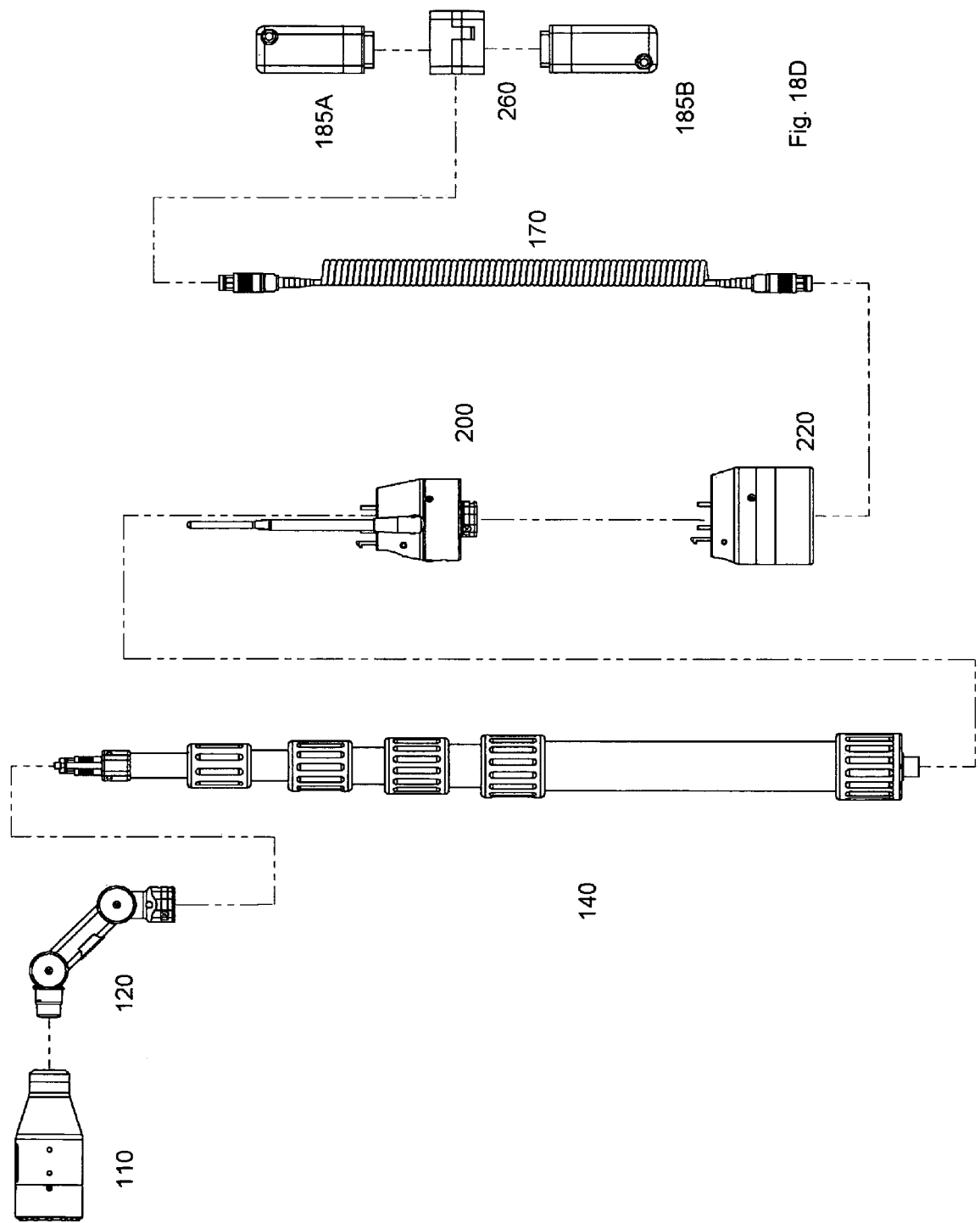

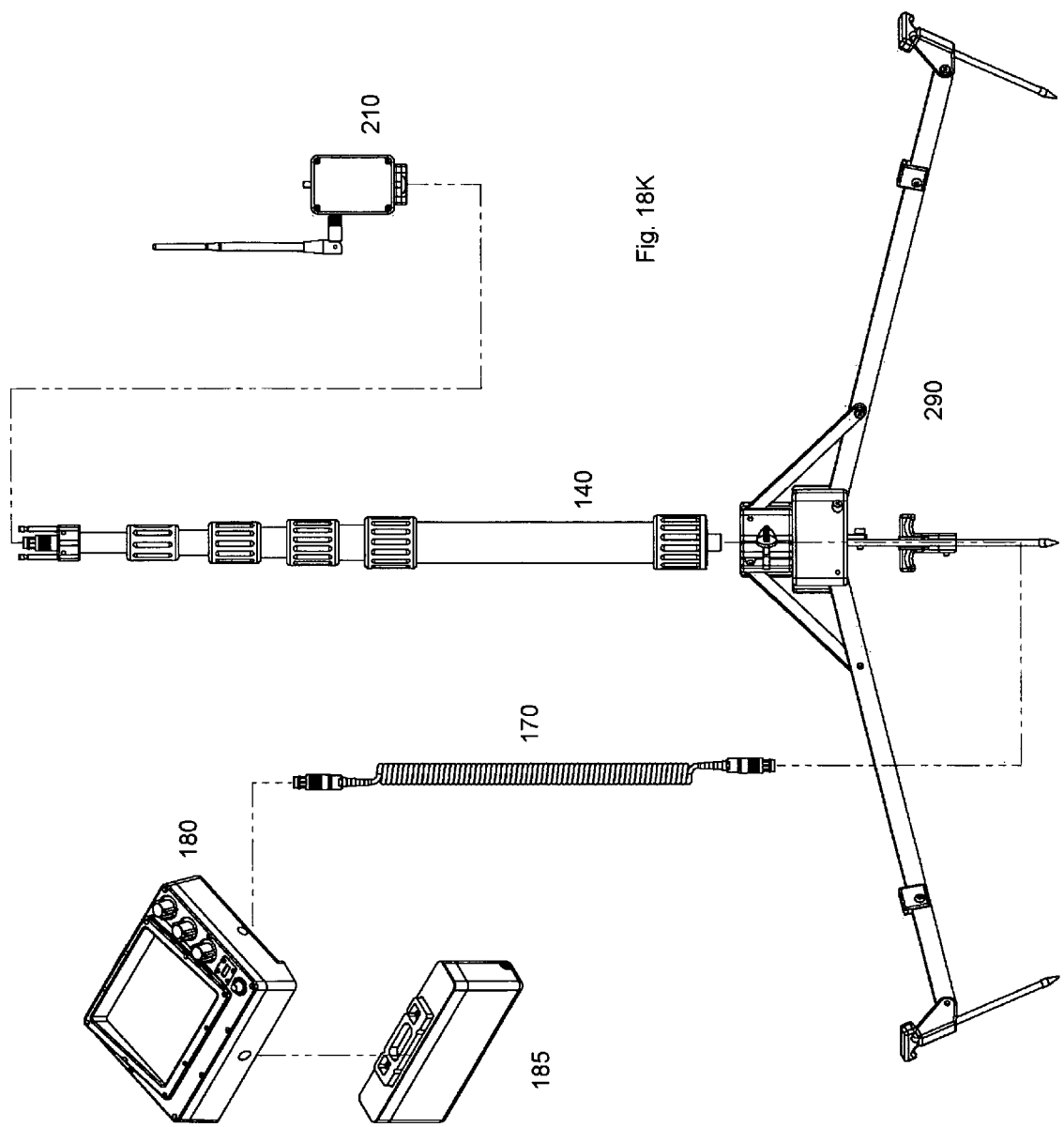

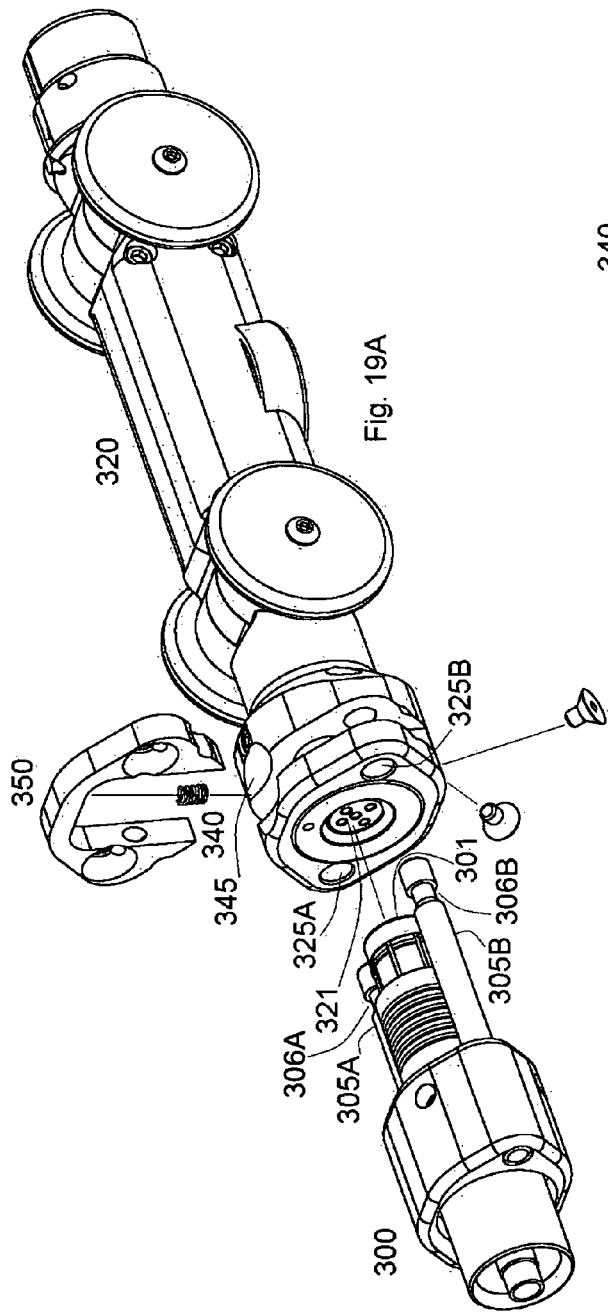
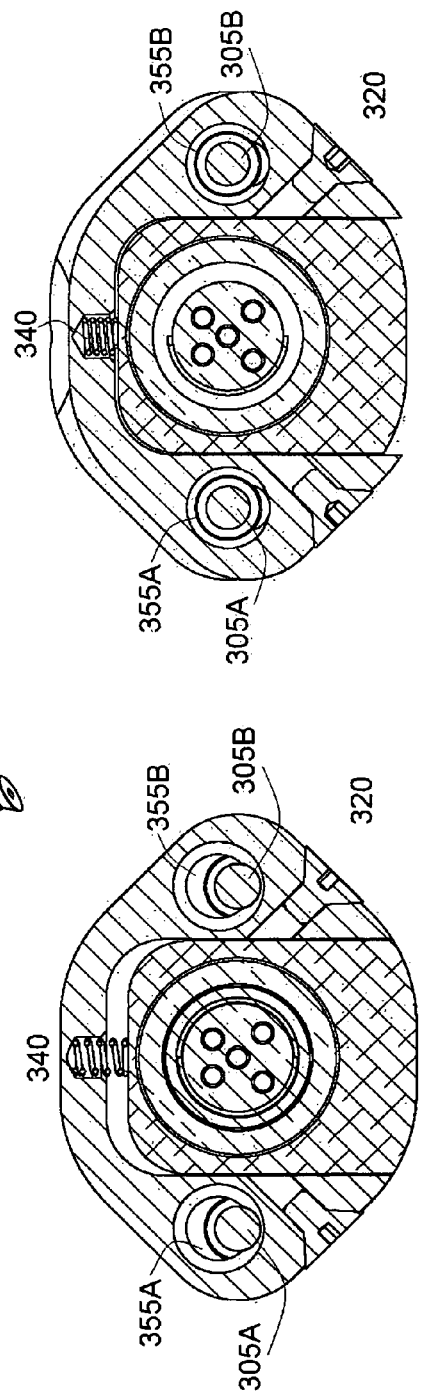
Fig. 19A
Fig. 19D
Fig. 19E

MODULAR IMAGING SYSTEM WITH WIRELESS TRANSMISSION AND LOCKING CONNECTOR

BACKGROUND OF THE INVENTION

The present invention relates to a modular imaging system in which a camera and separate display can be used in a mobile application, and more particularly, is directed to additional modules for wireless communication and a locking connector.

In environments such as police or military work, it is often desirable to see what is inside a building, vehicle or other remote viewing environment, without putting a person in direct line of fire from any occupant of the building or vehicle. Several vendors provide equipment kits for this purpose. Typically the kit includes one or more cameras, an extension pole for the camera and a display to show what the camera sees. Roughly, a modular imaging kit can cost around $50,000.

FIGS. 1A-1H are block diagrams of modules of an imaging system available from Zistos Corporation, Holbrook, N.Y., www.zistos.com, and FIGS. 2A-2C show the components of FIGS. 1A-1G arranged in exemplary use configurations.

FIG. 1A shows camera 10 having interface 11. Camera 10 may be a black and white camera, a color camera, or other suitable camera. Interface 11 provides power to the camera, and supplies a video signal from the camera. Interface 11 includes a threaded locking collar for mating camera 10 to another module.

FIG. 1B shows extension pole 20 having interface 21 and articulating section 23 at one end and interface 22 at an opposite end. Extension pole 20 has generally concentrically arranged tubes in a wedding cake shape that can be extended to form a long pole, such as 14 feet, and retracted for ease of carrying to a length of about 3 feet. When extended, the tubes are secured by screwing threaded mechanisms (not shown); the mechanisms are unscrewed to permit the tubes to be collapsed for carrying. Articulating section 23 has a segmented gooseneck to enable positioning of a to-be-attached camera in three dimensions. Interfaces 21 and 22 are similar to interface 11.

FIG. 1C shows cable 25 having interfaces 26 and 27 at each end. Cable 25 encloses power and video lines, typically in waterproof form. Interfaces 26 and 27 are similar to interface 11.

FIG. 1D shows display 30 having interface 31 and enclosed power receptacle 32. Interface 31 is similar to interface 11. Power receptacle 32 is generally a cavity with connectors, for receiving a battery or set of batteries. Display 30 is often worn on a person's body, such as on the chest, for ease of viewing by the wearer. In other cases, display 30 may be carried in a person's hands.

FIG. 1E shows battery 33 for use in power receptacle 32. Battery 32 may be, for example, nickel metal hydride (NiMH) batteries.

FIG. 2A shows a first exemplary configuration. Camera 10 is connected to extension pole 20, which is connected to cable 25, which is connected to display 30 having battery 33 installed therein. Generally, one person holds extension pole 20 to position camera 10 in a desired spot, and views display 30 to see the interior of a building or vehicle, or the underside of a vehicle, and so on. Whatever is seen by camera 10 appears on display 30, in real time.

FIG. 2B shows a second exemplary configuration. Camera 10 is connected to cable 25 which is connected to display 30. This configuration is useful, for example, when a person crouches under a window ledge, holds the camera over the ledge, and views what is inside a room without being visible to the occupants of the room. Another situation in which an imaging system is useful is when it is dropped down a shaft to look for hidden material such as drugs or explosives. Whatever is seen by camera 10 appears on display 30, in real time.

The Zistos imaging system includes wireless capability, generally for people in different locations to be viewing separate displays showing the same video. FIGS. 1F-1H show the wireless components of the Zistos system, and FIG. 2C shows an exemplary wireless configuration.

FIG. 1F shows a display with wireless transmission of what is being viewed to another location. Display 40 has interface 41 and enclosed power receptacle 42. Interface 41 is similar to interface 11. Power receptacle 42 is generally a cavity with connectors, for receiving a battery or set of batteries. Display 40 is often worn on a person's body, such as on the chest, for ease of viewing by the wearer. In other cases, display 40 may be carried in a person's hands. The signal provided to display 40 is also provided to transmitter 43, for wireless transmission on an antenna at a channel frequency selected by channel selection knob 44. Typically frequencies include 900 Mhz and 2.4 GHz. Transmitter 43 takes a baseband video signal and modulates the selected channel frequency to provide a wireless signal.

FIG. 1G shows wireless receiver module 50 having an antenna providing a signal to receiver 51 that operates at a channel frequency selected by channel selection knob 52. Receiver 51 receives a wireless signal and demodulates it to provide a baseband video signal which is then supplied via cable 53 to interface 54. Interface 54 is similar to interface 11.

FIG. 1H shows receiver base station 60 having cathode ray tube (CRT) 63, and which must be used indoors and attached to an AC power supply. Base station 60 has an antenna providing a signal to receiver 61 that operates at a channel frequency selected by channel selection knob 62. Receiver 61 receives a wireless signal and demodulates it to provide a baseband video signal for display on CRT 63.

FIG. 2C shows an exemplary wireless configuration. Camera 10 is connected to cable 25 which is connected to display 40. The video signal shown on display 40 is wireless transmitted to receiver module 50, which then, via cable 53, provides the video signal to display 30. An instance of use is where a person having camera 10 is searching houses, while a protected person, such as an expert, is in another location viewing on display 30 what the searcher is searching.

Other manufacturers of modular imaging systems include Tactical Electronics & Military Supply, LLC, Broken Arrow, Okla., www.tacticalelectronics.com, and Search Systems Incorporated, Bakersfield, Calif., www.searchsystems.com.

There is, however, an on-going need for an improved imaging system providing more flexibility to users.

SUMMARY OF THE INVENTION

In accordance with an aspect of this invention, there is provided a modular imaging system, comprising a camera module having a camera and an electrical interface for providing a video signal representing an image picked up by the camera, a wireless transmitter module having an electrical interface for receiving the video signal from the camera module and generating a high frequency signal, a wireless receiver module for receiving the high frequency signal from the wireless transmitter module and producing a baseband signal, and a display module for receiving the baseband signal and displaying the baseband signal on a display.

In accordance with another aspect of this invention, there is provided a secondary interlock mechanism, comprising: a U-shaped collar having eccentrically shaped holes and a depression for receiving a spring, and a module having alignment pin receptacles for receiving alignment pins having radial channels, and having the U-shaped collar inserted into the module and the spring so that the eccentrically shaped holes engage with the radial channels on the alignment pins to restrain the alignment pins from moving due to the force exerted on the U-shaped collar from the spring.

It is not intended that the invention be summarized here in its entirety. Rather, further features, aspects and advantages of the invention are set forth in or are apparent from the following description and drawings.

BRIEF DESCRIPTION OF THE DRAWINGS

FIGS. 2A-2C show the components of FIGS. 1A-1H arranged in exemplary use configurations;

FIGS. 3A-3I are block diagrams of modules of another known imaging system;

FIGS. 4A-4J are three-dimensional views of different camera modules;

FIGS. 7A-7E are views relating to an extension pole;

FIGS. 12A-12B are three-dimensional views of a wireless transmitter module;

FIGS. 13A-13B are three-dimensional views of a wireless receiver module;

FIGS. 14A-14B are three-dimensional views of a compact battery;

FIGS. 14C-14D are three-dimensional views of a wireless transmitter module connected to a compact battery;

FIGS. 15A-15B are three-dimensional views of a first wireless interface module;

FIGS. 16A-16D are three-dimensional views of an accessory tray;

FIGS. 16F-16G are three-dimensional views of an accessory tray connected to a wireless receiver module;

FIGS. 17A-17B are three-dimensional views of a tripod;

FIGS. 18A-18H are block diagrams showing the components of FIGS. 3A-3I and 11A-11I arranged in exemplary transmit configurations;

FIGS. 18I-18K are block diagrams showing the components of FIGS. 3A-3F and 10A-10I arranged in exemplary receive configurations; and FIGS. 19A-19H are diagrams referenced in explaining a spring-loaded locking mechanism, used as a secondary interlocking mechanism.

DETAILED DESCRIPTION

Figure 1A:
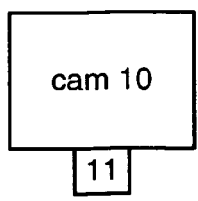
FIGS. 1A-1H are block diagrams of modules of a known imaging system.
Figure 1B:
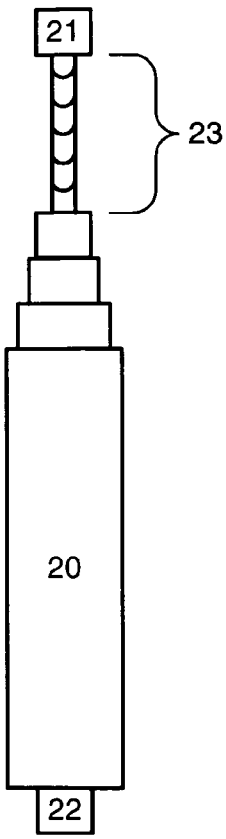
Figure 1C:
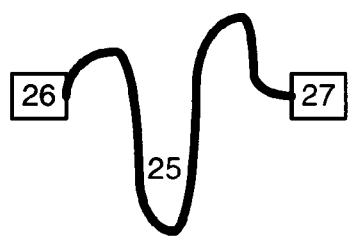
Figure 1D:
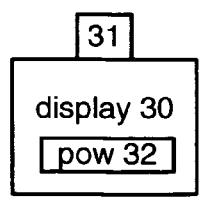
Figure 1E:
Figure 1F:
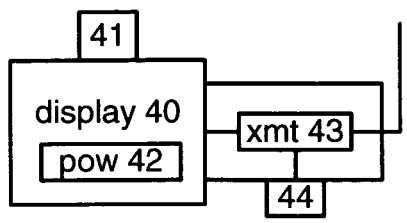
Figure 1G:
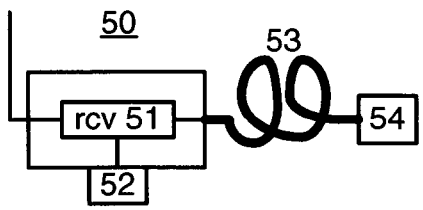
Figure 1H:
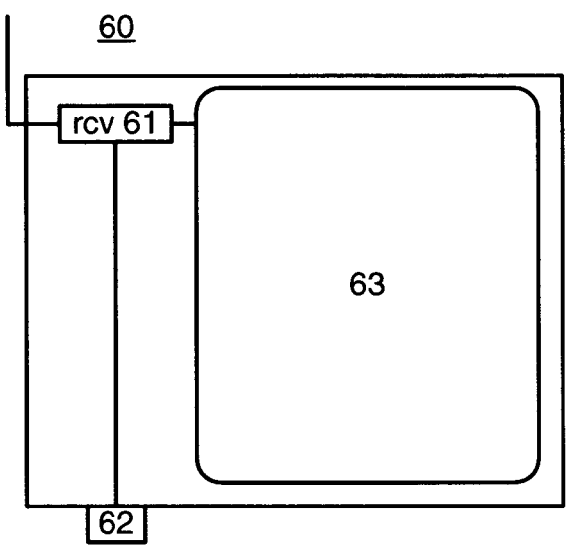
Figure 2C:
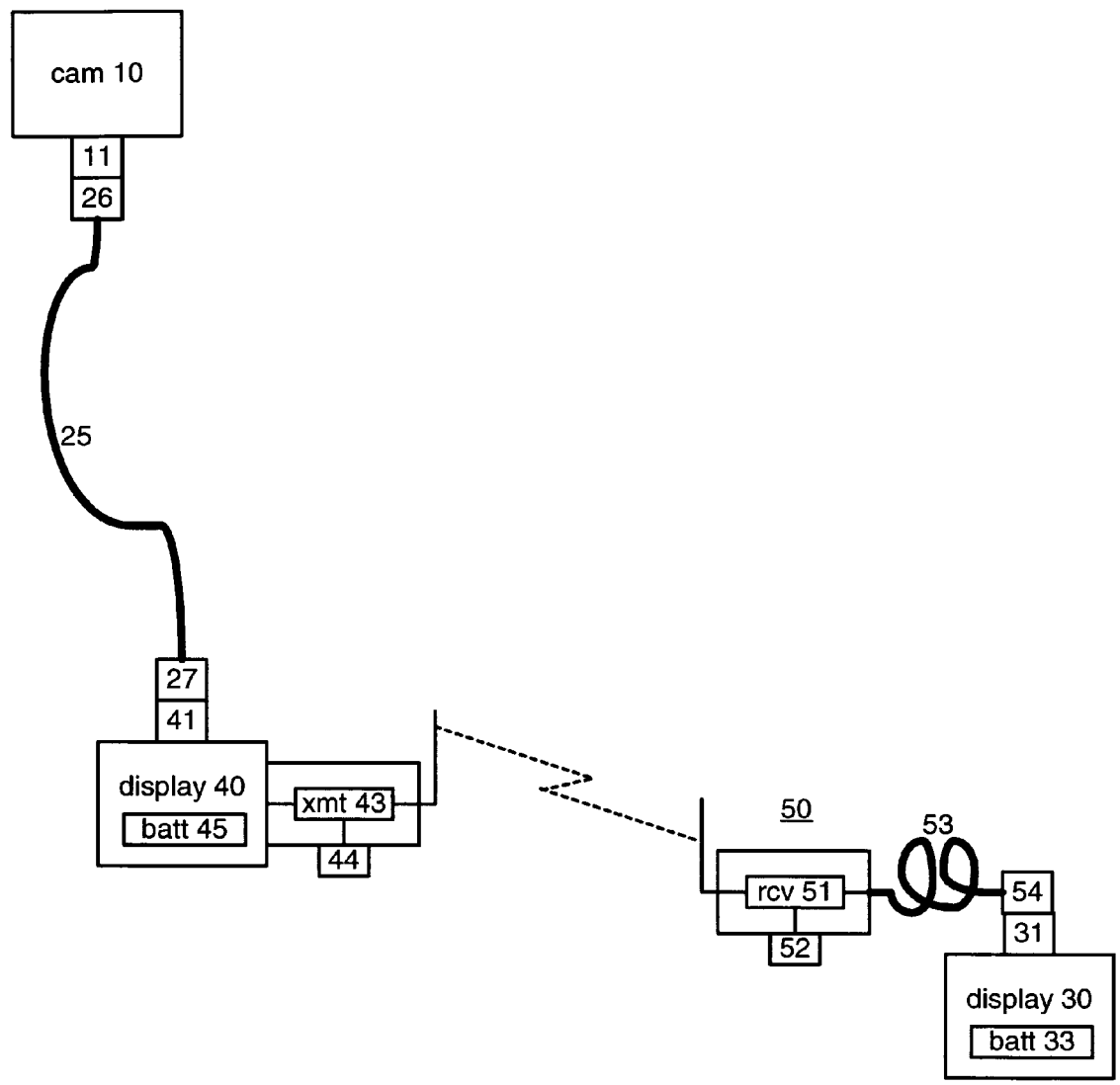

A modular imaging system includes a camera module having a camera and an electrical interface for providing a video signal representing an image picked up by the camera, a wireless transmitter module having an electrical interface for receiving the video signal from the camera module and generating a high frequency signal, a wireless receiver module for receiving the high frequency signal from the wireless transmitter module and producing a baseband signal, and a display module for receiving the baseband signal and displaying the baseband signal on a display. A secondary interlock mechanism includes a U-shaped collar having eccentrically shaped holes and a depression for receiving a spring, and a module having alignment pin receptacles for receiving alignment pins having radial channels, and having the U-shaped collar inserted into the module and the spring so that the eccentrically shaped holes engage with the radial channels on the alignment pins to restrain the alignment pins from moving due to the force exerted on the U-shaped collar from the spring.

Wireless transmit and receive modules for a modular imaging system are provided, each having mechanical connectors with a secondary interlock for a more secure fit to other modules. The secondary interlock provides a quick release mechanism, and has no threads to gather dust, dirt or sand. Additionally, the wireless transmit and receive modules each have two sets of mechanical connectors to maximize compatibility with existing modules of the modular imaging system. The secondary interlock mechanism is also employed on other modules of the modular imaging system.

Typical military and civilian mission environments for a modular imaging system are search and rescue (SAR), combat, force protection and interdiction. SAR includes site/safety monitoring, water rescue, confined space entry, building collapse and fire. Combat includes hostage rescue, building or confined space clearing, sniper observer aid, and covert/tactical surveillance. Force protection includes evidence recovery, explosive ordinance disposal (EOD) sweeps, perimeter/gate security vehicle search, intruder detection and surveillance. Interdiction includes covert surveillance, stowaway/fugitive detection, contraband weapons or other restricted materials searches, and counter-drug operations.

Another known modular imaging system will now be described, followed by wireless modules for use in the modular imaging system. The wireless modules, as well as other modules, employ a secondary interlock mechanism for a more secure fit to other modules.

The secondary interlock system is discussed after the modules and exemplary configurations are discussed.

FIGS. 3A-3F are block diagrams of modules of another known imaging system sold by Eomax Corporation, Toronto, Ontario, Canada, as the Wolf Pack system. Table 1 lists the correspondence between Wolf Pack module names and reference numbers in the present application.

TABLE 1

| 110 | camera | C1d compact active near infrared (NIR) camera |
| --- | --- | --- |
|  |  | C2d high performance active NIR camera |
|  |  | C3d color camera |
|  |  | C4d under door viewer |
|  |  | C5d high sensitivity endoscope camera |
|  |  | C6d color endoscope camera |
|  |  | C7d thermal camera |
| 120 | articulating module | CA5d manually controlled articulating module |
|  |  | CA6d motorized remote controlled articulating module |
| 130 | pistol grip | CA8d pistol grip |
| 140 | extension pole | E7d 18' extension pole |
|  |  | E8d 6' extension pole |
| 150 | folding extension pole | E5d 15' folding extension pole |
|  |  | E6d 32' folding extension pole |
| 170 | cord | CC1d 10' coiled connecting cable |
|  |  | CC2d 20' coiled connecting cable |
| 180 | display | D1d flat panel display |
|  |  | D2d head mounted display |
| 185 | battery | P4d NiMH battery |

FIG. 3A shows camera module 110 having hooded electrical interface 111. Camera module 110 may include any suitable type of camera, such as a compact active NV camera, a high performance active NV camera, a color camera, an under door viewer camera, a high sensitivity endoscope camera, a color endoscope camera, a thermal camera, a wedge camera, an image intensified NV camera, and so on. Interface 111 is a 5 pin interface, with the pins arranged in a quincunx pattern. One of the pins is used for an analog video signal. A second pin is used for a power signal. A third pin is used as a power and/or video ground. The fourth and fifth pins are reserved for future use, in particular, for data. Interface 111 has a mechanical hood that assures only one acceptable way of connecting to another interface, so that even if a person connects interface 111 in the dark, the connection is made correctly. A black and white near infrared camera has a length of 4.75" and diameter of 2.1" and weight of 1.0 lb.

FIGS. 4A-4J are three-dimensional views of different camera modules.

Figure 4B:
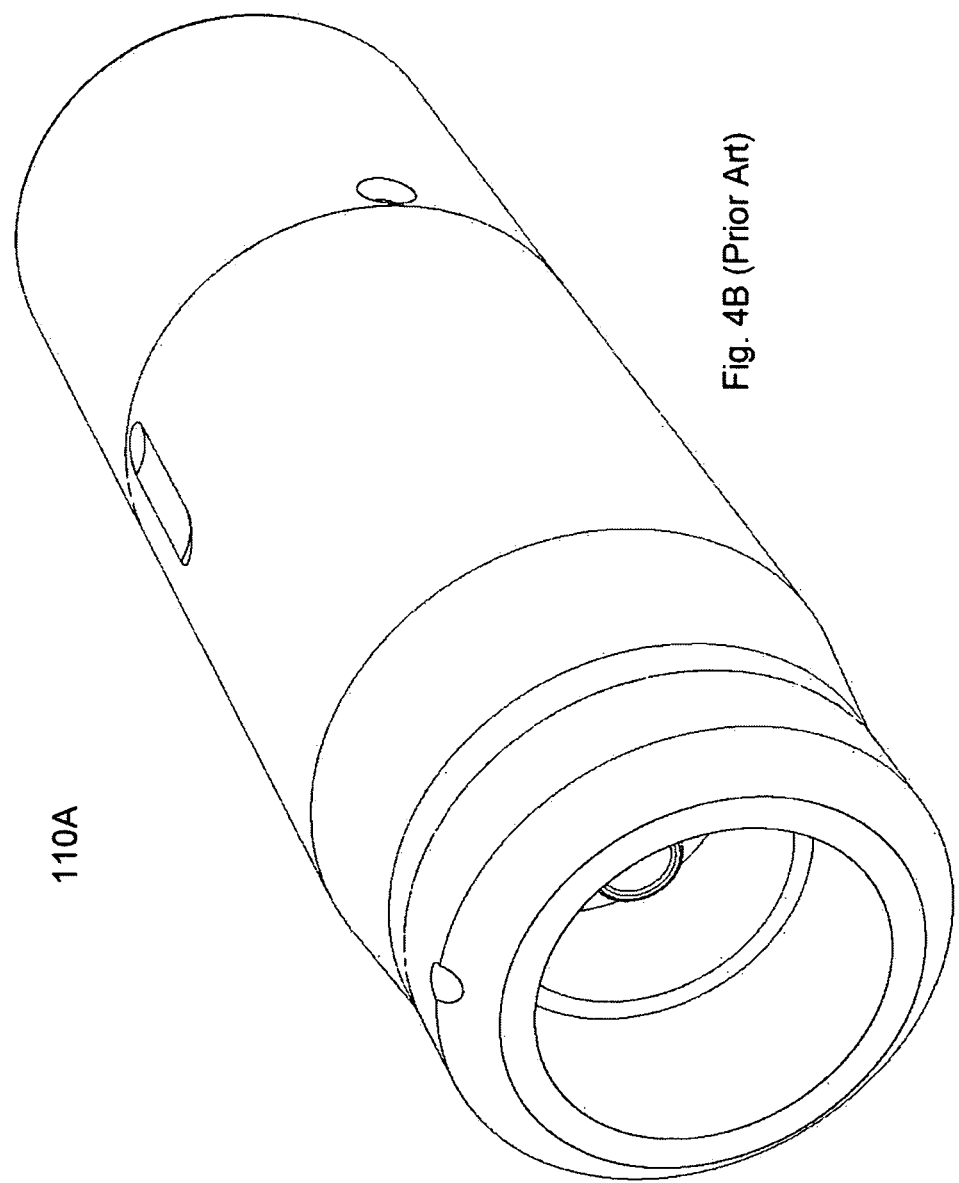

FIGS. 4A-4B show front and back three-dimensional views of compact active near infrared (NIR) camera module 110A.

Figure 4C:
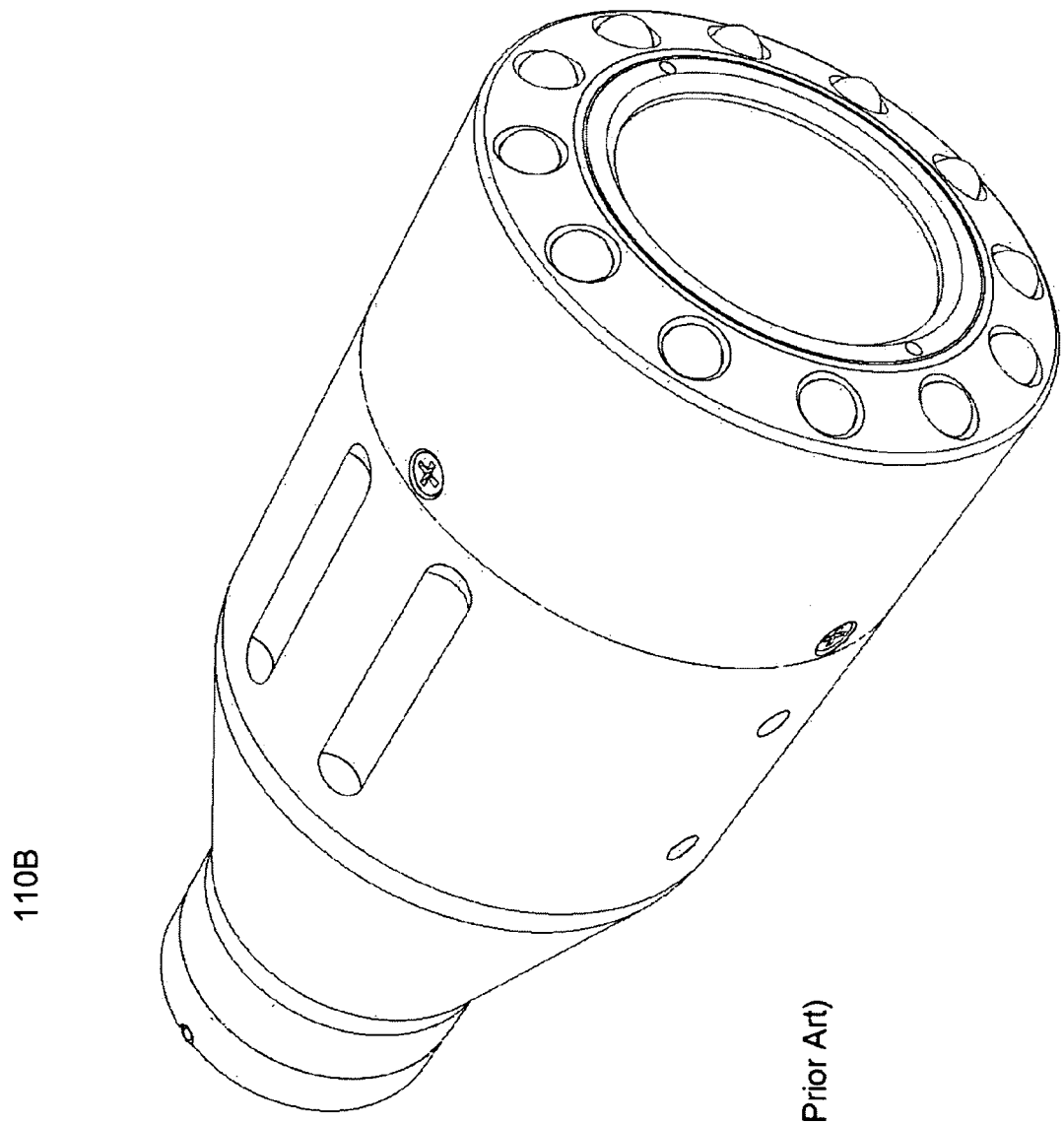
Figure 4D:
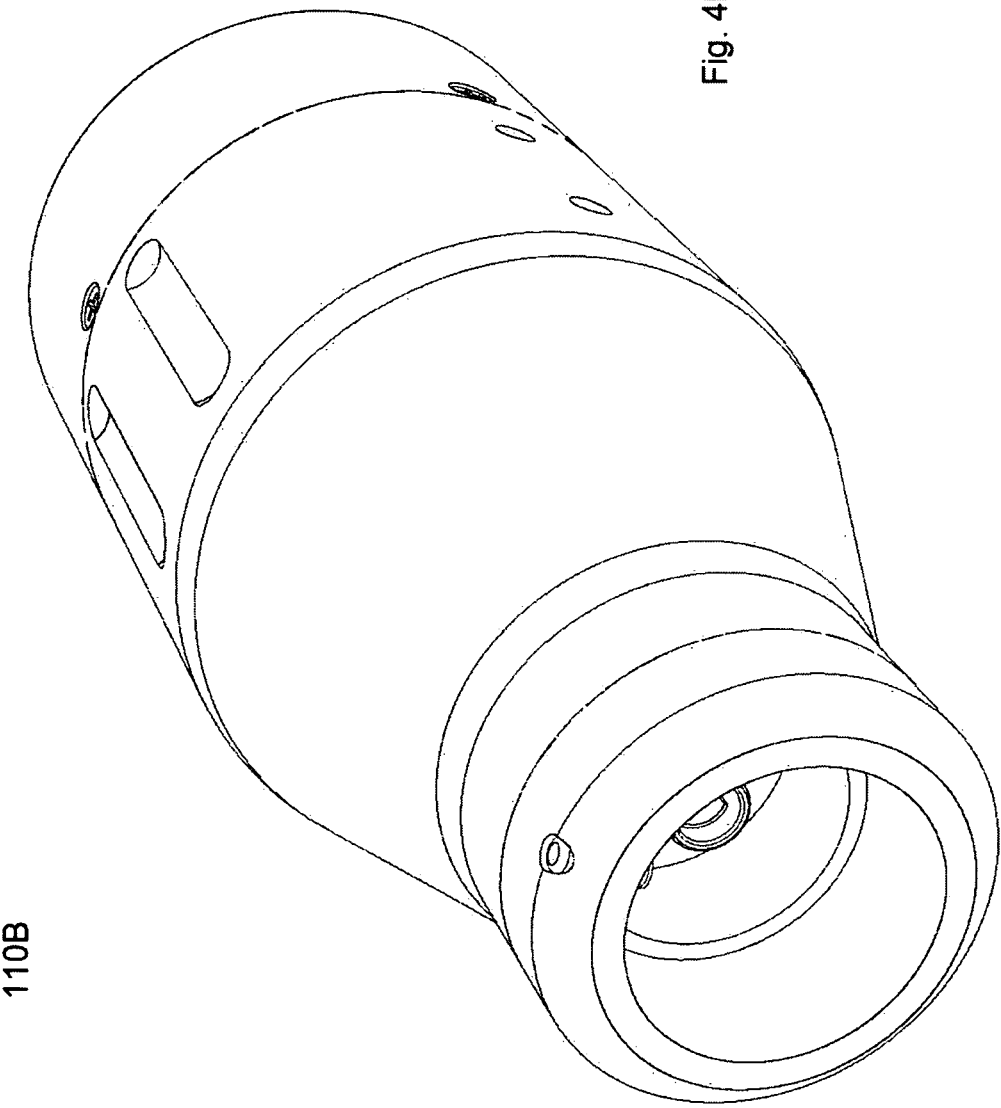

FIGS. 4C-4D show front and back three-dimensional views of camera module 110B, which may be either a high performance active NIR camera or a color camera.

Figure 4E:
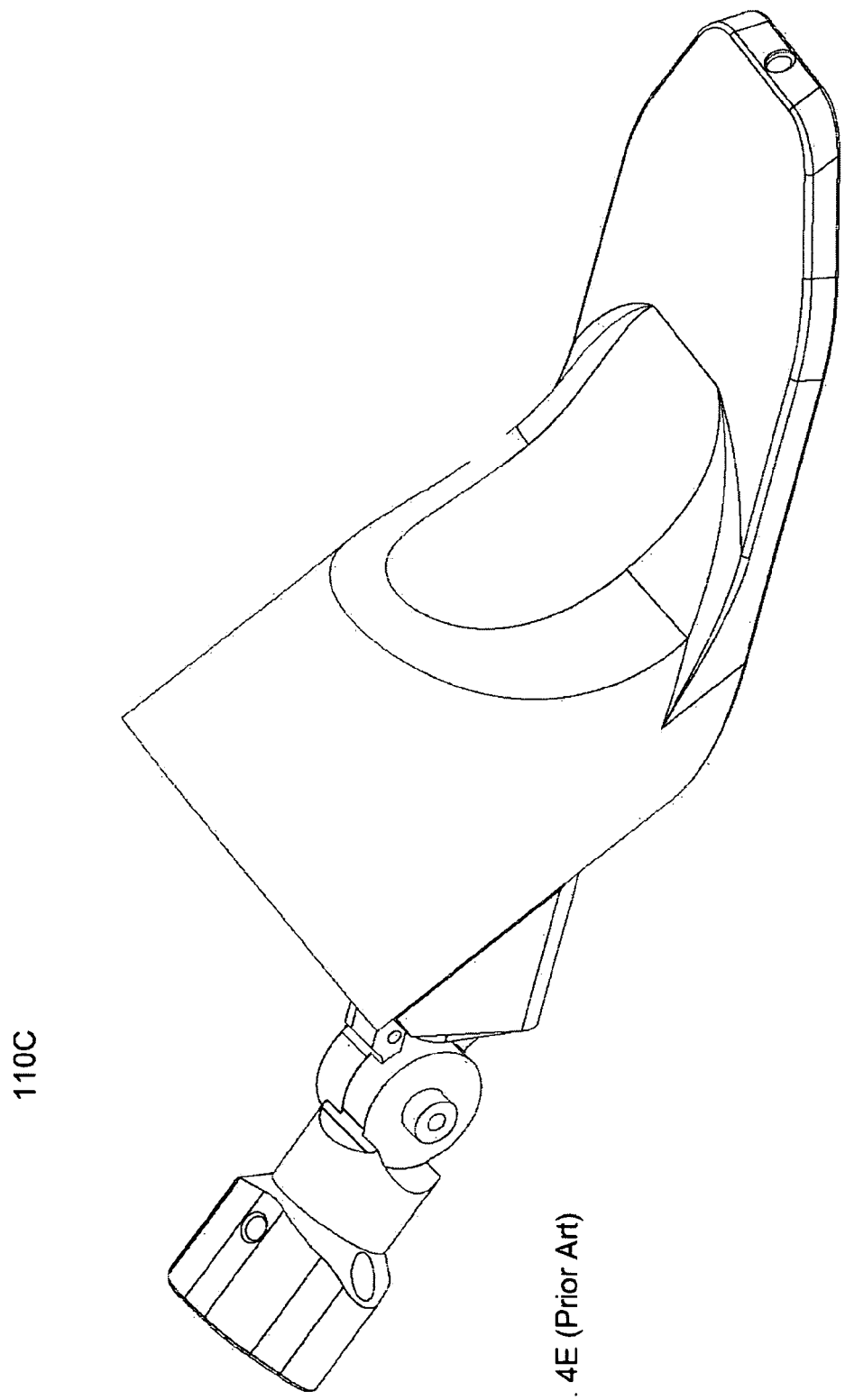
Figure 4F:
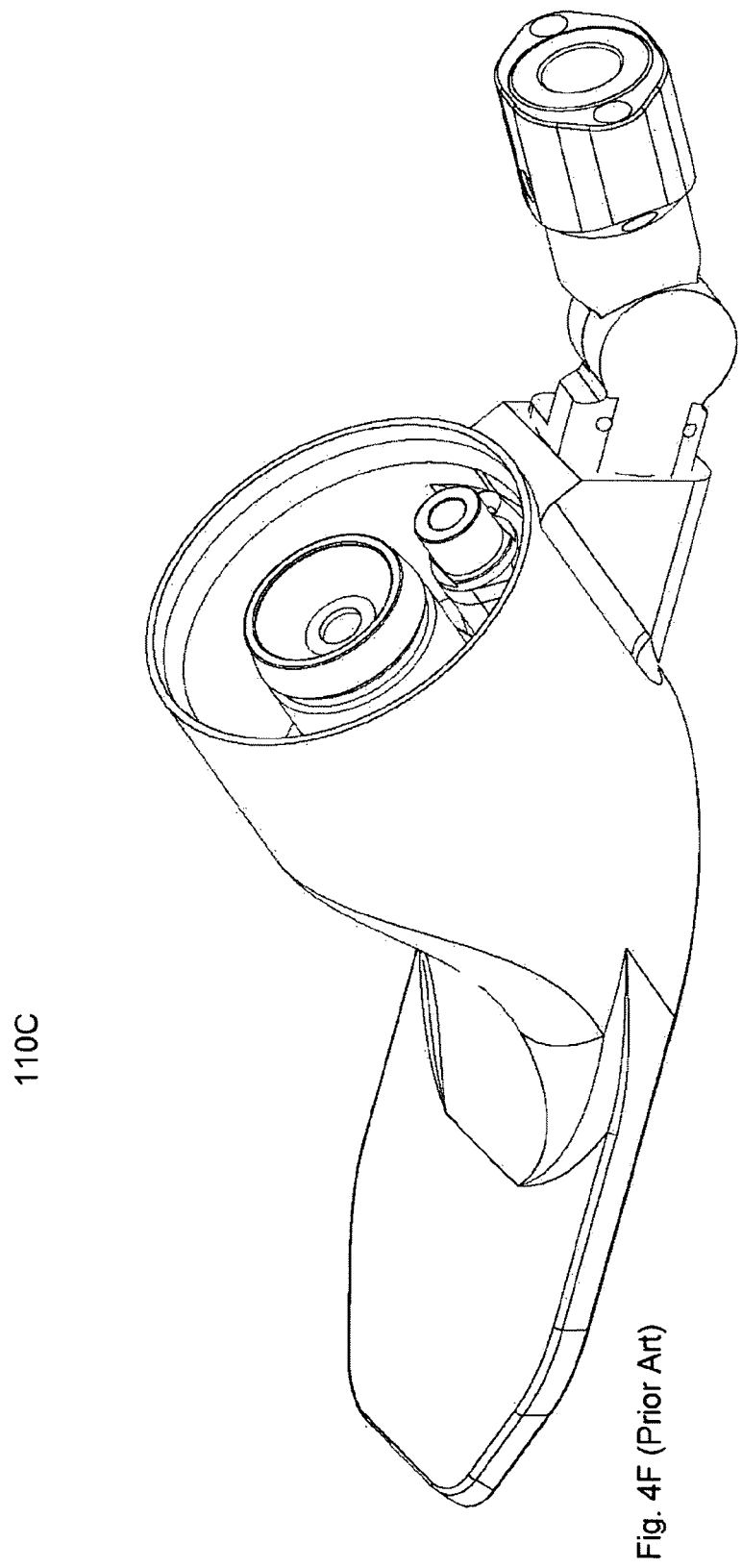

FIGS. 4E-4F show front and back three-dimensional views of under door viewer camera module 110C.

FIGS. 4G-4H show front and back three-dimensional views of high sensitivity endoscope camera module 110D.

Figure 4I:
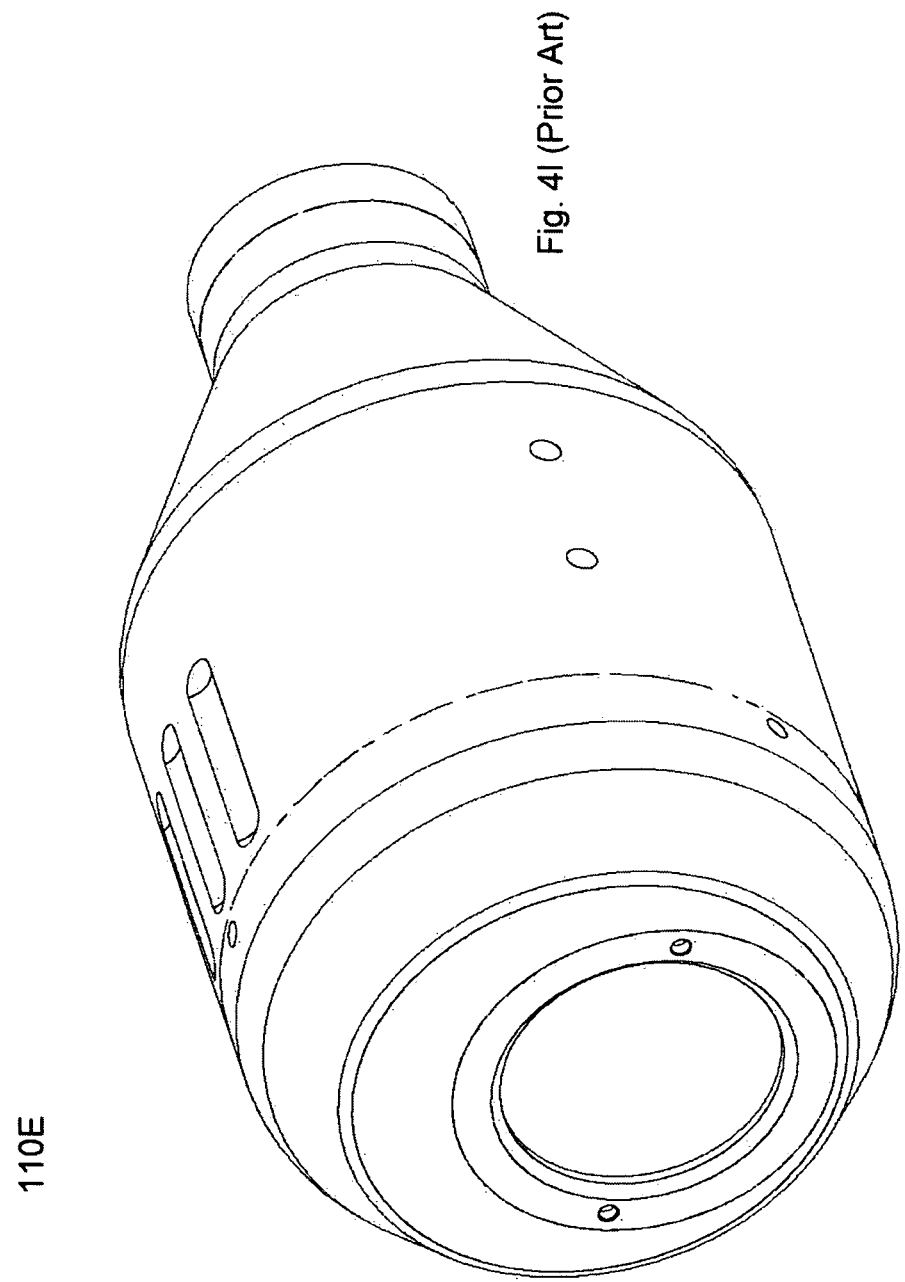
Figure 4J:
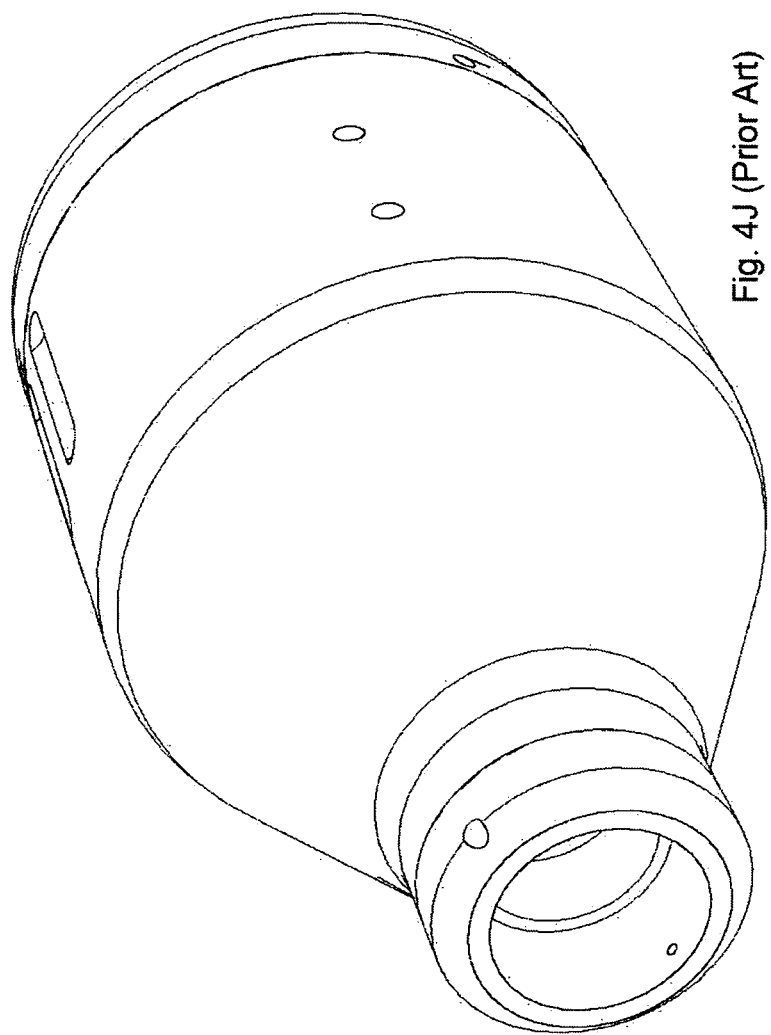

FIGS. 4I-4J show front and back three-dimensional views of thermal camera module 110E.

FIG. 3B shows articulating module 120 having hooded electrical interface 121, and electrical interface 124 located between mechanical alignment interfaces 125A, 125B. Articulating module 120 serves to connect a camera module to an extension pole.

It is useful for articulating module 120 to be a separate module, rather than connected to a pole, since the module can be readily re-used for other poles, eliminating the weight of multiple articulating interfaces when the user is carrying many poles. Additionally, if articulating module 120 malfunctions, it can readily be replaced by another articulating module, rather than an entire assembly of articulating module and extension pole. Further, articulating module 120 can be re-used with different camera modules.

Articulating module 120 includes hooded electrical interface 121 connected to a first short pole connected to a first hinge connected to a second short pole connected to a second hinge connected to a third short pole connected to electrical interface 124. The two hinges permit three-dimensional positioning of a camera module connected to hooded electrical interface 121. Preferably, as with all poles in the modular imaging system, the short poles are made from a lightweight yet strong reinforced carbon fiber composite.

Mechanical alignment interfaces 125A, 125B are the female counterparts to male alignment pins, and serve to (i) eliminate torsion force that would otherwise damage electrical interface 124, (ii) provide strength to the connection between articulating module 120 and an extension pole, (iii) limit the number of ways that a user can attempt to mate articulating module 120 to an extension pole to two ways.

For a very small camera, an articulating module may be permanently attached to the camera to avoid the camera getting lost, and to reduce overall size.

Figure 5A:
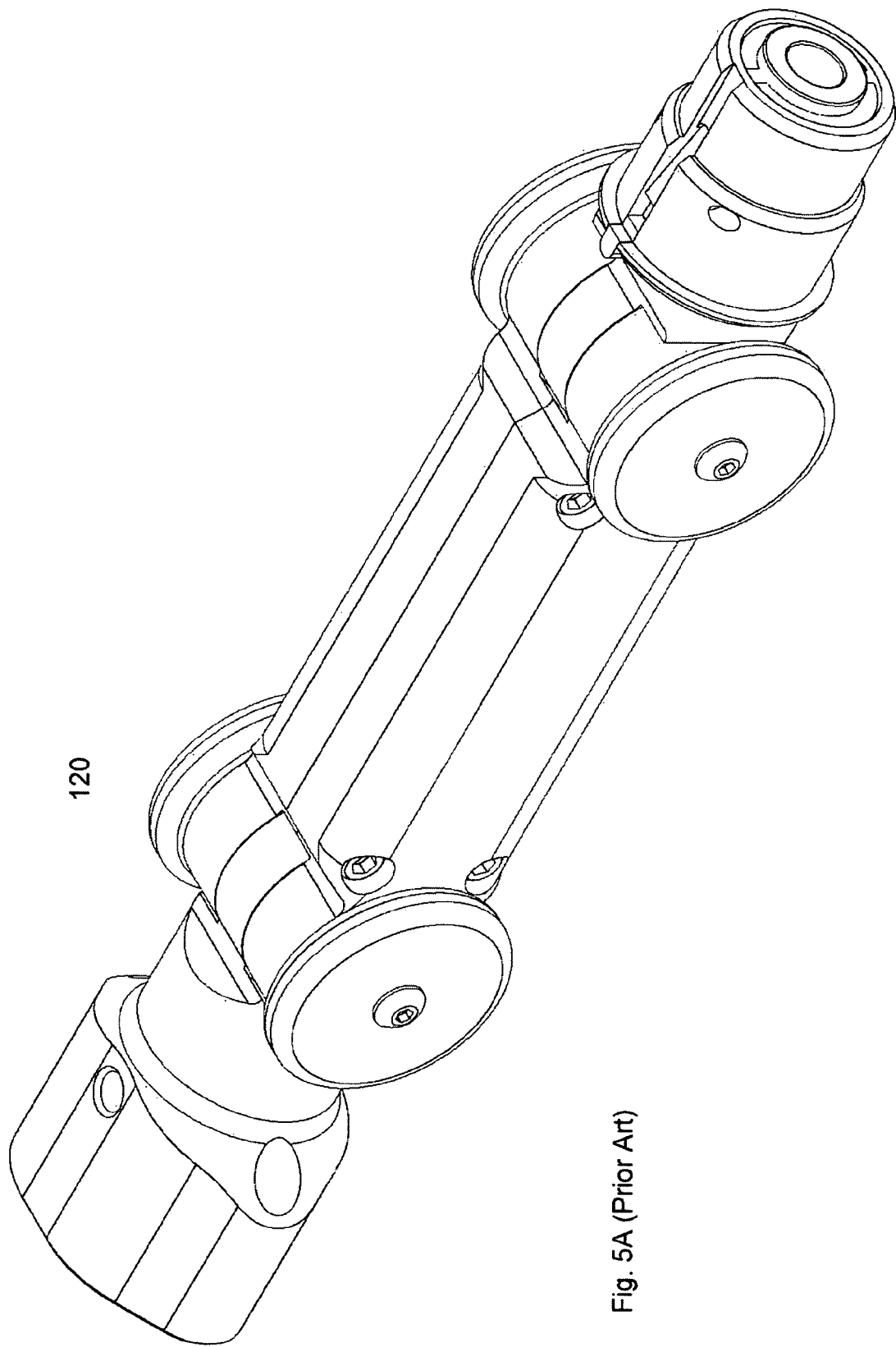
FIGS. 5A-5B are three-dimensional views of an articulating module.
Figure 5B:
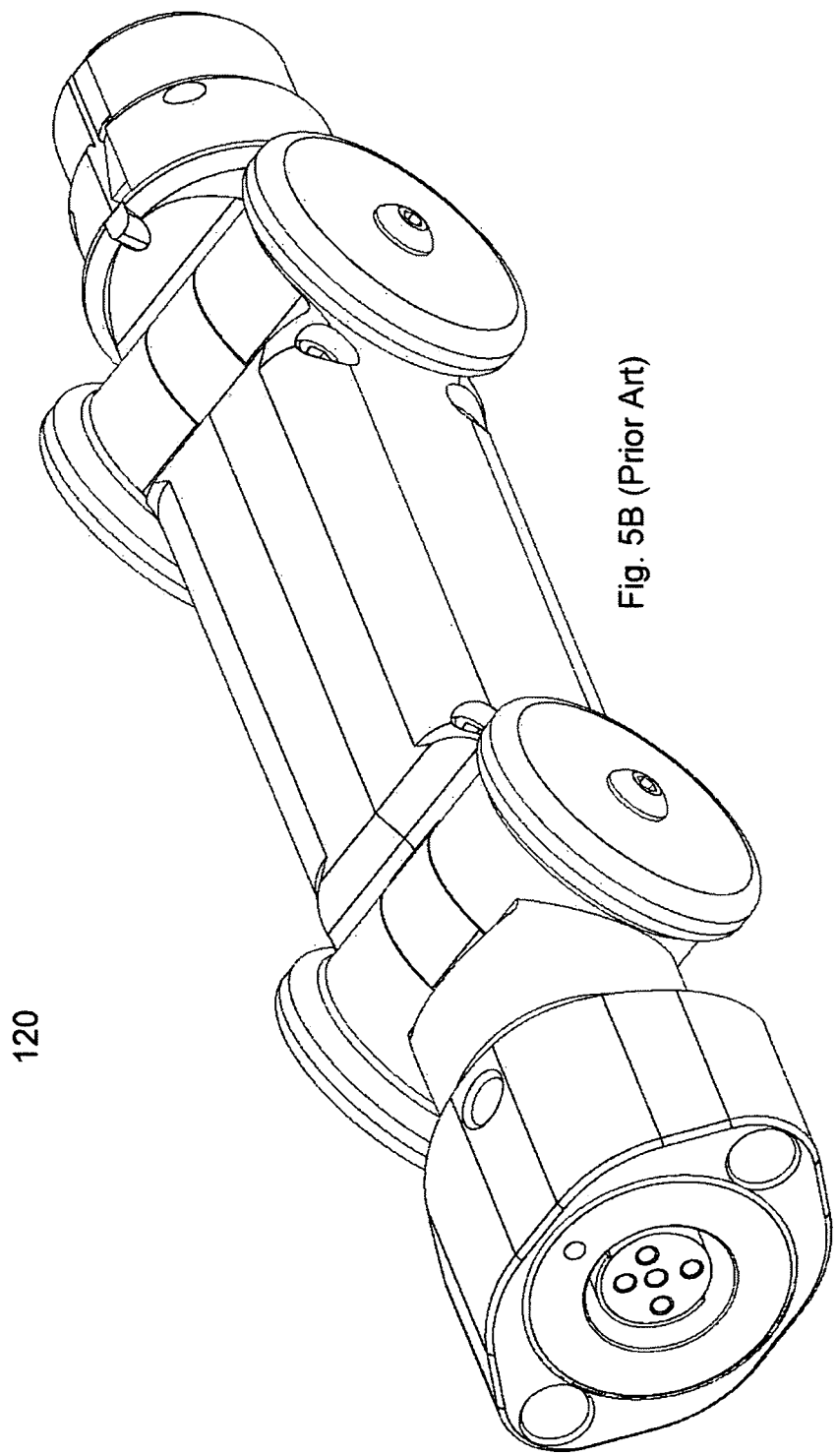

FIGS. 5A-5B are three-dimensional front and back views of articulating module 120.

Figure 5C:
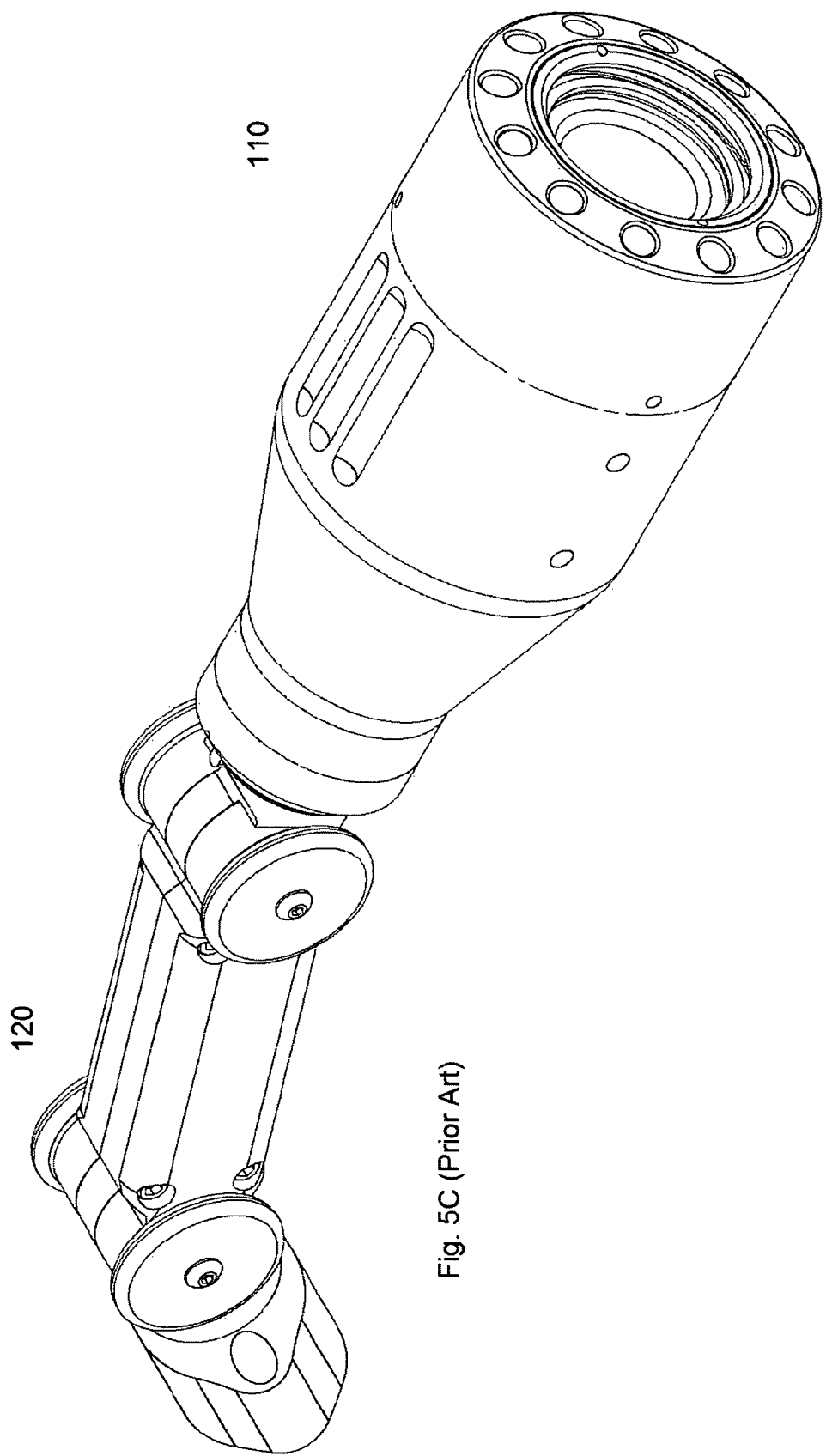
FIGS. 5C-5D are three-dimensional views of an articulating module connected to a camera module.
Figure 5D:
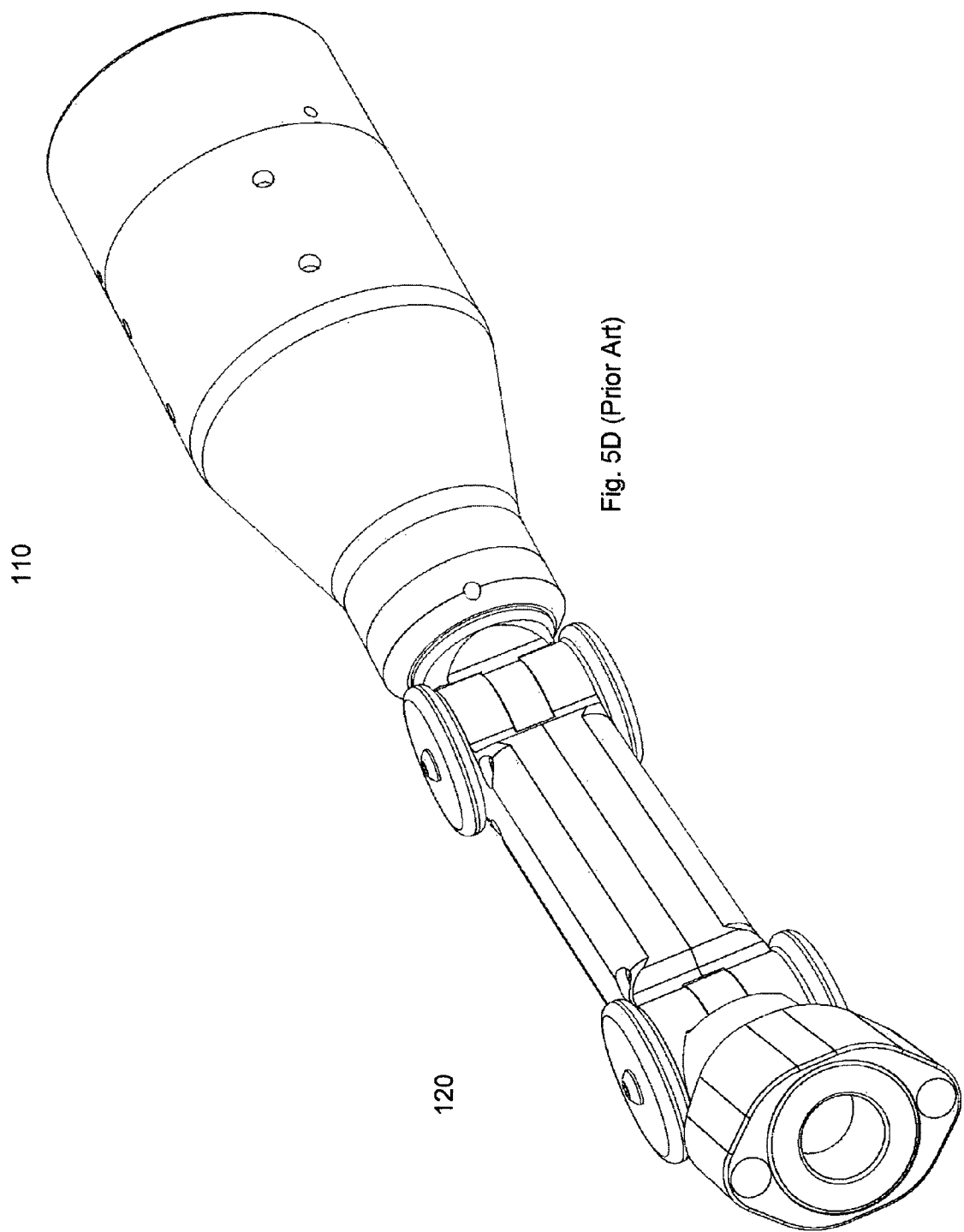

FIGS. 5C-5D are three-dimensional front and back views of articulating module 120 connected to camera module 110.

FIG. 3C shows pistol grip module 130 having hooded electrical interface 131 and electrical interface 134 located between mechanical alignment interface 135A and 135B.

Figure 6A:
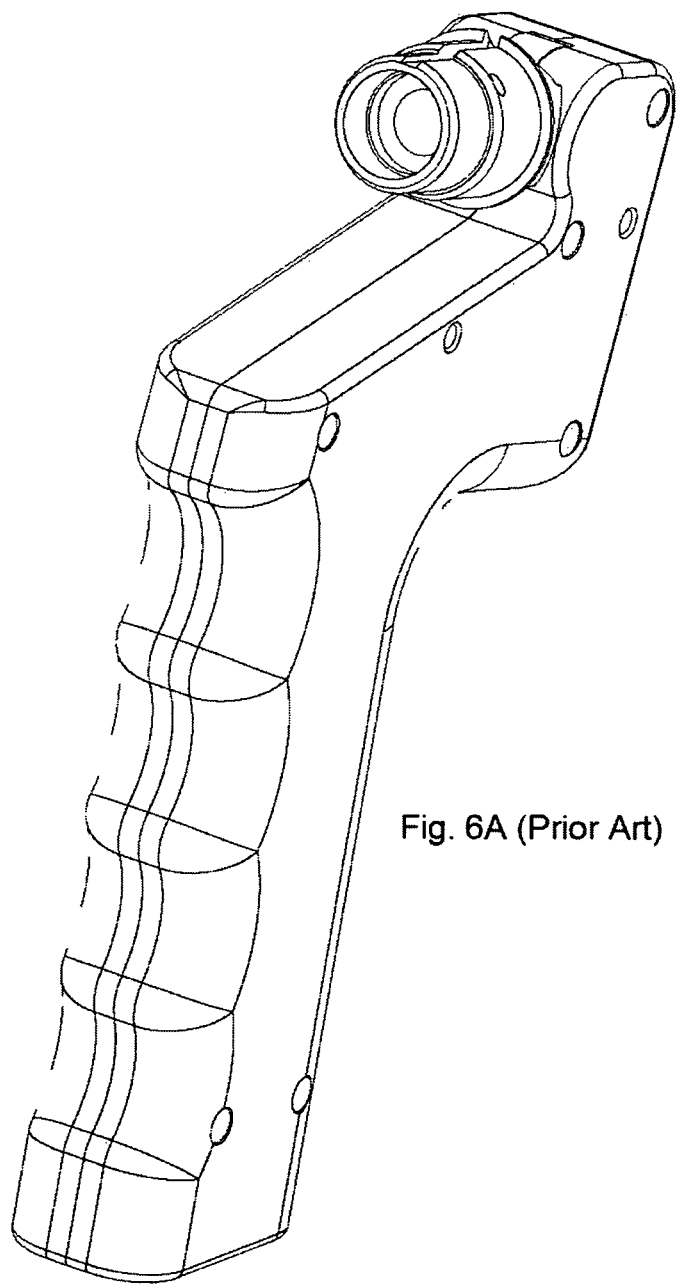
FIGS. 6A-6B are three-dimensional views of a pistol grip module.
Figure 6B:
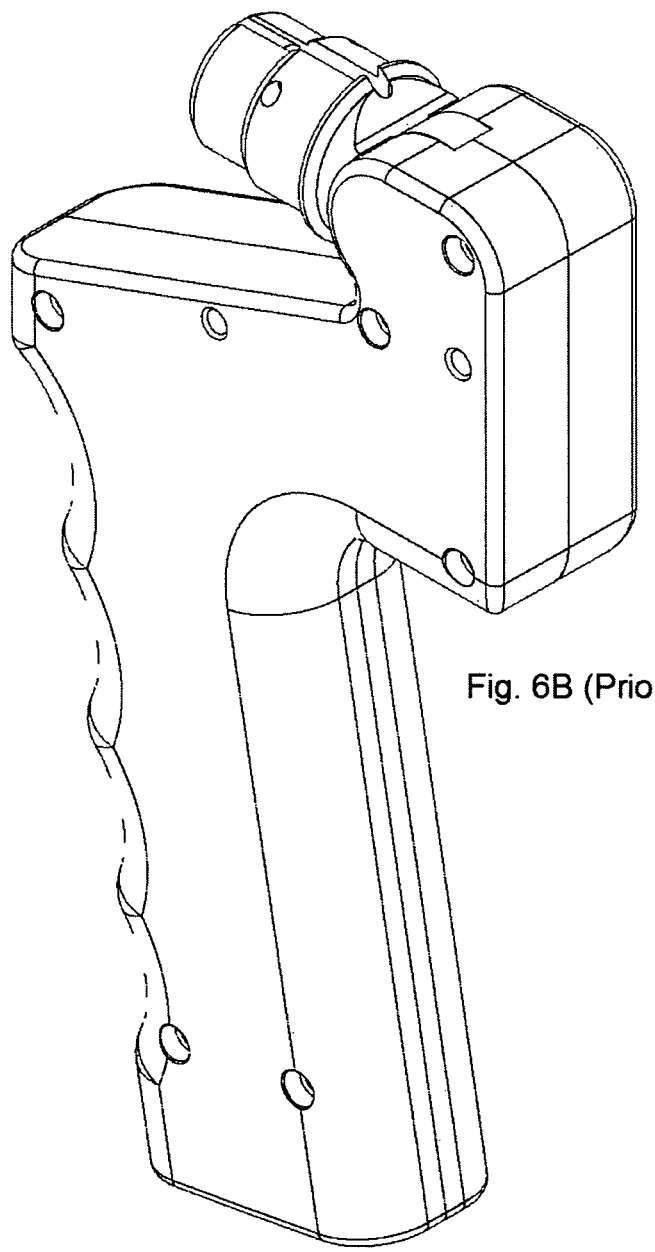

FIGS. 6A-6B are three-dimensional front and back views of pistol grip module 130.

Figure 6C:
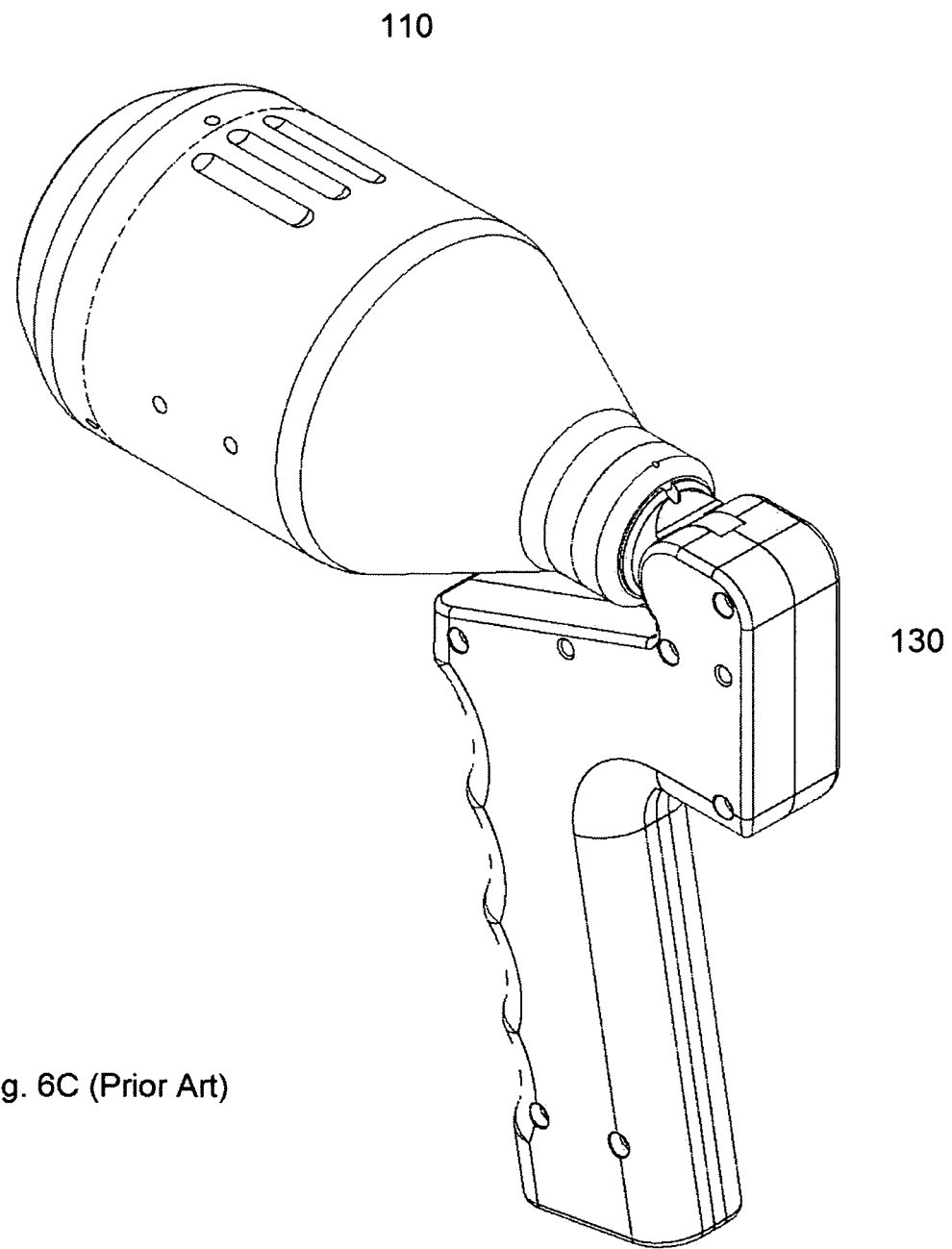
FIG. 6C is a three-dimensional view of a pistol grip module connected to a camera module.

FIG. 6C is a three-dimensional view of pistol grip module 130 connected to camera module 110.

FIG. 3D shows extension pole 140 having electrical interface 141 located between alignment pins 142A, 142B, and electrical interface 145 located between mechanical alignment interfaces 146A, 146B and latch receiver 146C. Extension pole 140 has a collapsed length without cable protector of 29", and an extended length without cable protector of 14'2", and a weight of 4 lbs.

FIG. 7A is a side view of extension pole 140 in its retracted configuration.

FIG. 7B is a side view of extension pole 140 in its extended configuration. Extension pole 140 has five poles of increasing circumference, so that when retracted, they have a concentric arrangement. At the top of each pole, except for the topmost pole, there is a respective twist-lock collar, that is twist-lock collars 147A-147D.

Advantages of a twist-lock collar relative to a threaded collar include (i) faster connection, since the user only has to twist the collar by about a quarter turn, rather than spending time with multiple revolutions of a pole along threading, (ii) more durable, since the collar is sealed so that dust and sand cannot enter the mechanism, (iii) less likely to become loose, and (iv) not susceptible to thread binding as occurs with a threaded collar in the horizontal position.

FIG. 7C shows an exploded view of collar 147C. Collars 147A, 147B, 147D are similar and are not discussed for brevity. Collar 147C surrounds pole 143A which has internal grooves (not shown).

Internal piece 143B has external grooves 144 at one end that correspond to the internal grooves of pole 143A. The smaller grooved end of internal piece 143B is inserted into pole 143A and epoxy placed in the grooves; when the epoxy hardens, it provides substantial strength as the grooves force the epoxy into a grid shape.

The larger end of internal piece 143B fits into piece 143C, which is adapted to receive an end of pole 143D.

FIG. 7D shows collar 143C surrounding piece 143B. As collar 143C is turned, it causes piece 143B to compress against pole 143A, thereby restraining pole 143A. Importantly, because of the size of the bearing surface, it becomes substantially impossible for the extension poles to move separately until collar 143C is untwisted. Thus, a firm, reliable configuration is provided.

When pole 143A is held sideways, as is typical in an imaging system, a threaded connection will suffer from its threads tending to bind on the lower side, whereas a cam-lock connection such as present in collar 147C has a relatively large ramp surface that is not susceptible to binding as occurs with threads.

FIG. 7E shows internal piece 143B inserted into piece 143C.

FIG. 3E shows folding extension pole 150 having electrical interface 152 located between alignment pins 153A, 153B, and electrical interface 156 located between mechanical alignment interfaces 157A, 157B and latch receiver 157C. Extension pole 150 is similar to extension pole 140, but since pole 150 is foldable, it can be extended to a much longer length than a non-foldable pole, yet retain a compact carrying configuration.

FIG. 3F shows cord protector 160 having mechanical alignment pin pairs 162A and 162B and spring-loaded latch 162C. Cord protector 160 is used when an extension pole is to be used in an upright configuration, to protect cord 170 from being squashed by the weight of the extension pole when the extension pole rests against the ground or a hard surface.

FIG. 3G shows coiled cord 170 having electrical interfaces 171 and 172. Since the coiled cord can readily absorb tension forces, there is no need for a mechanical interface with alignment pins to protect the electrical interfaces on the ends of coiled cord 170.

FIG. 3H shows display module 180 having electrical interfaces 181, 182, 183. Interface 181 is a 5 pin interface, as described above. Interface 182 is for connection to a battery. Interface 183 is a 7 pin interface for not-yet-available components. Dimensions are 7.75"×6.6"×2", and weight is 3 lbs. The display component is a 6.4" active matrix TFT flat screen.

Figure 8A:
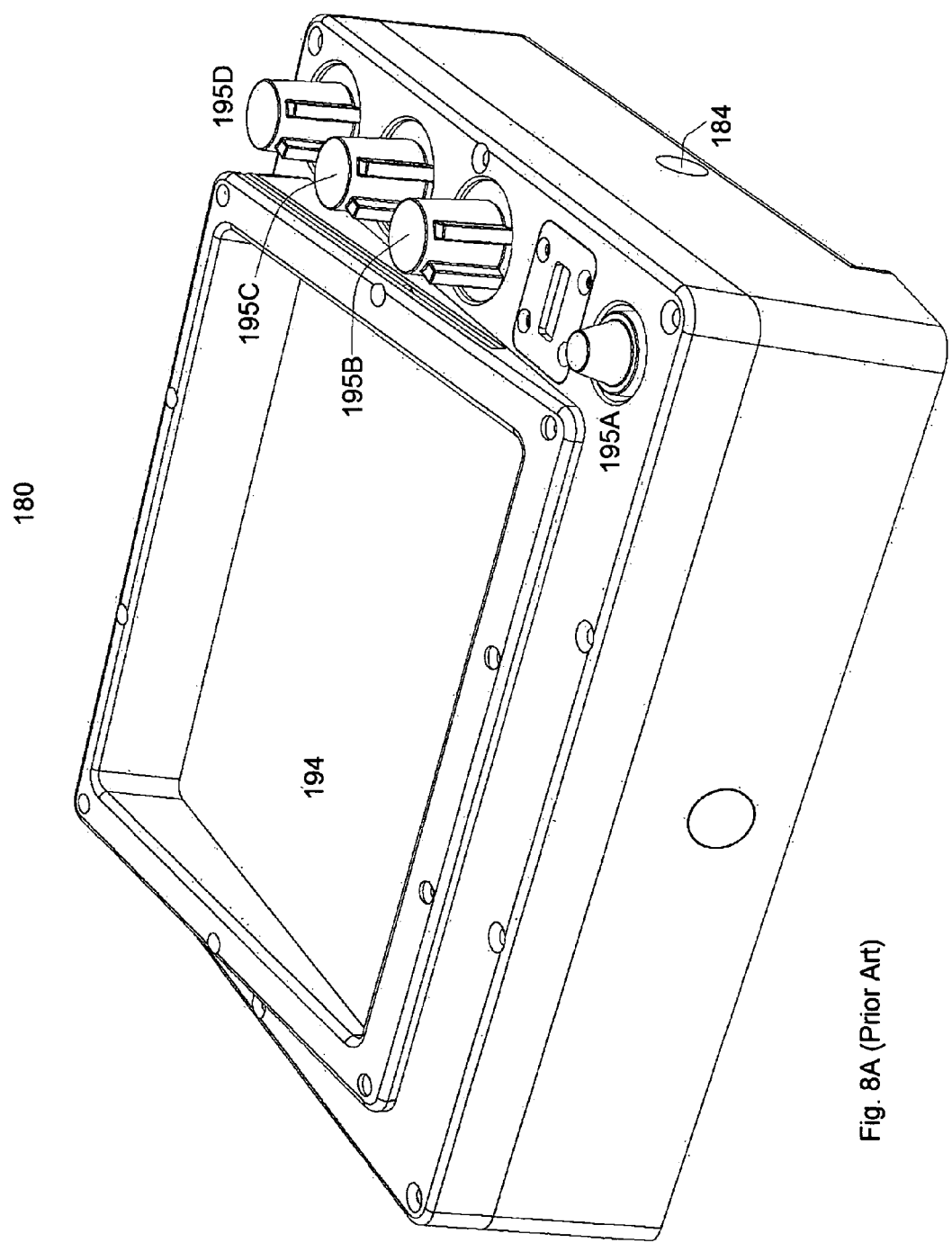
FIGS. 8A-8B are three-dimensional views of a display module.
Figure 8B:
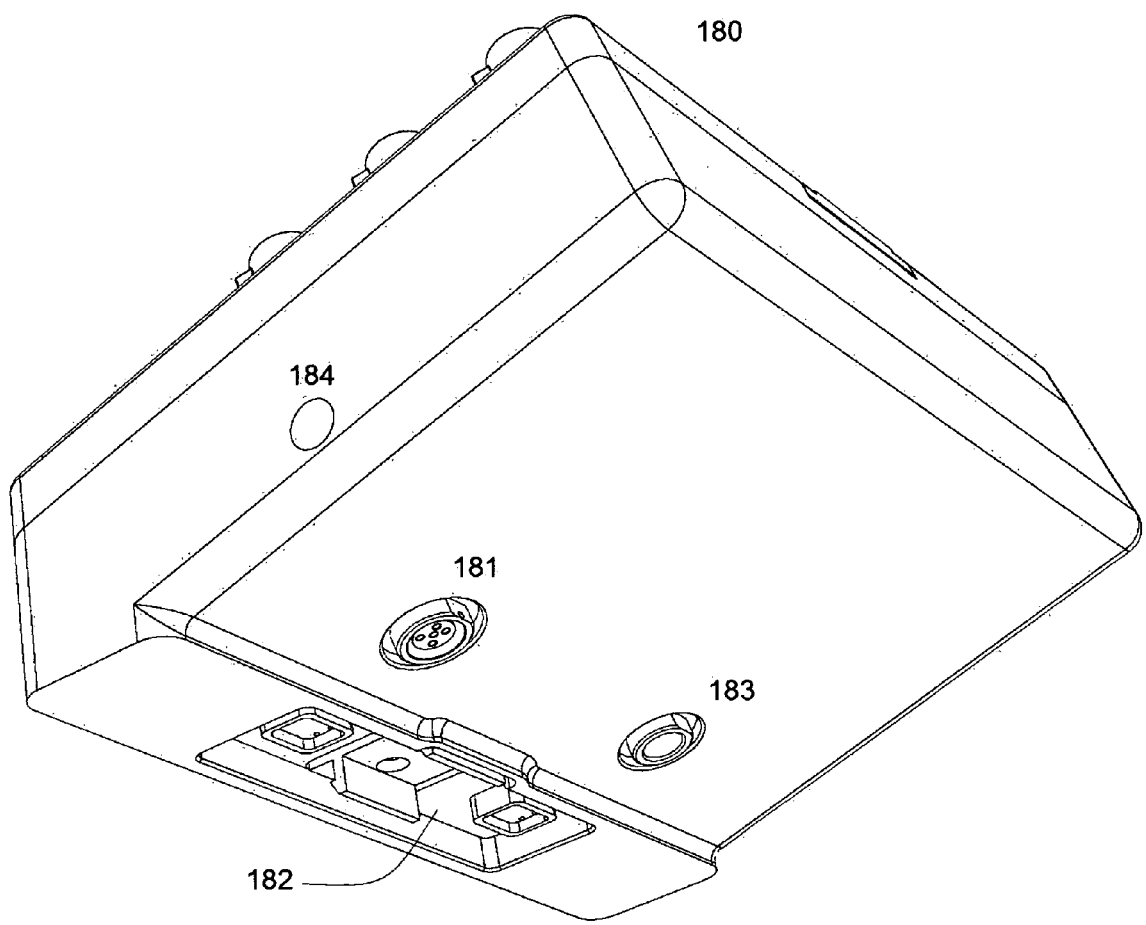

FIGS. 8A-8B are three-dimensional front and back views of display module 180, showing connector 184 for receiving a connector such as a pin on a harness; a similar connector is on the opposite side of display module 180, not visible in the views shown. FIG. 8A shows flat panel display 194, on/off knob 195A and control knobs 195B-D for controlling color, brightness and contrast.

FIG. 3I shows battery module 185. It is important that battery module 185 is external to display 180, as that way battery 185 can be changed in adverse conditions without sacrificing durability. That is, if the imaging system is being used in a rainy, dusty or sandy environment, an internal battery would require unsealing of the unit in which it is located, whereas an external battery does not require unsealing, and so prevents rain, dust or sand from being on the inside of a unit. Battery 185 has dimensions of 7.75"×3.4"×1.5" and weight of 2.2 lbs.

Another advantage of an external battery is that the type of battery and its size can be changed more readily than is possible with an internal battery. For example, an extended life battery can be bigger than a normal life battery.

A further advantage of an external battery is that, when coupled to a display module, the battery creates a ledge that, when worn against a user's chest, makes it easier for the user to view the display module in a hands-free manner.

The interface by which battery module 185 couples to a device is designed so that it has only one direction of proper fit.

Battery module 185 is designed to be used with a battery charger that plugs into an AC power source.

Figure 9A:
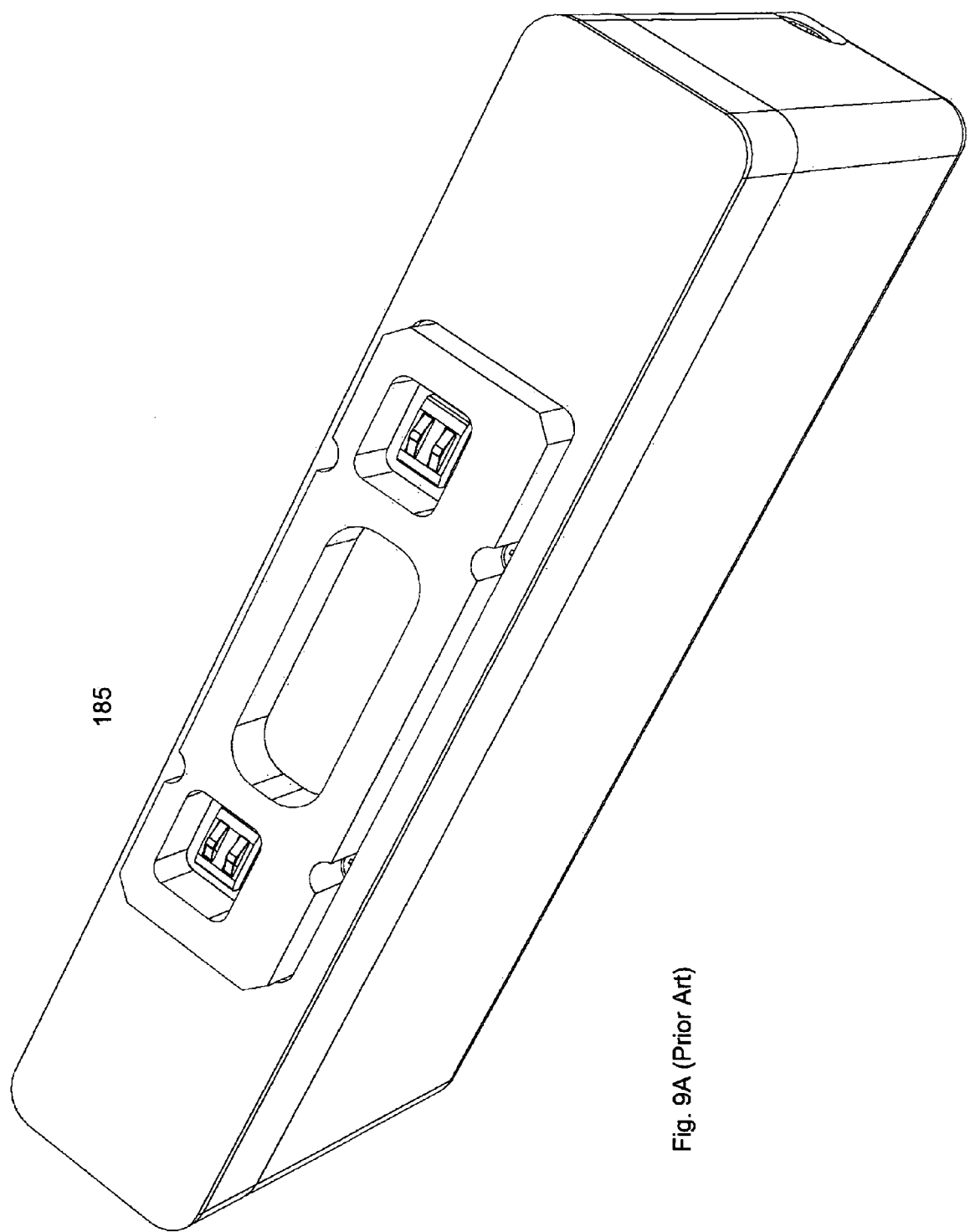
FIGS. 9A-9B are three-dimensional views of a battery module.
Figure 9B:
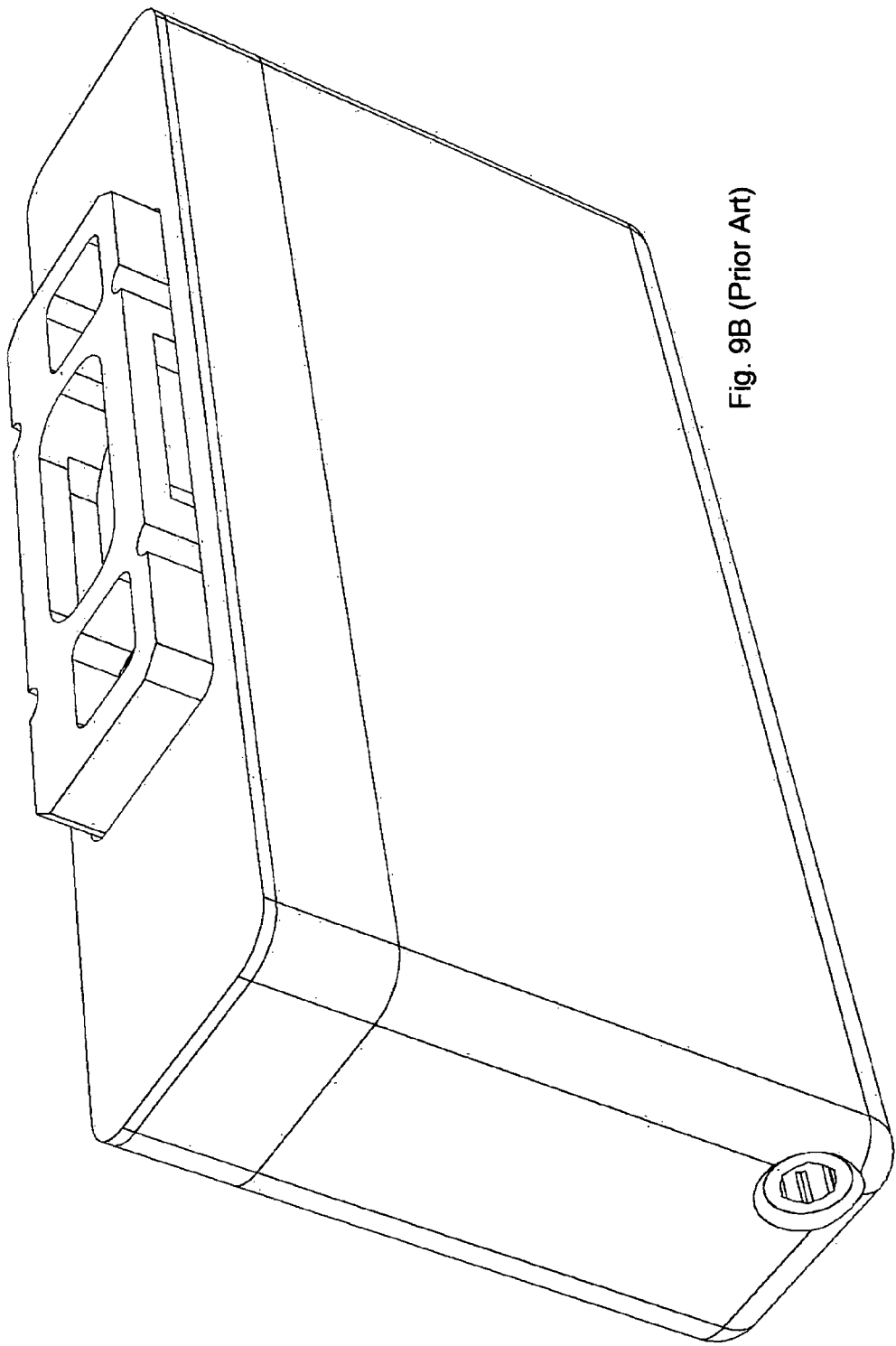

FIGS. 9A-9B are three-dimensional front and back views of battery module 185.

Figure 9C:
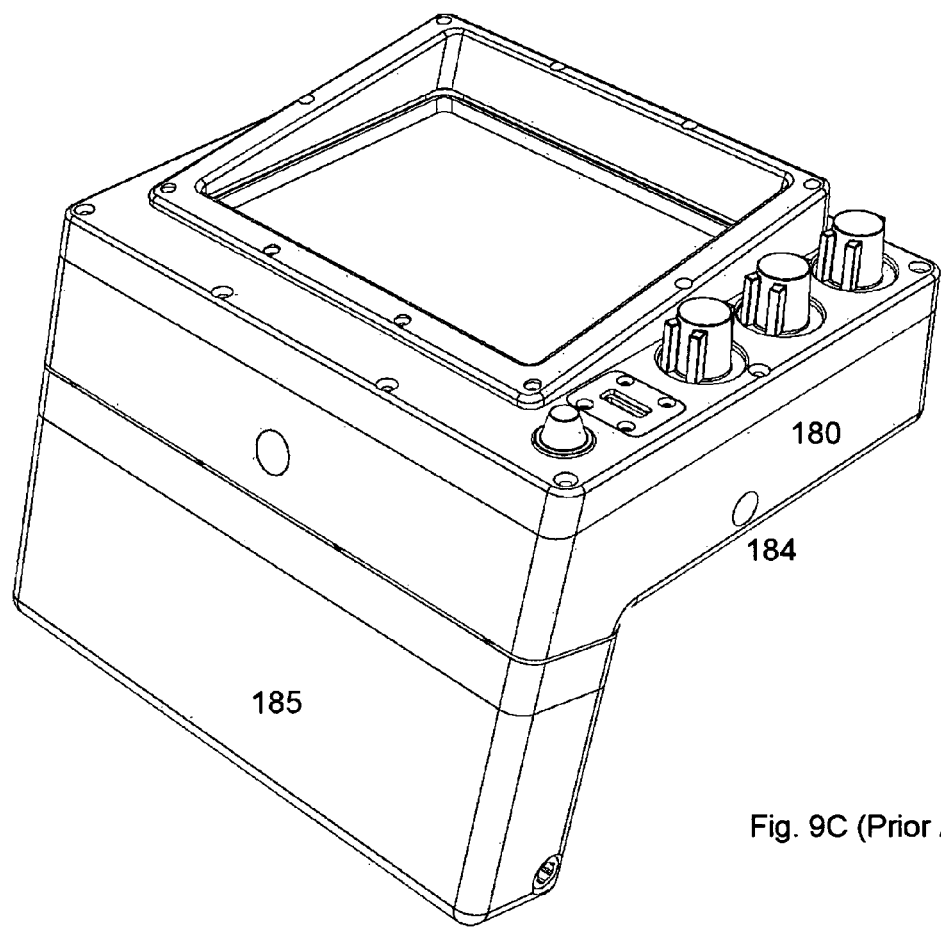
FIGS. 9C-9D are three-dimensional views of a display module connected to a battery module.
Figure 9D:
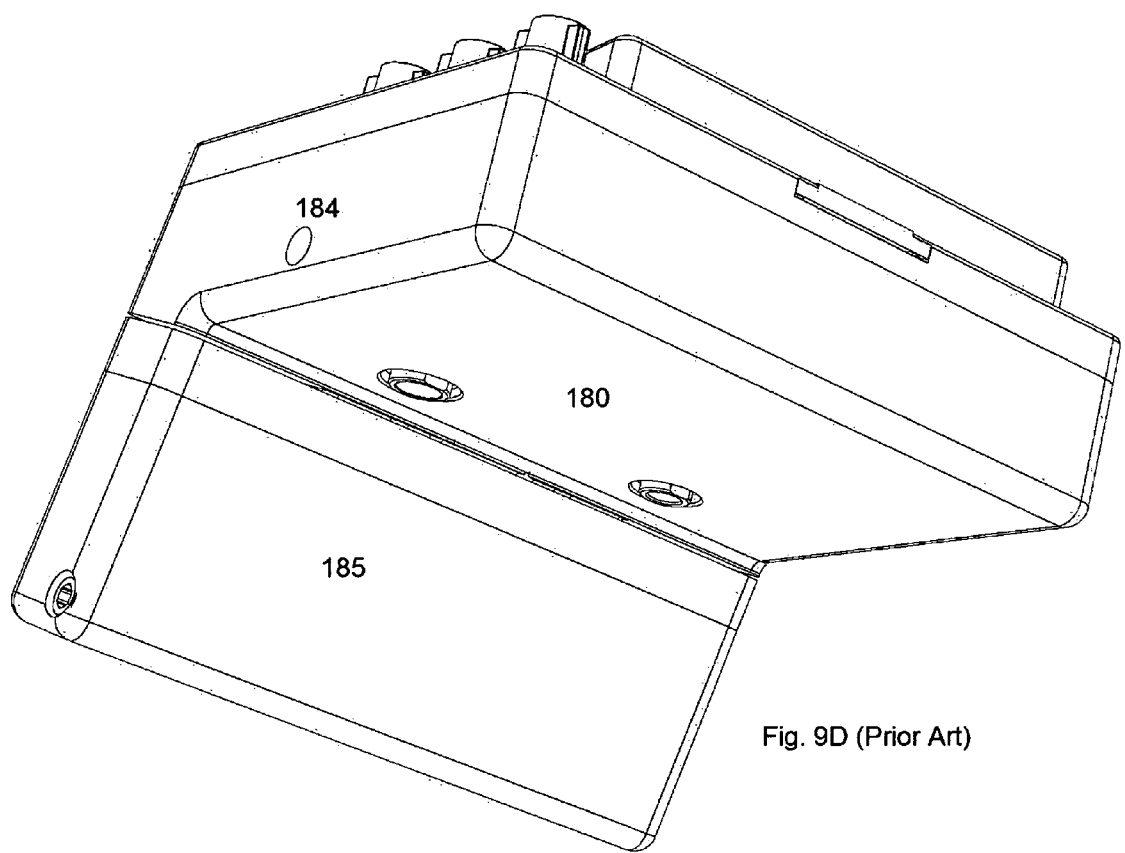

FIGS. 9C-9D are three-dimensional front and back views of display module 180 connected to battery module 185.

Figures 10A, 10B:
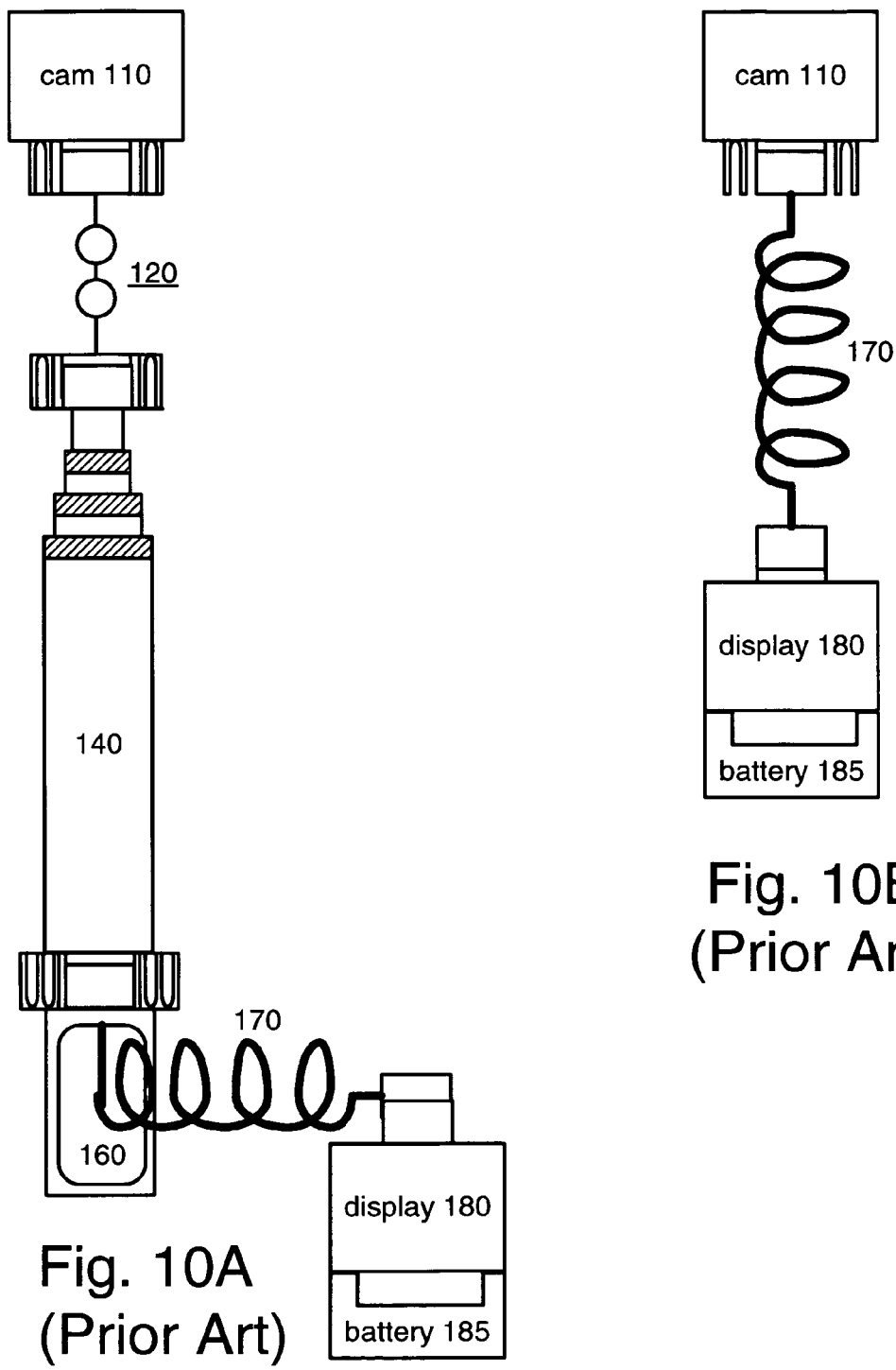
FIGS. 10A-10B show the components of FIGS. 3A-3I arranged in exemplary use configurations.

FIGS. 10A-10B show the components of FIGS. 3A-3I arranged in exemplary use configurations.

FIG. 10A shows camera module 110 connected to articulating module 120 that is connected to extension pole 140 that is connected to cord 170 and cord protector 160. Cord 170 is connected to display module 180 that is connected to battery 185. This is a typical configuration for positioning camera module 110 away from its user, such as in a shaft, under a vehicle, or around a corner. The user is assumed to wear display 180, such as in a chest harness, and observe the image picked up by camera module 110. Battery 185 provides power to display module 180 and to camera module 110.

FIG. 10B shows camera module 110 connected to cord 170 that is connected to display module 180 that is connected to battery 185. This configuration is similar to the configuration of FIG. 9A, except it does not include an extension pole.

FIGS. 11A-11I are block diagrams of components for wireless transmission in a modular imaging system. Table 2 lists the correspondence between Wolf Pack module names and reference numbers in the present application.

TABLE 2

| 200 | transmit module | A3d wireless transmit module |
|---|---|---|
| 210 | receiver module | A4d wireless receiver module |
| 220 | compact battery | P8d compact battery |
| 230 | interface module | AA1d interface module |
| 240 | interface module | AA2d interface module |
| 250 | interface module | AA3d interface module |
| 260 | dual power module | PA1d Siamese power connector |
| 280 | display accessory tray | DA3d accessory mounting plate |
| 290 | tripod | EA2d tripod |

Figure 11A:
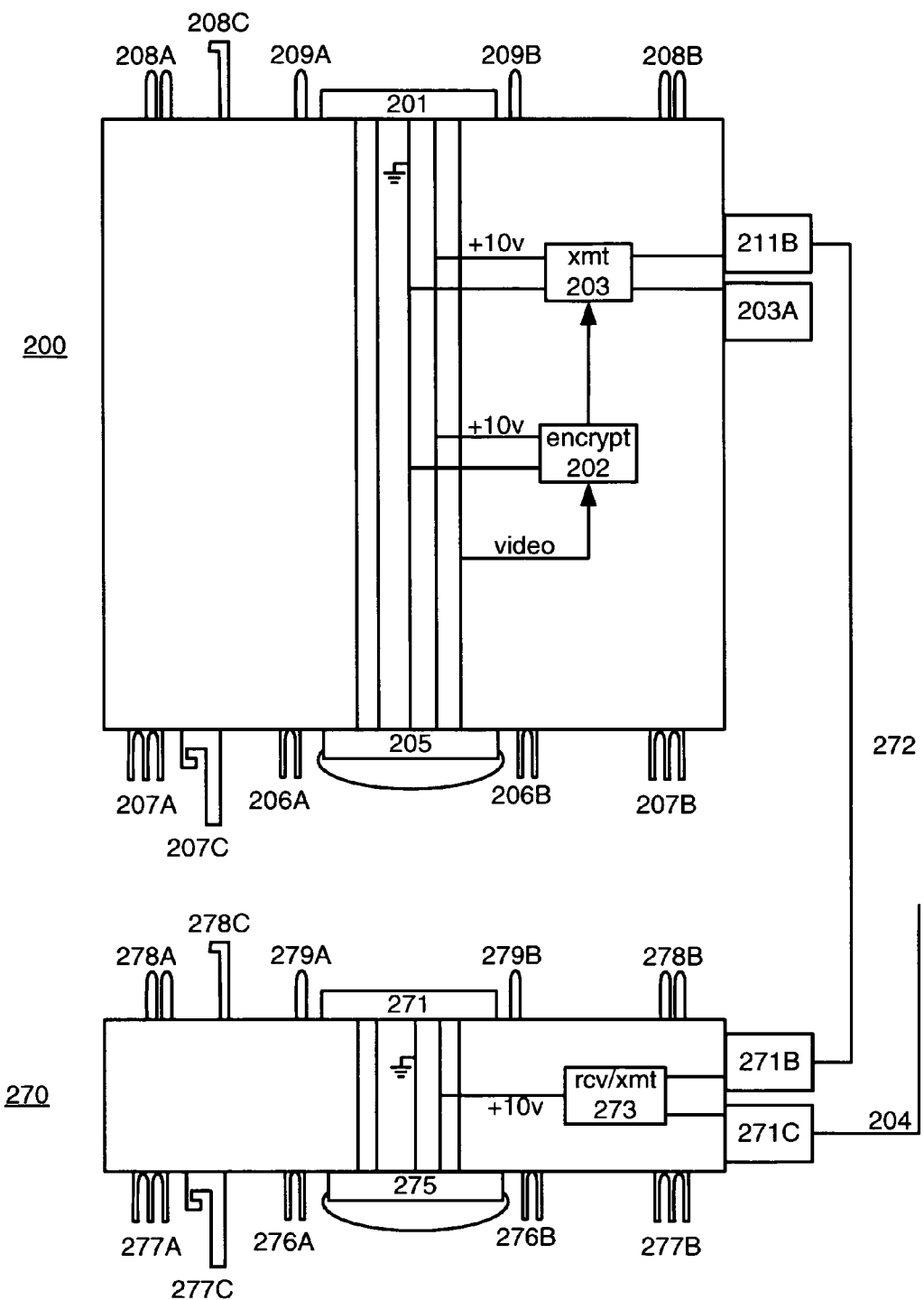
FIGS. 11A-11I are block diagrams of components for wireless transmission in a modular imaging system in accordance with the present invention.

FIG. 11A shows transmit module 200 having electrical interface 201 between two mechanical interfaces, and electrical interface 205 between two additional mechanical interfaces. Transmit module 200 enables an image picked up by a camera module to be transmitted to a remote location, either from the camera or from an intermediate display module.

Electrical interfaces 201 and 205 are each a 5 pin interface, with the pins arranged in a quincunx pattern. Interface 201 is male and interface 205 is female. One of the pins is used for an analog video signal. A second pin is used for a power signal. A third pin is used as a power and/or video ground. The fourth and fifth pins are reserved for future use, in particular, for data. Each of the pins in interfaces 201, 205 is connected to the corresponding pin in the other of interfaces 201, 205, so that the signals can originate from either interface.

The video signal input to transmit module 200 is supplied to encryption circuit 202, which uses any suitable encryption method to provide an encrypted video signal. In some embodiments, encryption circuit 202 is omitted. In other embodiments, encryption circuit 202 is provided as a software program executing on a general purpose processor.

The encrypted video signal is supplied from encryption circuit 202 to transmission circuit 203, which converts the baseband encrypted signal to a high frequency signal for wireless transmission. Typically, the high frequency signal is a channel at 900 MHz, 2.4 GHz, or 5.8 GHz but any suitable frequency may be used. Transmission circuit 203 is manually controlled by channel selector 203A, that is, the user can select the transmission frequency. Channel selector 203A may be a knob, control screw, or any other suitable mechanism. Transmission circuit 203 provides the high frequency signal to antenna port 211B for wireless transmission. In some embodiments, antenna 204 is connected directly to antenna port 211B. Any suitable antenna may be used. In some embodiments, antenna 204 is internal to transmit module 200. In the embodiment shown, antenna port 211B is connected to cable 272 and thence to signal booster 270, discussed below, which is connected to antenna 204.

Two mechanical interfaces surround each of electrical interfaces 201, 205, so that transmit module 200 may connect directly to a wider range of modules. Additionally, as described below, interface modules are provided to further extend the connection options for transmit module 200. In some embodiments, transmit module 200 has zero or one mechanical interface per electrical interface; the number of mechanical interfaces per electrical interface may differ between electrical interfaces 201, 205.

Electrical interface 201 is between a first mechanical interface comprising alignment pins 209A and 209B, and a second mechanical interface comprising alignment pin pairs 208A, 208B and spring-loaded latch 208C. The first mechanical interface is for connection to, e.g., articulating module 120. The second mechanical interface is for connection to, e.g., the bottom of extension pole 140.

Electrical interface 205 is between a first mechanical interface comprising alignment pin receptacles 206A and 206B, and a second mechanical interface comprising alignment pin receptacle pairs 207A, 207B and latch receptacle 207C. The first mechanical interface is for connection to, e.g., the top of extension pole 140. The second mechanical interface is for connection to, e.g., compact battery 220.

Signal booster 270 serves to boost its input signal from about 10 mwatts to 1 watt. The input to signal booster 270 is the high frequency signal from transmitter module 200. The output of signal booster 270 is provided to antenna 204. Signal booster 270 is designed to be plugged into transmitter module 200, and so has similar electrical and mechanical interfaces, not discussed here for brevity.

Figure 12B:
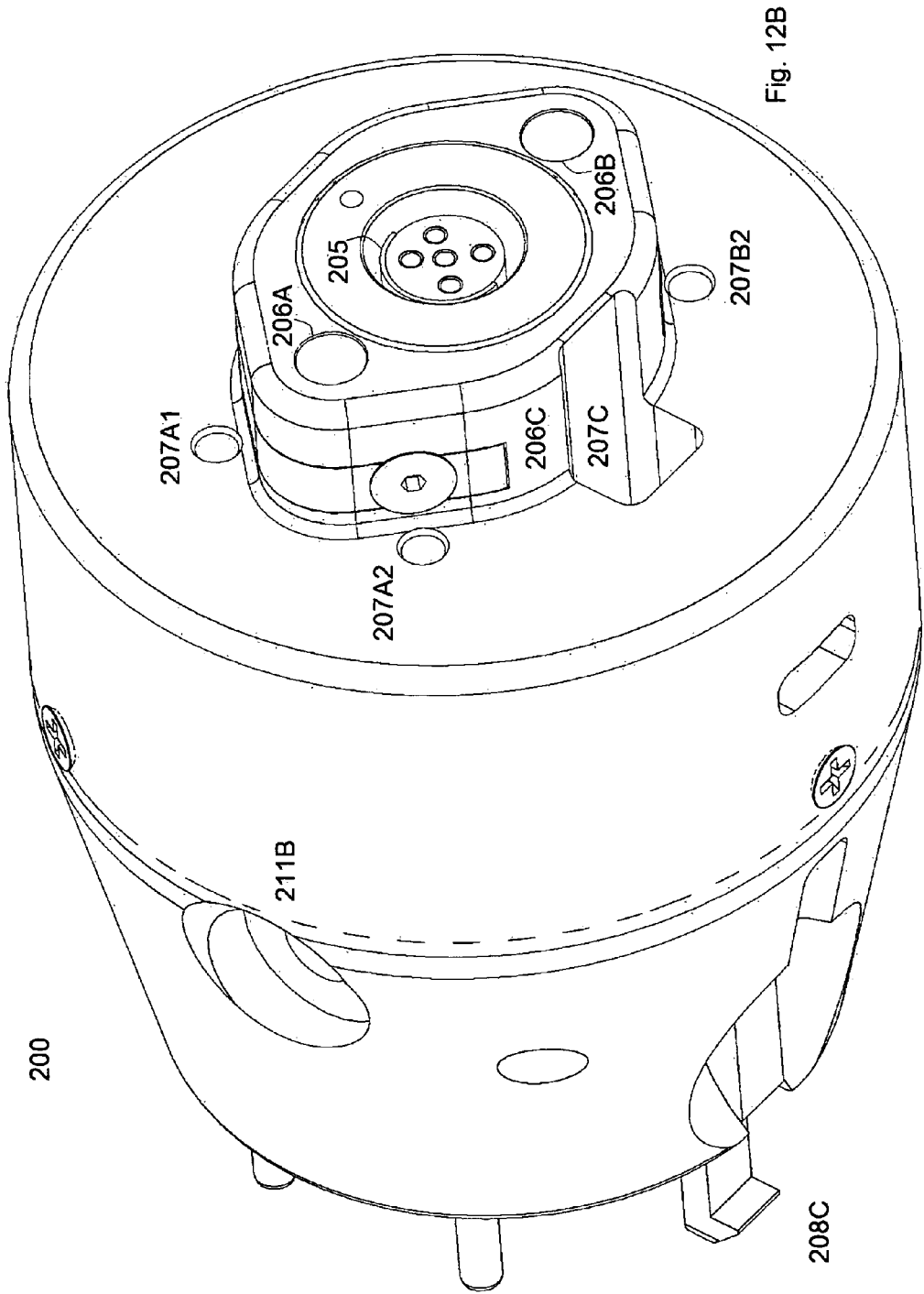

FIGS. 12A-12B are three-dimensional front and back views of wireless transmitter module 200. Antenna port 211B is located on the opposite side of module 200 from channel selector 203A.

Figure 11B:
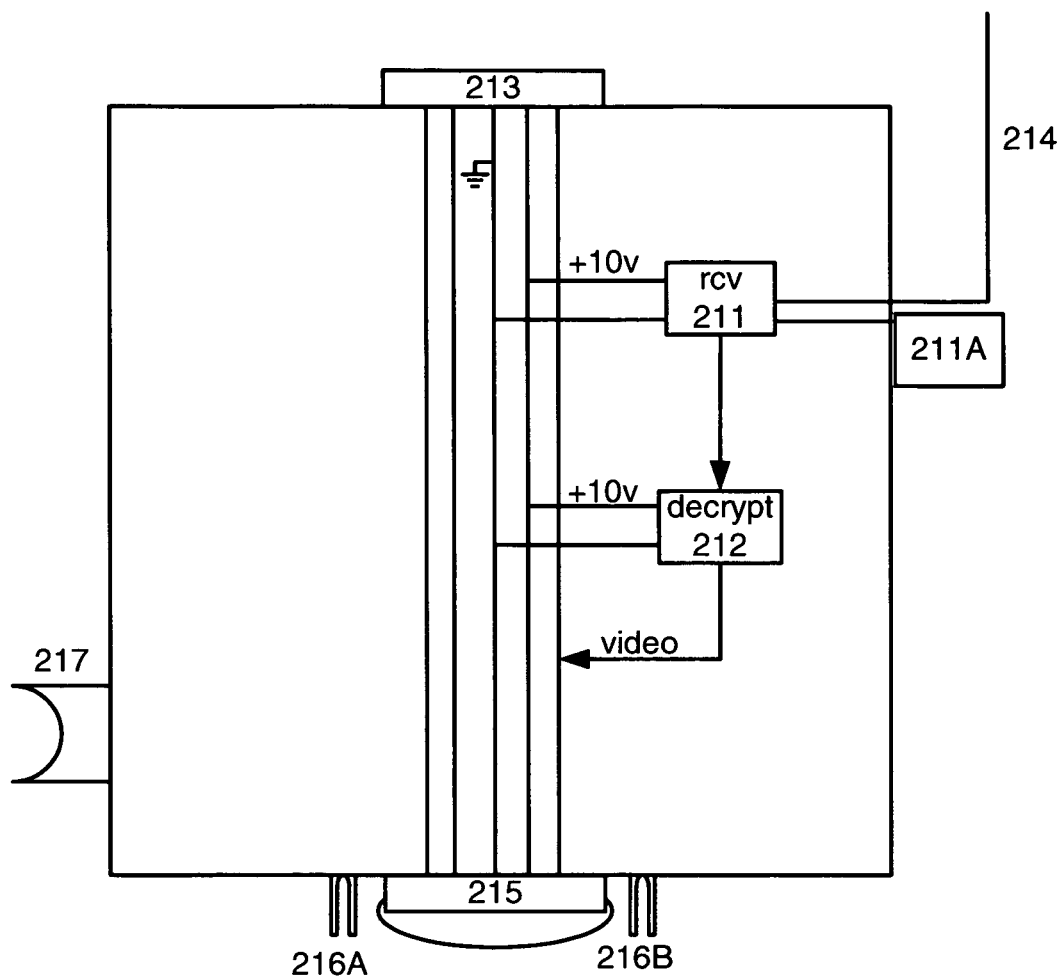

FIG. 11B shows receiver module 210 having optional electrical interface 213, and electrical interface 215 between a mechanical interface comprising alignment pin receivers 216A, 216B, for connection to, e.g., the top of extension pole 140, or cord 170. Receiver module 210 enables an image picked up by a camera module to be received at a remote location, either from the camera or from an intermediate display module.

Electrical interfaces 213 and 215 are each a 5 pin interface, with the pins arranged in a quincunx pattern, as discussed above.

A high frequency signal from transmit module 200 is received at antenna 214, and provided to receiver circuit 211 which converts the received signal from a high frequency signal to a baseband signal, and provides the baseband signal to decryption circuit 212. Typically, the high frequency signal is a channel at 900 MHz, 2.4 GHz, or 5.8 GHz, but any suitable frequency may be used. Receiver circuit 211 is manually controlled by channel selector 211A, that is, the user can select the reception frequency. Channel selector 211A may be a knob, control screw, or any other suitable mechanism.

Decryption circuit 212 uses any suitable decryption method to provide a decrypted video signal. In some embodiments, decryption circuit 212 is omitted. In other embodiments, decryption circuit 212 is provided as a software program executing on a general purpose processor.

Orientation pin receptacle 217 is provided on one side of receiver module 210, to facilitate coupling with display tray 280 (discussed below).

Figure 13B:
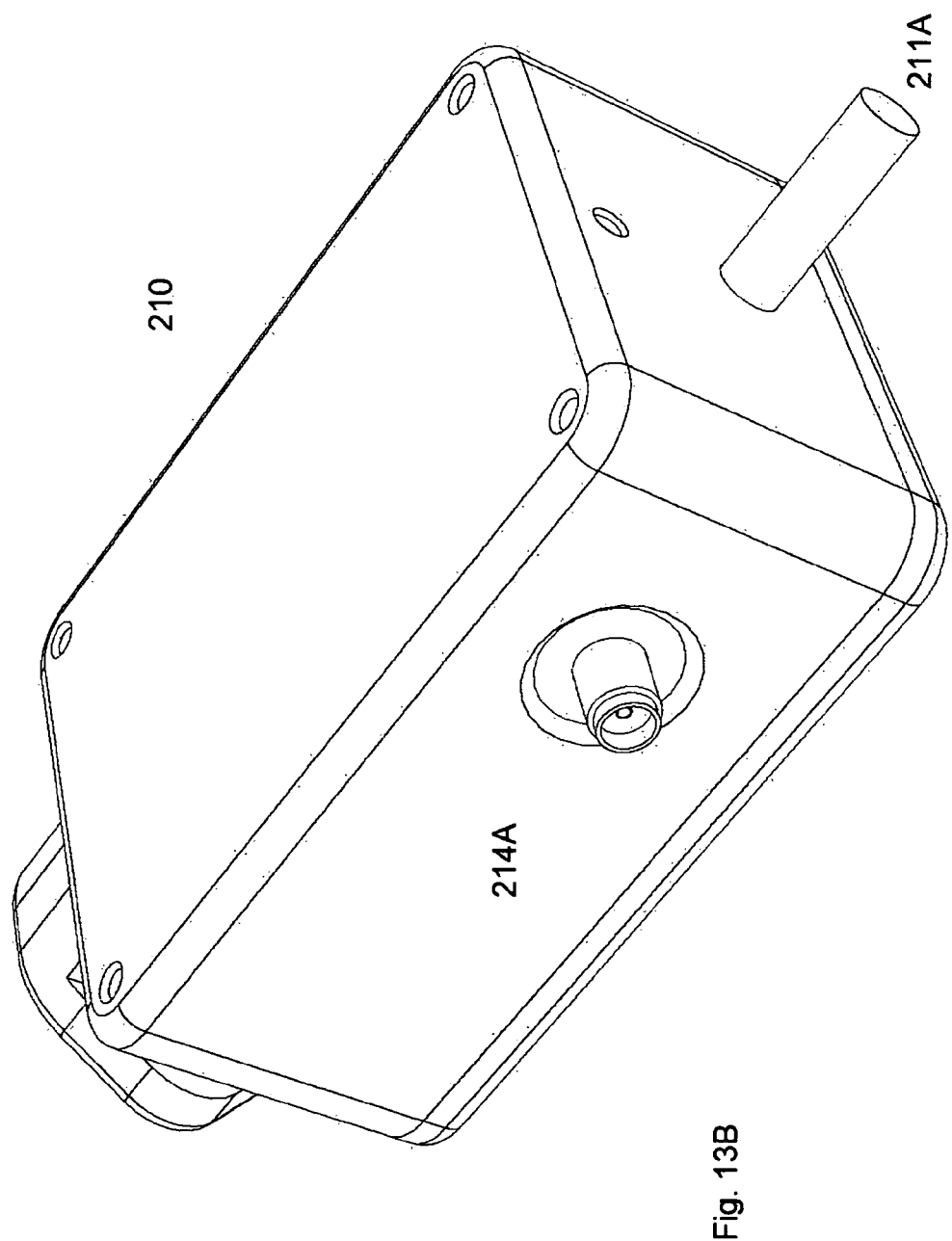

FIGS. 13A-13B are three-dimensional front and back views of wireless receiver module 210. Antenna port 214A is located on the side of module 210.

Figure 11C:
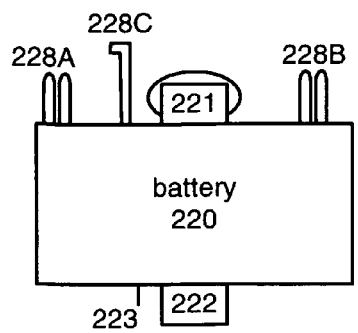

FIG. 11C shows compact battery 220 having male electrical interface 221 between alignment pin pairs 228A, 228B and spring-loaded latch 228C, and having female electrical interface 222 and on/off switch 223. Compact battery 220 is designed to accept AA batteries, such as NiMH, LiIon, alkaline AA, rechargeable AA batteries or other AA batteries. Compact battery 220 is external to any module it connects to, for enhanced reliability, that is, an external battery avoids getting rain, sand or dust in an internal battery receptacle. Compact battery 220 is adapted to be placed directly into a charger that is connected to AC power, so that the batteries inside compact battery 220 can be charged while they are inside compact battery 220.

Figure 14B:
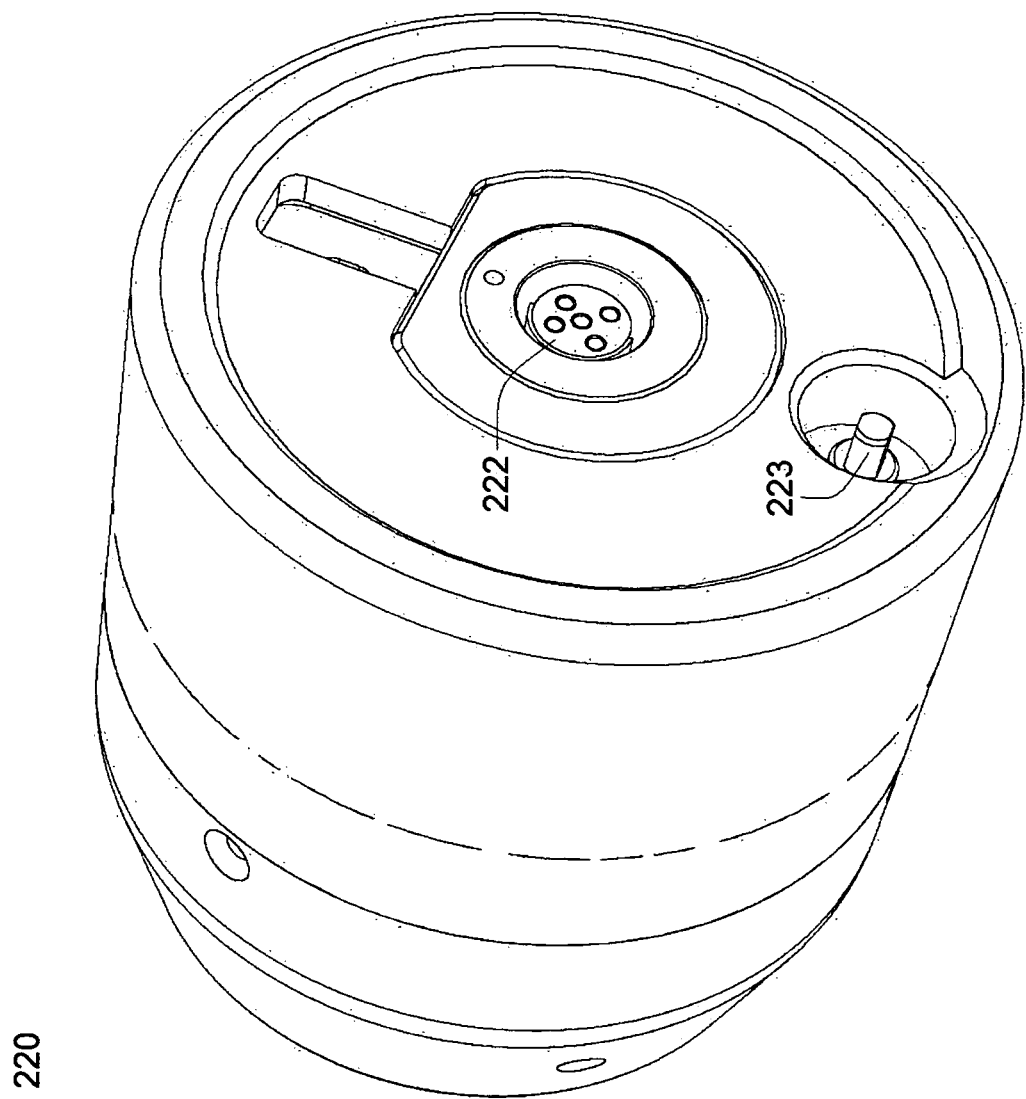

FIGS. 14A-14B are three-dimensional front and back views of compact battery 220.

Figure 14D:
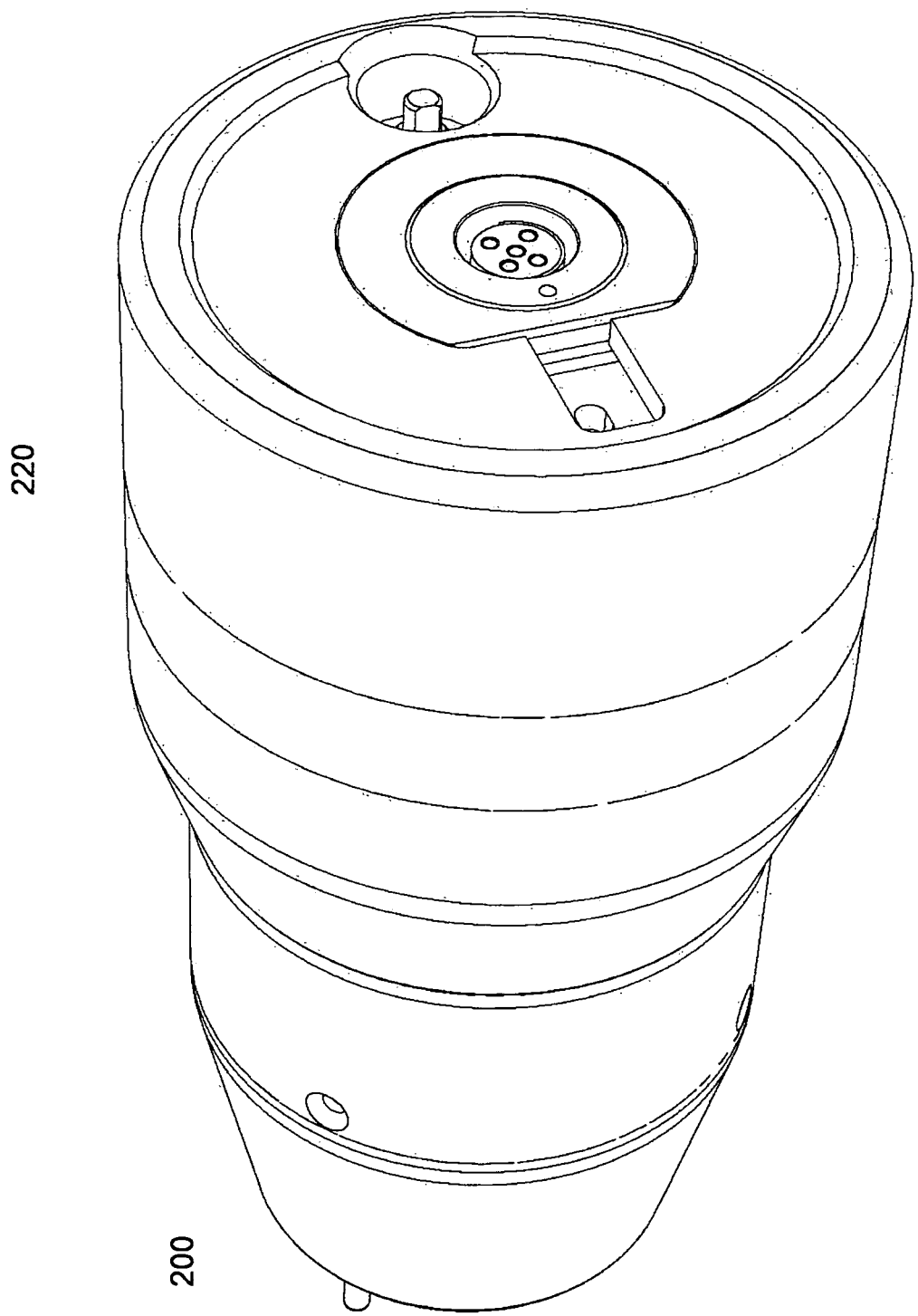

FIGS. 14C-14D are three-dimensional front and back views of transmitter module 200 connected to compact battery 220.

Interface modules 230, 240, 250 are discussed below. Each of these modules has two electrical interfaces, each electrical interface having five pins arranged in a quincunx pattern, as described above.

Figure 11G:
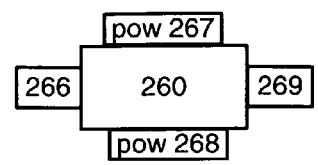
Figure 11D:
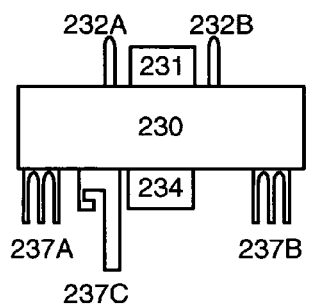

FIG. 11D shows interface module 230 having male electrical interface 231 between alignment pins 232A, 232B that use a secondary interlock mechanism discussed below. Interface module 230 is the first component to use this secondary interlock mechanism. Other components of the present modular imaging system will also be manufactured with the secondary interlock mechanism. Interface module 230 also has female electrical interface 234 located between alignment pin receptacle pairs 237A, 237B and latch receptacle 237C.

FIGS. 15A-15B are three-dimensional front and back views of interface module 230.

Figure 11E:
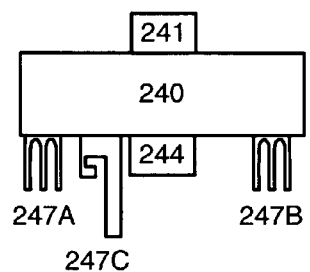

FIG. 11E shows interface module 240 having female electrical interface 241, and female electrical interface 244 between alignment pin receptacle pairs 247A, 247B and latch receptacle 247C.

Figure 11F:
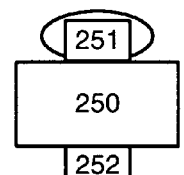

FIG. 11F shows interface module 250 having hooded electrical interface 251, and electrical interface 252.

FIG. 11G shows dual power module 260 having electrical interfaces 266, 269, each electrical interface having five pins arranged in a quincunx pattern, as described above, and also having battery interfaces 267, 268 adapted for connection to battery 185, discussed above.

Battery life depends on the age of the battery, the usage environment, and what is connected to the battery. For display module 180, battery 185 lasts around 5-10 hours. For wireless receiver module 210, battery 185 provides power for about 6-8 hours. When using transmitter module 200 in unattended operation, such as with extension pole 140, as a temporary wireless transmitter tower, it is desirable to have a longer unattended time than is possible with one battery. Dual power module 260 enables two instances of battery 185 to be used in conjunction with a third battery, such as compact battery 220, providing power for up to 27 hours. This is particularly useful for unattended surveillance.

Instances of dual power module 260 can be connected in daisy-chain fashion, to provide power to a device or devices for still longer amounts of time.

Figure 11H:
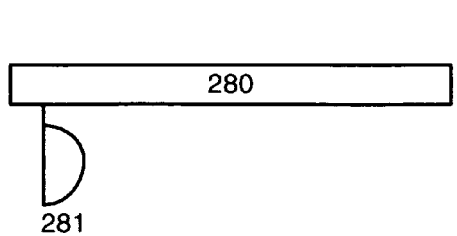

FIG. 11H shows display accessory tray 280 adapted to be coupled to the bottom of display 180, so that accessories can be conveniently attached to display 180, such as wireless receiver module 210. Display accessory tray 280 has orientation pin 281 that fits into orientation pin receptacle 217 of receiver module 210.

FIGS. 16A-16D are three-dimensional top, front, bottom and side views of display accessory tray 280.

Figure 16A:
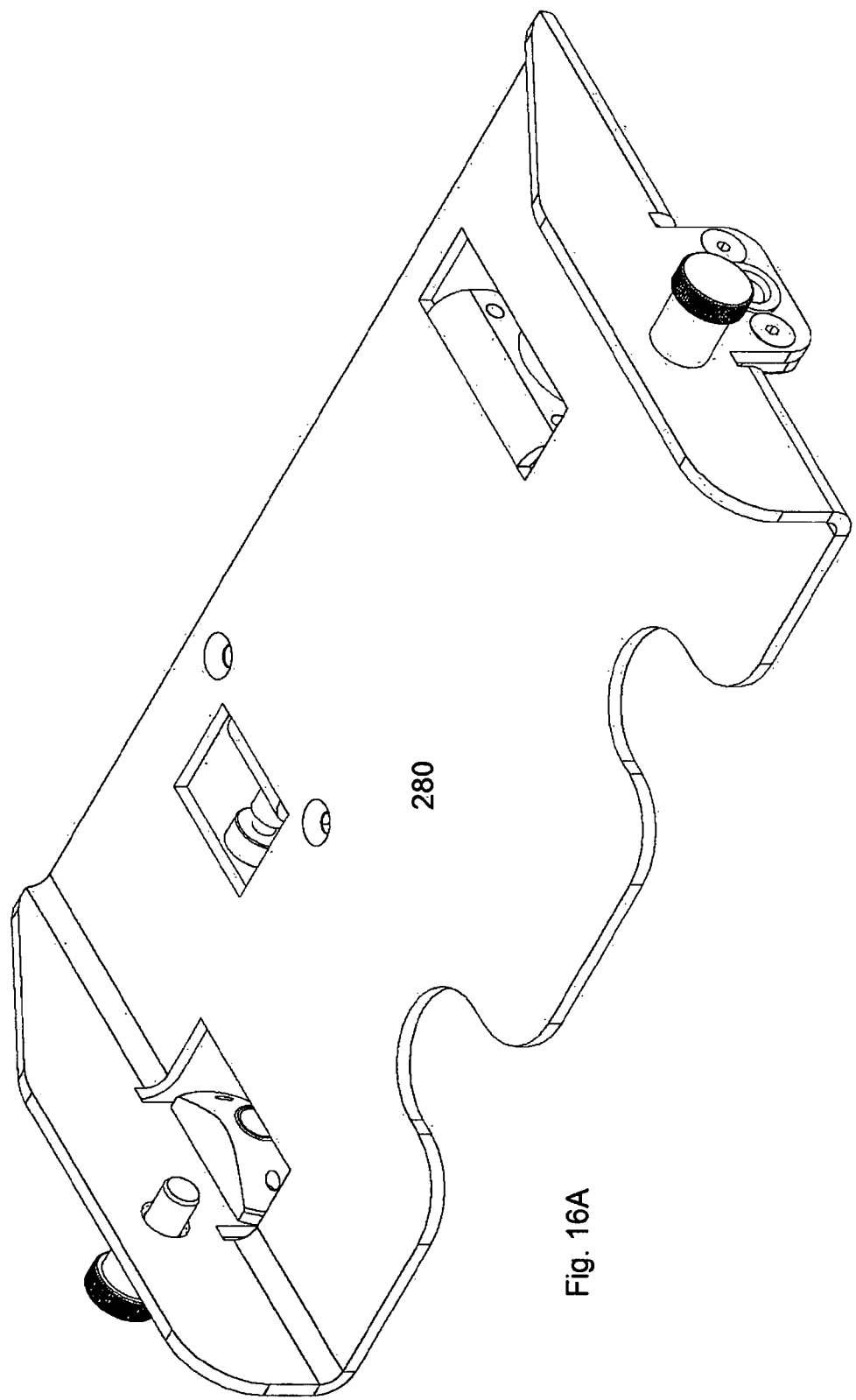
Figure 16B:
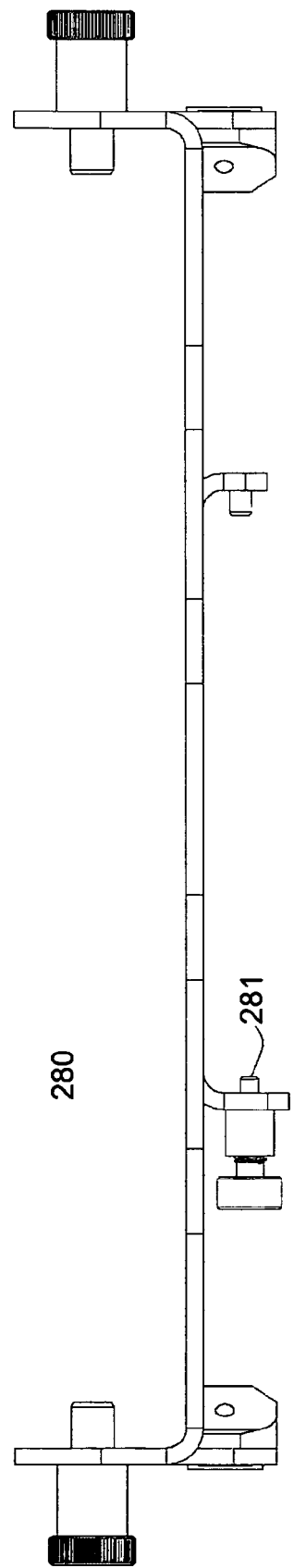
Figure 16E:
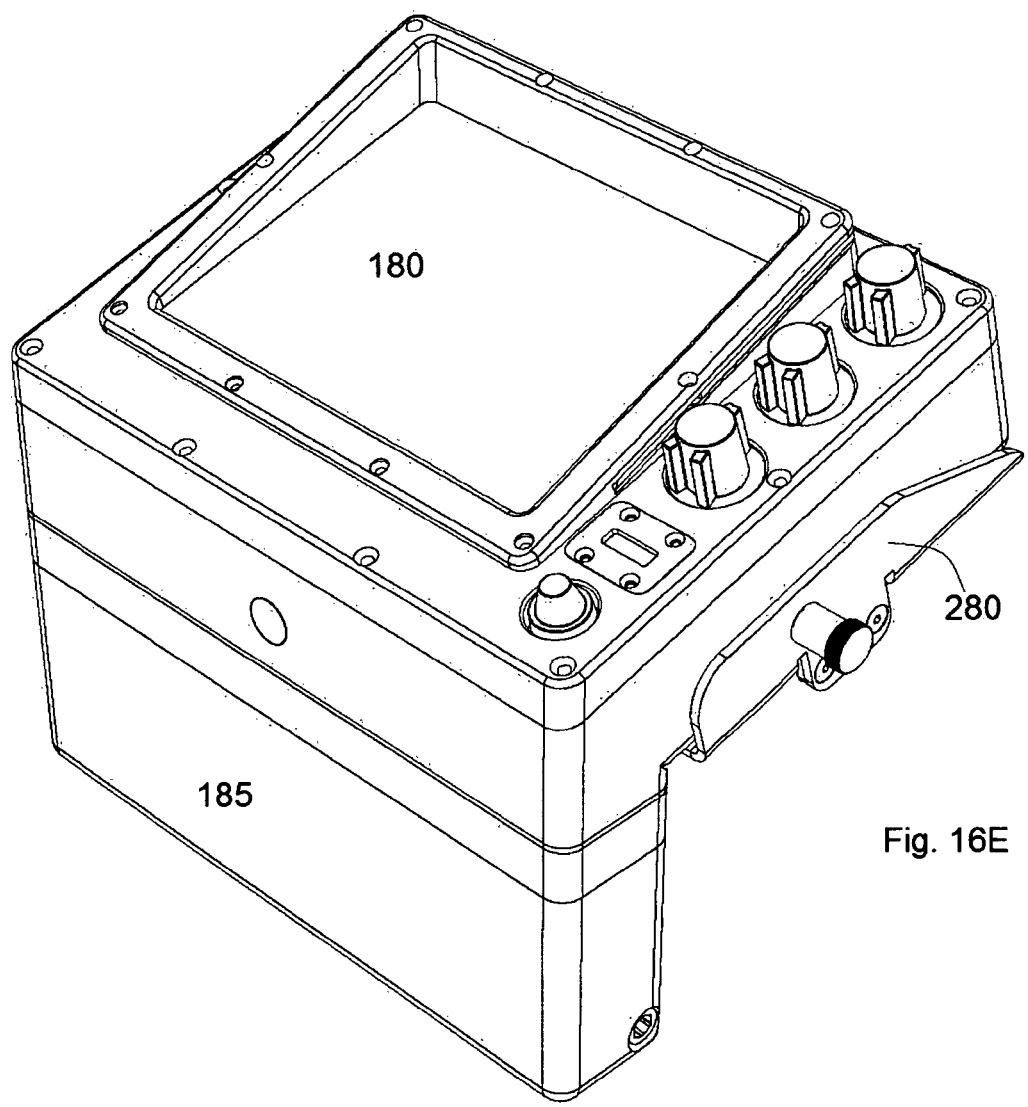
FIG. 16E is a three-dimensional view of an accessory tray connected to a display module.

FIG. 16E is a three-dimensional front view of display accessory tray 280 connected to display module 180 that is connected to battery 185.

Figure 16F:
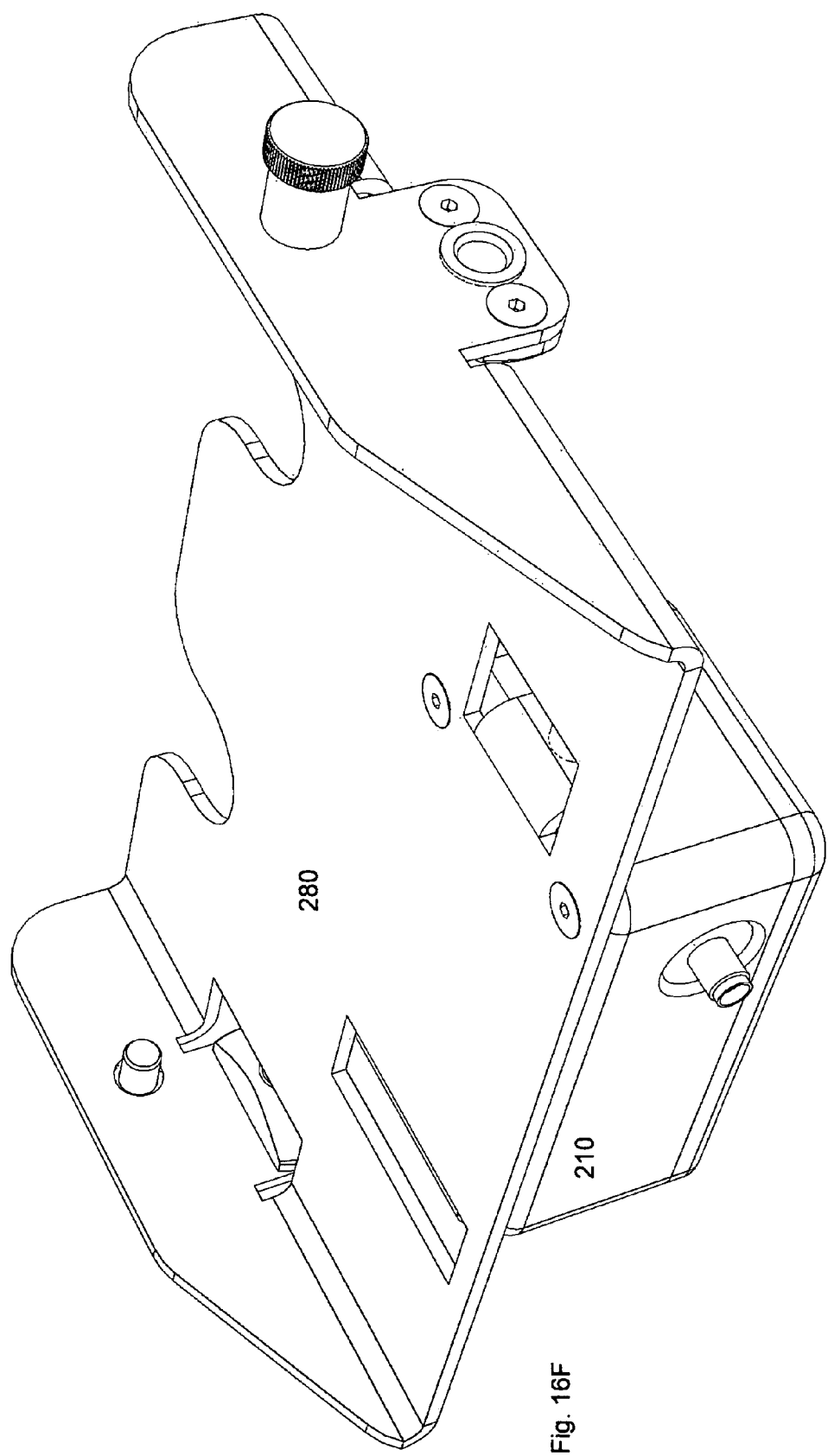

FIGS. 16F-16G are three-dimensional top and bottom views of display accessory tray 280 connected to wireless receiver module 210.

Figure 16H:
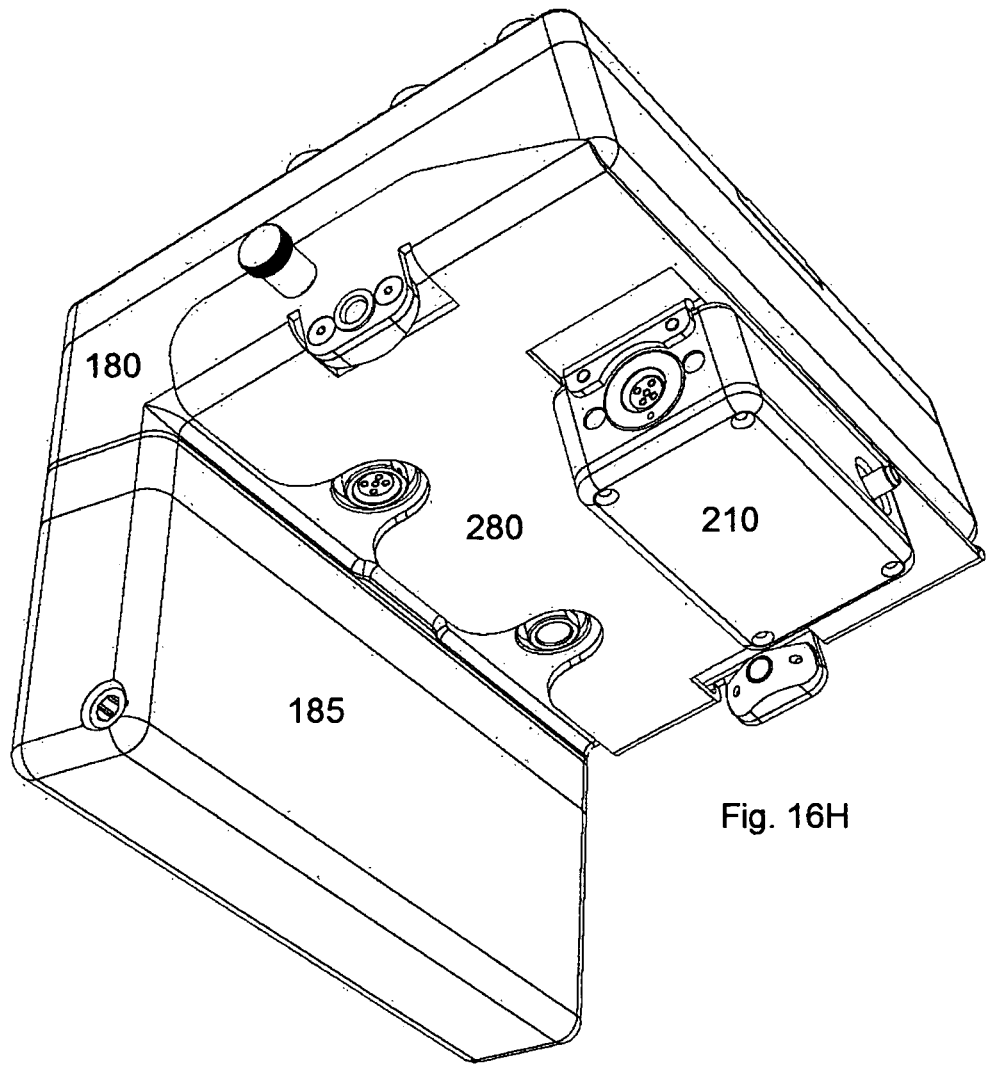
FIG. 16H is a three-dimensional view of an accessory tray connected to a display module and a wireless receiver module.

FIG. 16H is a three-dimensional bottom view of display accessory tray 280 connected to display module 180 and wireless receiver module 210; display 180 is also connected to battery 185.

Figure 11I:
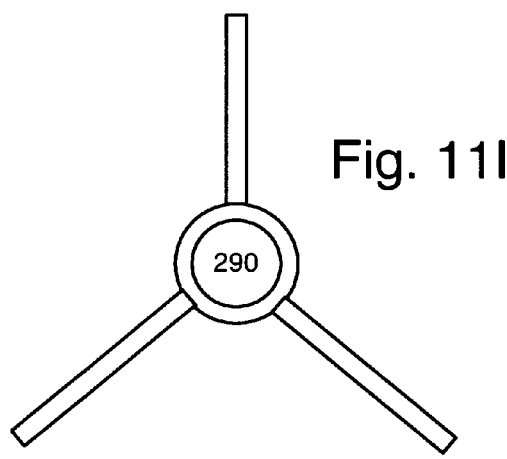

FIG. 11I shows tripod 290 adapted to hold extension pole 140 in an upright position using a cam lock mechanism, thus enabling extension pole 140 to serve as an antenna mast.

Figure 17B:
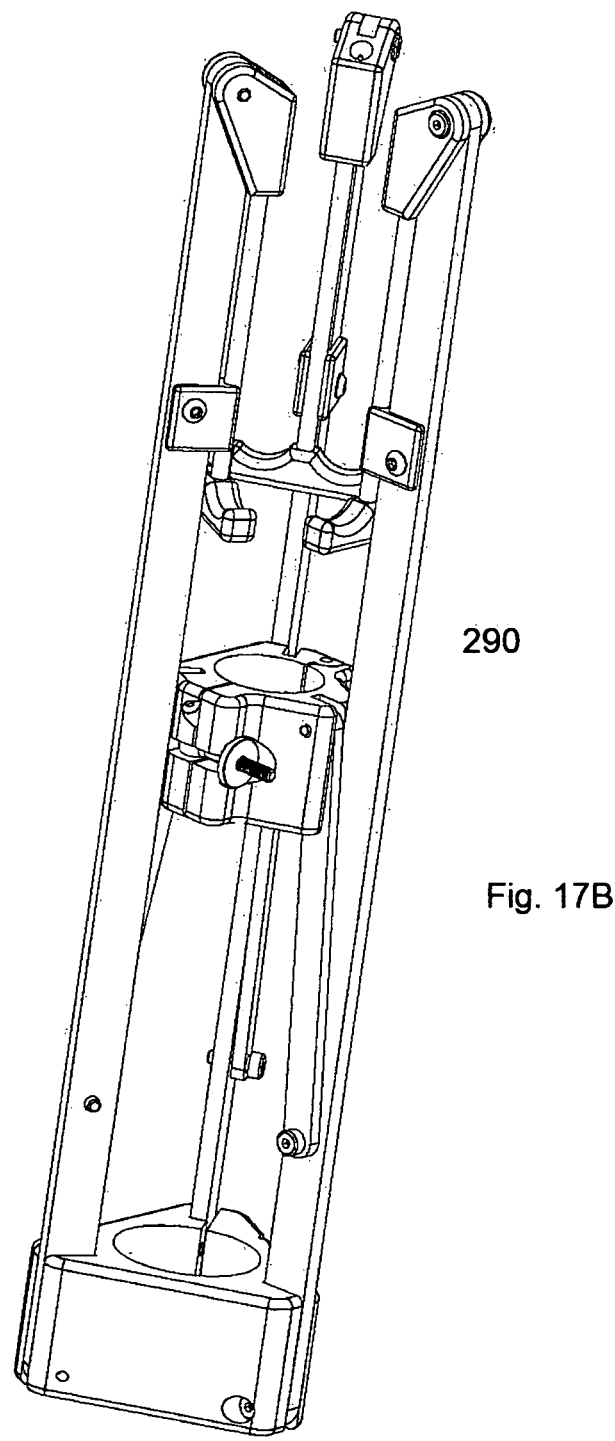

FIGS. 17A-17B are three-dimensional unfolded and folded views of tripod 290. Legs 291A, 291B, 291C have ground spikes 295A, 295B, 295C, respectively, that fold into ground spike holders 296A, 296B, 296C. In some embodiments, the ground spikes are omitted. Tripod 290 has top collar 293 that slides up and down an extension pole (not shown) equipped with latch lever 298 for tightening top collar 293 when it is at a suitable position. Tripod 290 has bottom collar 294 with a lever lock (not shown) to clamp the bottom of an extension pole in place. Tripod 290 is designed to fold around extension pole 140 while connected thereto, for ease in carrying. Tripod 290 raises the bottom of extension pole 140 from the ground or other surface, thereby protecting any coiled cable plugged into the bottom of extension pole 140 without need for a cord protector module.

FIGS. 18A-18H are block diagrams showing the components of FIGS. 3A-3I and 11A-11I arranged in exemplary transmit configurations.

Figure 18A:
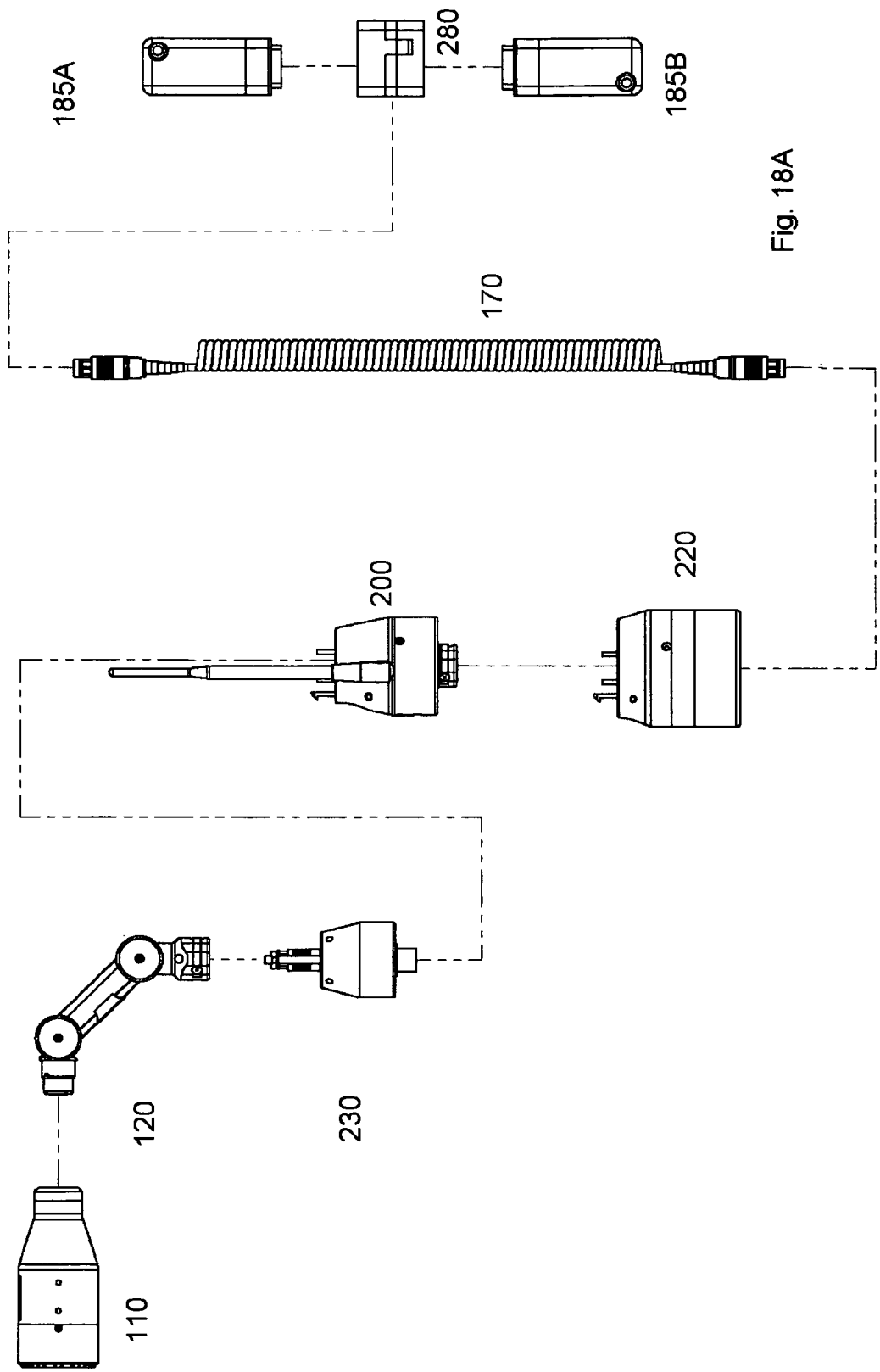

FIG. 18A shows camera module 110 connected to articulating module 120 connected to first interface module 230 connected to wireless transmitter 200 connected to compact battery 220 connected to cord 170 connected to dual power module 260 that is connected to two instances of battery 185. An alternative form of this configuration omits cord 170, dual power module 260 and both instances of battery 185. This configuration is useful in confined space environments and in covert operations where a user may want to hide or camouflage the transmission/camera assembly.

FIG. 18B shows camera module 110 connected to articulating module 120 connected to a first instance of cord 170 connected to second interface module 240 connected to wireless transmitter 200 connected to compact battery 220 connected to a second instance of cord 170 connected to dual power module 260 that is connected to two instances of battery 185. An alternative form of this configuration omits cord 170, dual power module 260 and both instances of battery 185. This configuration is useful as described above with the added benefit of optimizing transmitter position. In applications where users want to mount a camera on the manipulator arm of a robot, this configuration reduces the payload size and weight allowing use on lighter weight robots. The bearing weight further reduced by using interface module 250 instead of the articulation shown.

FIG. 18C shows camera module 110 connected to articulating module 120 connected to first interface module 230 connected to wireless transmitter 200 connected to extension pole 140 connected to compact battery 220 connected to cord 170 connected to dual power module 260 that is connected to two instances of battery 185. An alternative form of this configuration omits cord 170, dual power module 260 and both instances of battery 185. This configuration is useful for optimized transmission by using the extension pole as a transmission mast.

FIG. 18D shows camera module 110 connected to articulating module 120 connected to extension pole 140 connected to wireless transmitter 200 connected to compact battery 220 connected to cord 170 connected to dual power module 260 that is connected to two instances of battery 185. An alternative form of this configuration omits cord 170, dual power module 260 and both instances of battery 185. In two-person team environments, the use of a coiled connecting cable between the search pole and display assembly can be problematic. This configuration allows greater freedom of movement and wireless connection to display assemblies worn by additional team members.

Figure 18E:
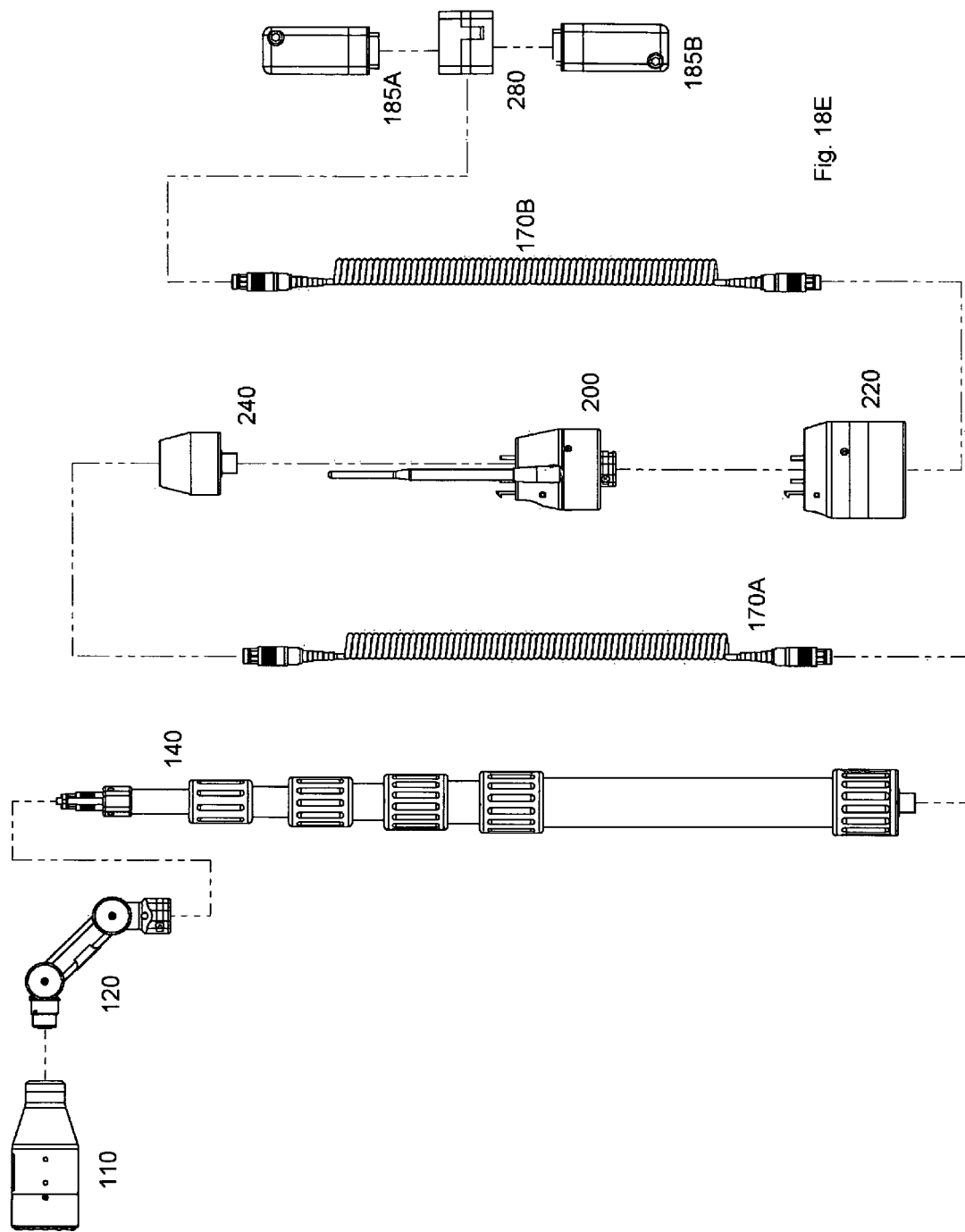

FIG. 18E shows camera module 110 connected to articulating module 120 connected to extension pole 140 connected to a first instance of cord 170 connected to second interface module 240 connected to wireless transmitter 200 connected to compact battery 220 connected to a second instance of cord 170 connected to dual power module 260 that is connected to two instances of battery 185. This configuration is useful in environments where camera is more usefully placed on a search pole with transmission optimized by placing transmitter independently.

Figure 18F:
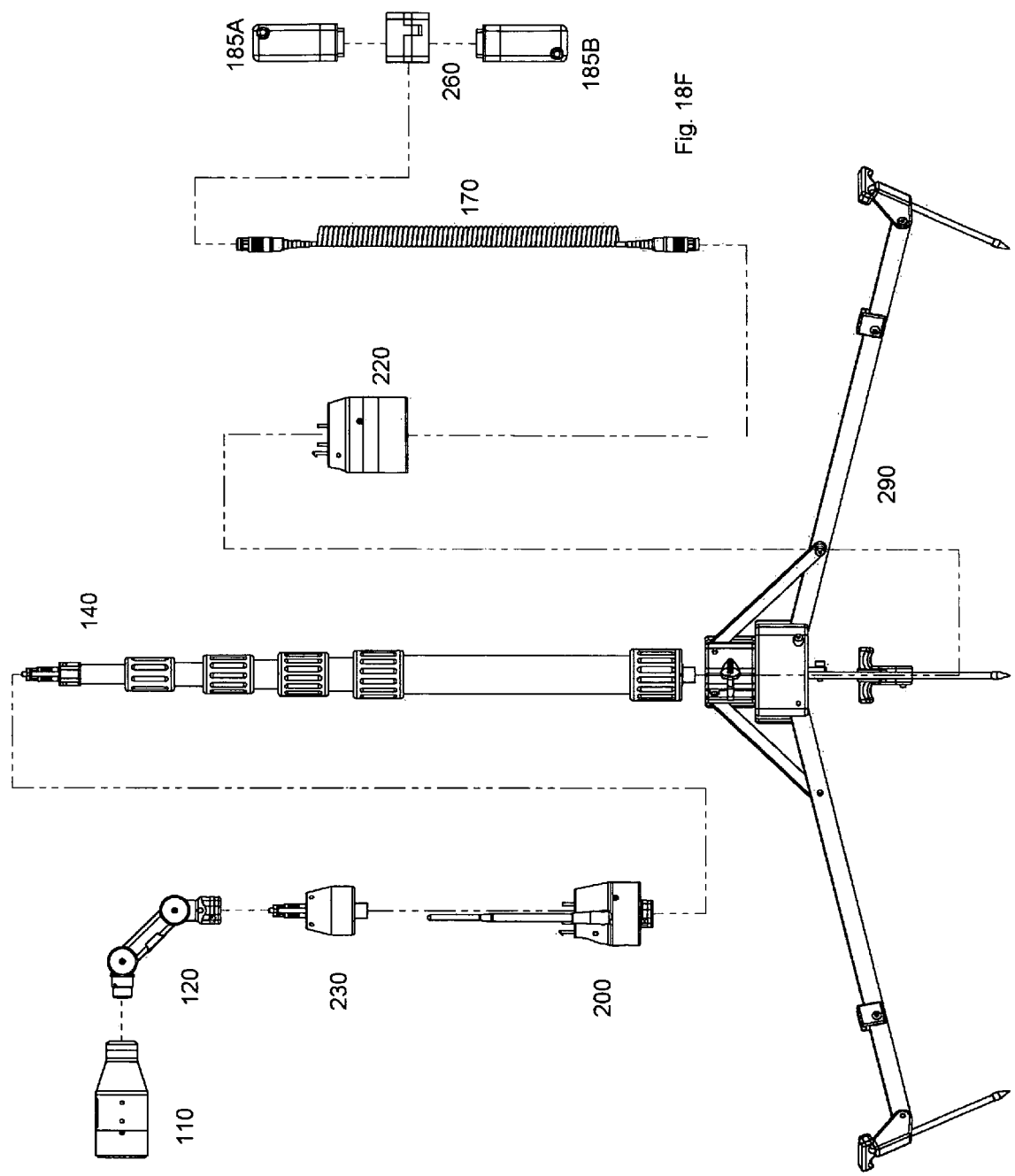

FIG. 18F shows camera module 110 connected to articulating module 120 connected to first interface module 230 connected to wireless transmitter 200 connected to extension pole 140 supported by tripod 290. Extension pole 140 is connected to compact battery 220 connected to cord 170 connected to dual power module 260 that is connected to two instances of battery 185. This configuration is useful as described above, with the added benefit of free-standing operation.

Figure 18G:
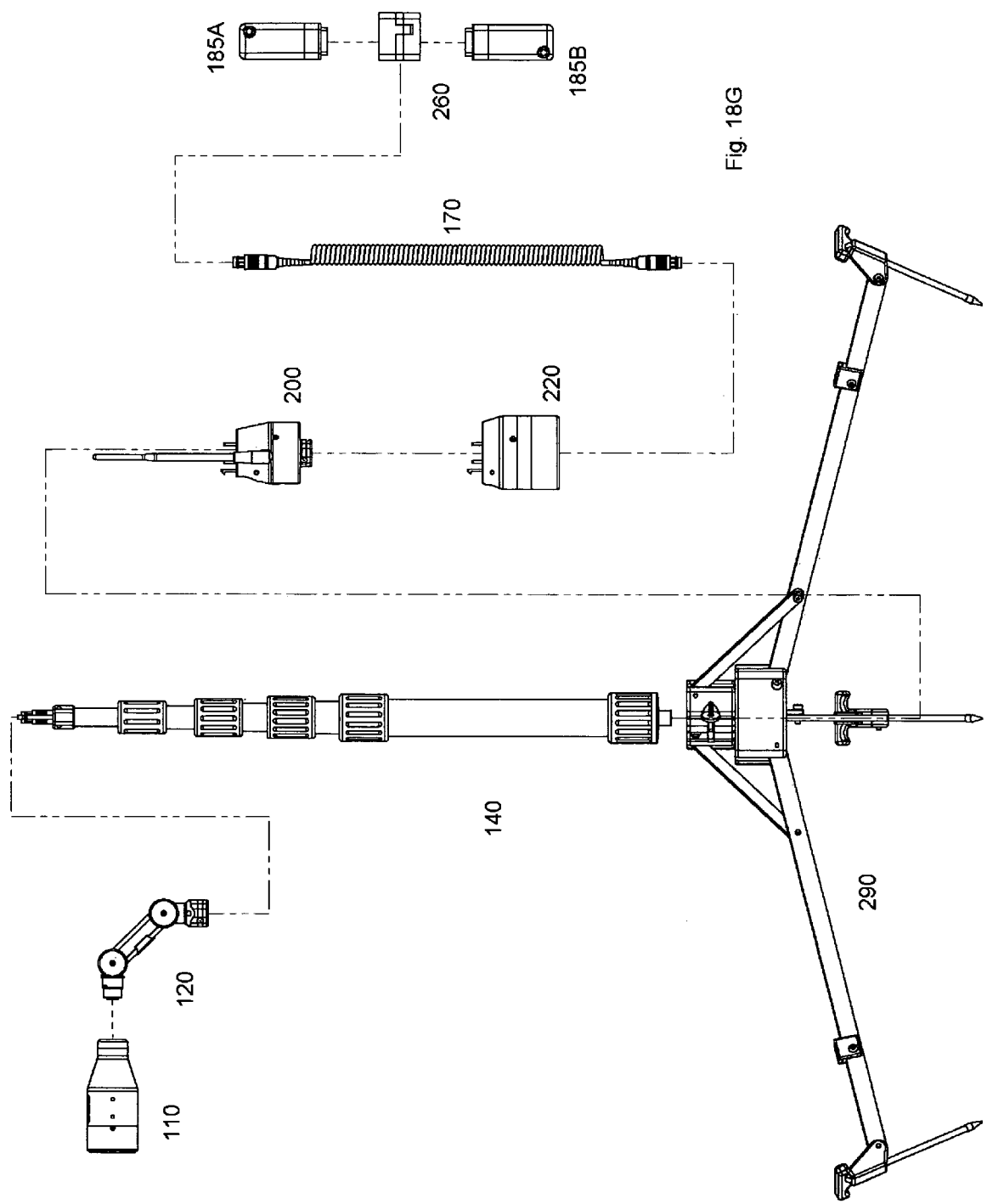

FIG. 18G shows camera module 110 connected to articulating module 120 connected to extension pole 140 supported by tripod 290. Extension pole 140 is connected to wireless transmitter 200 that is connected to compact battery 220 connected to cord 170 connected to dual power module 260 that is connected to two instances of battery 185. This configuration is useful as described above, but the transmitter is more optimally placed at the base of the pole/tripod assembly.

Figure 18H:
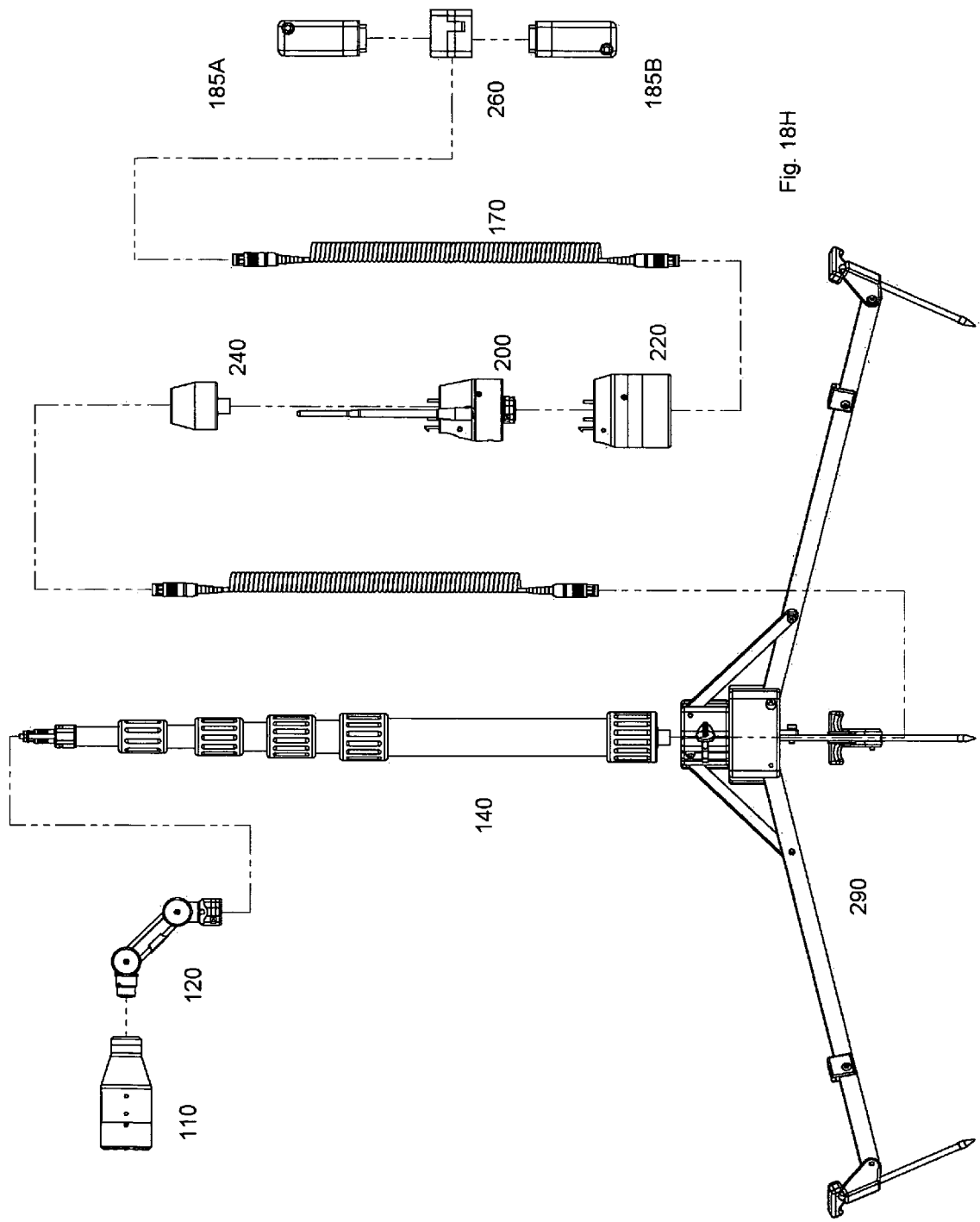

FIG. 18H shows camera module 110 connected to articulating module 120 connected to extension pole 140 supported by tripod 290. Extension pole 140 is connected to a first instance of cord 170 connected to second interface module 240 connected to wireless transmitter 200 that is connected to compact battery 220 connected to a second instance of cord 170 connected to dual power module 260 that is connected to two instances of battery 185. This configuration is useful as described above, but allows pole/camera assembly to be free-standing.

Figure 18I:
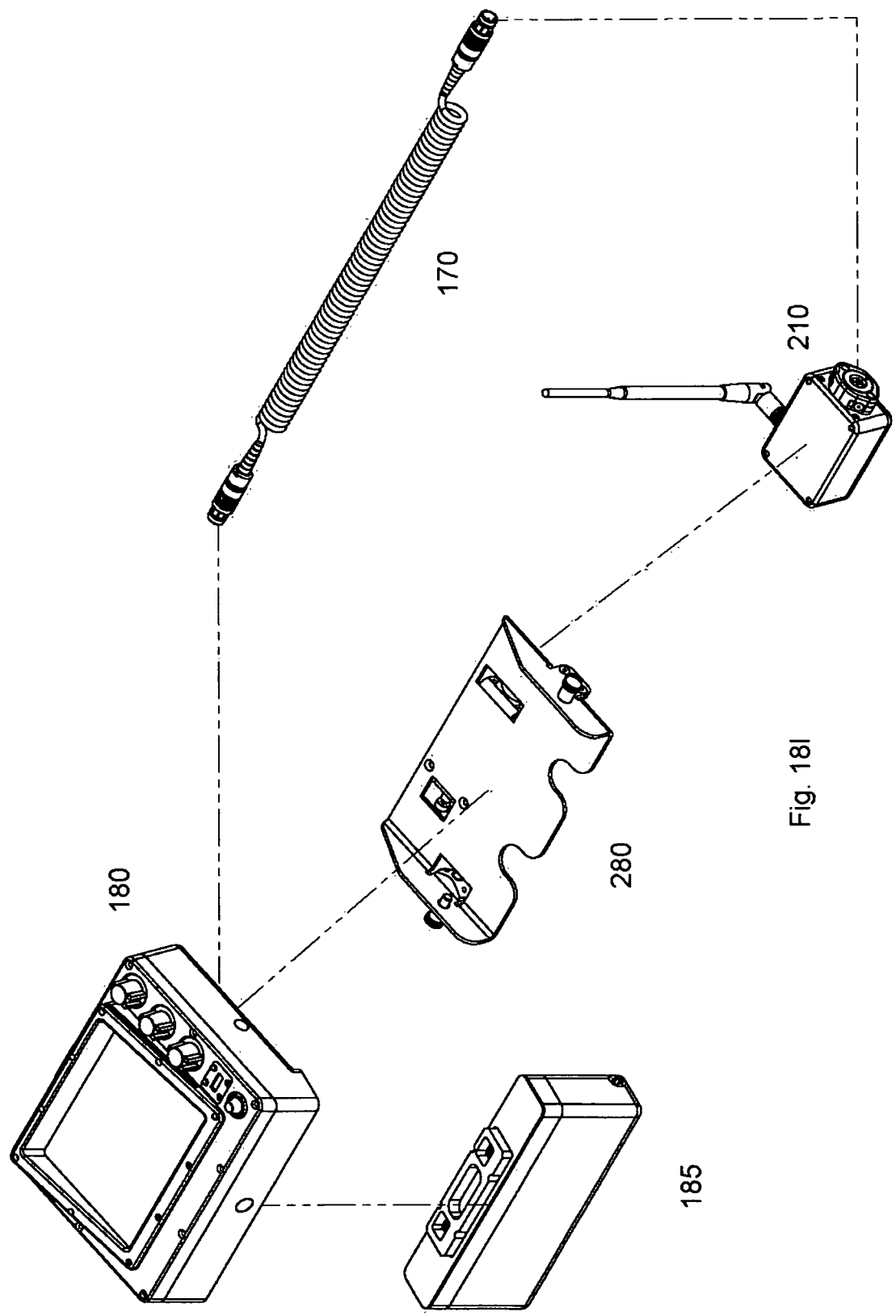
Figure 18J:
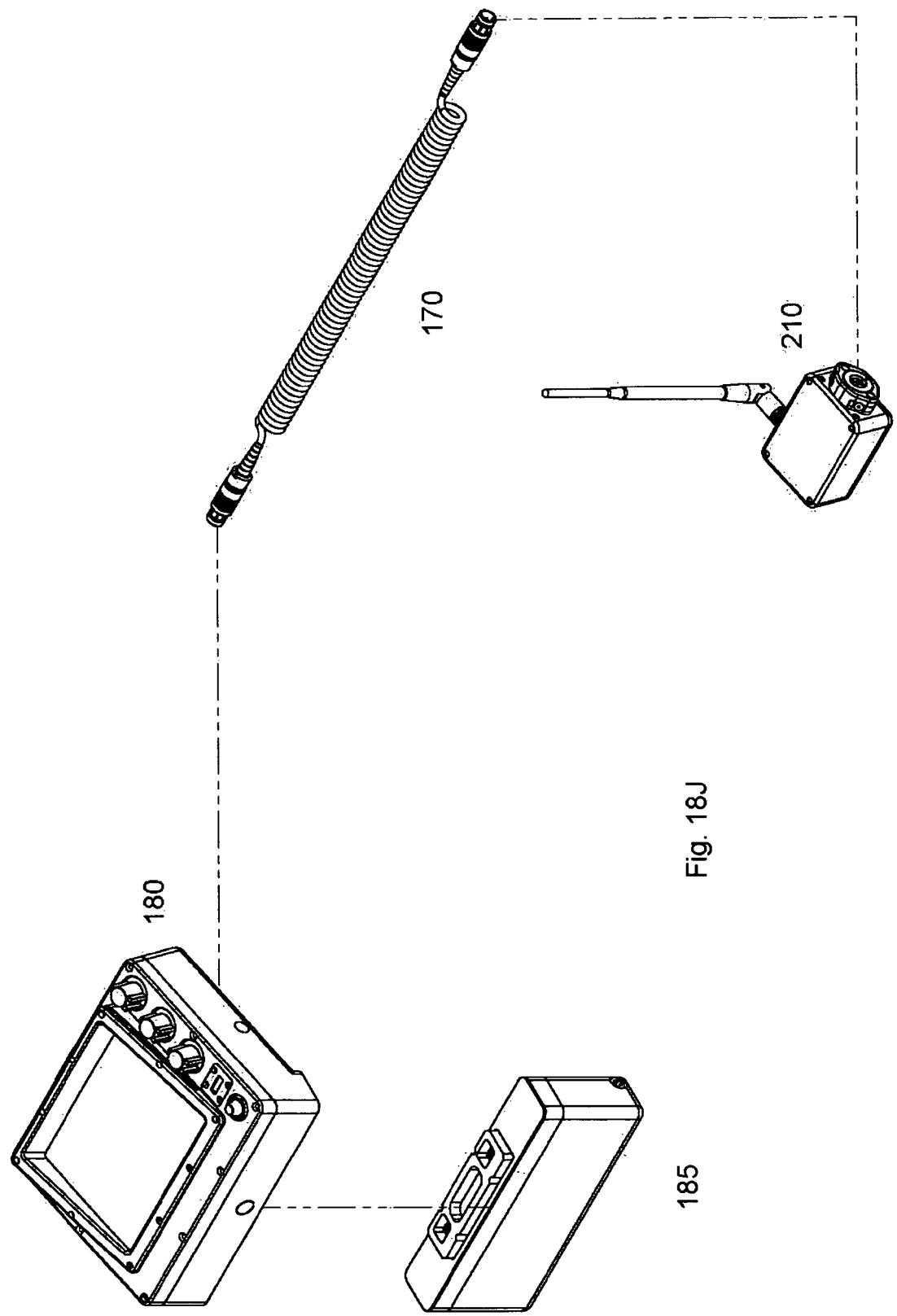

FIGS. 18I-18K are block diagrams showing the components of FIGS. 3A-3I and 11A-11I arranged in exemplary receive configurations.

FIG. 18I shows display 180 connected to battery 185, to display accessory tray 280 and to cord 170. Display accessory tray 280 supports wireless receiver module 210 that is connected to display 180. This configuration is a chest mounted self-contained receiver assembly for body mounting.

FIG. 18J shows display 180 connected to battery 185 and to cord 170 that is connected to wireless receiver module 210. This configuration is useful if optimized reception is required. This configuration allows the user to helmet mount the receiver in body mount configurations, and further allows placement of the receiver on the outside of a vehicle.

FIG. 18K shows display 180 connected to battery 185 and to cord 170 that is connected to the bottom of extension pole 140 supported by tripod 290. The top of extension pole 140 is connected to wireless receiver module 210. This configuration allows use of an extension pole as a radio mast to optimize reception, and also allows the user to maintain cover in situations where enemy fire may pose a danger.

FIGS. 19A-19H are diagrams referenced in explaining a spring-loaded locking mechanism, used as a secondary interlocking mechanism.

FIG. 19A shows piece 300 about to connect to improved articulating module 320. Piece 300 may be the top of extension pole 140 or the top of first interface module 230.

Piece 300 has electrical interface 301 between alignment pins 305A, 305B, having respective radial channel 306A, 306B at their remote ends.

Improved articulating module 320 has a face with electrical interface 321 between alignment pin receptacles 325A, 325B. U-shaped collar 350 is shown in exploded form; and spring 340 that fits between U-shaped collar 350 and improved articulating module 320 is also shown in exploded form. Hole 345 surrounds an outer edge of U-shaped collar 350 when U-shaped collar 350 is inserted in improved articulating module 320.

Figure 19B:
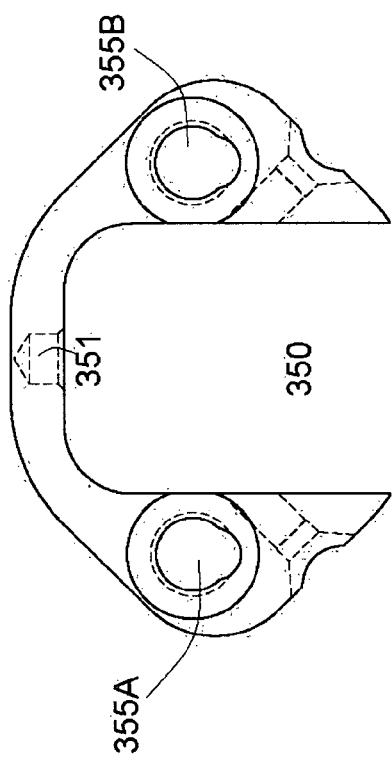

FIG. 19B shows a planar front view of U-shaped collar 350, that has "house-shaped" indentation 351 for receiving spring 340, and also has eccentrically shaped holes 355A, 355B that are beveled. The bottom of holes 355A, 355B has a half-moon shaped portion.

Figure 19C:
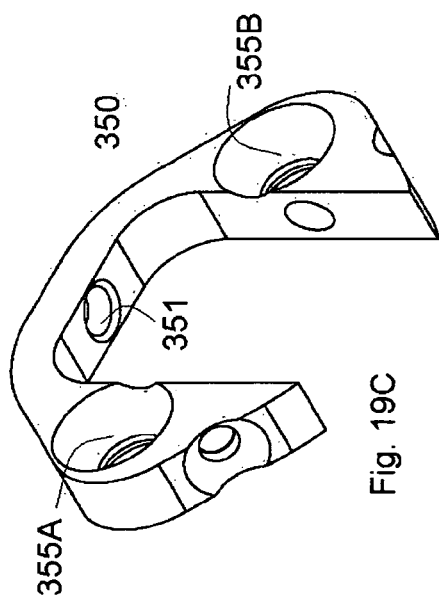

FIG. 19C shows a three-dimensional perspective view of U-shaped collar.

FIG. 19D shows the face of improved articulating module 320 when alignment pins 305A, 305B are first inserted. The beveling around eccentrically shaped holes 355A, 355B causes U-shaped collar 350 to move out of the way of alignment pins 305A, 305B when they are first inserted. The half-moon shaped portion at the bottom of holes 355A, 355B is visible. Spring 340 is compressed.

FIG. 19E shows the face of improved articulating module 320 when alignment pins 305A, 305B are seated. Spring 340 has expanded, exerting a force on U-shaped collar 350 so that it moves away from alignment pins 305A, 305B, thus securing the radial channels at the remote ends of alignment pins 305A, 305B in the half-moon shaped portions of eccentrically shaped holes 355A, 355B.

Figure 19F:
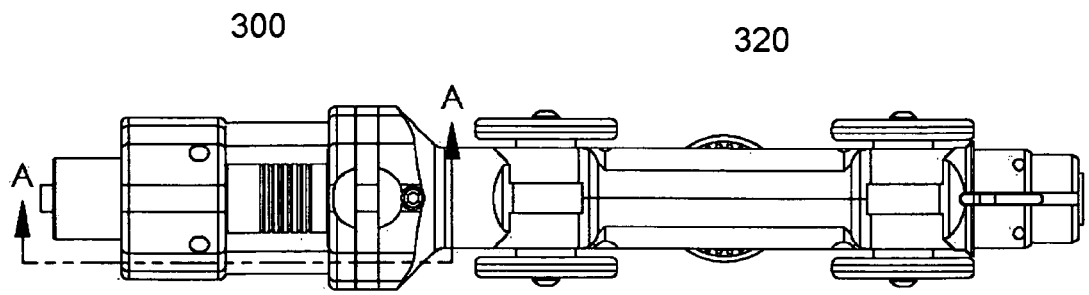

FIG. 19F shows piece 300 inserted into improved articulating module 320.

Figure 19H:
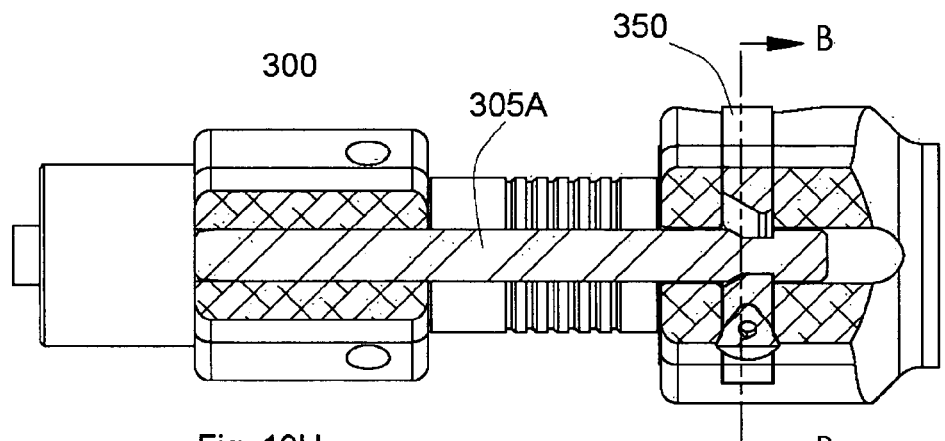
Figure 19G:
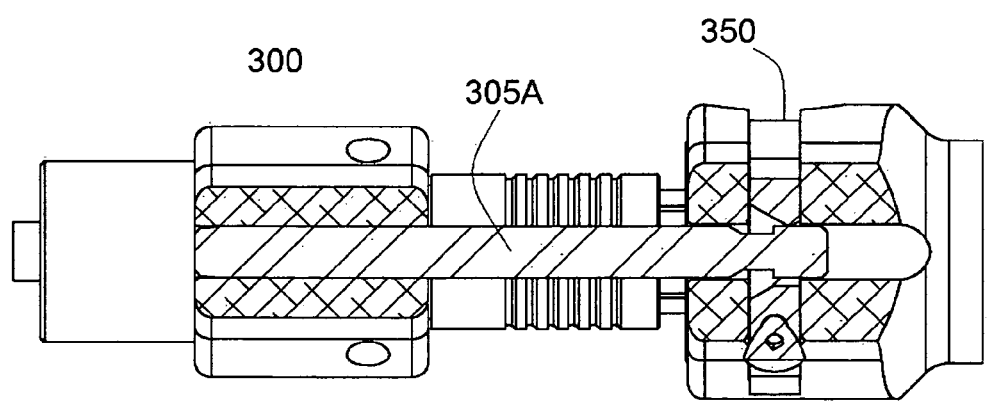

FIG. 19G shows a detail view of piece 300 when it is first inserted into articulating module 320, corresponding to FIG. 19D. U-shaped collar 350 is seen to be pushed in from the perimeter of improved articulating module 320.

FIG. 19H shows a detail view of piece 300 when it is seated in articulating module 320, corresponding to FIG. 19E. U-shaped collar 350 is seen to be pushed outwards so that its edge is flush with the edge of improved articulating module 320.

To remove piece 300 from improved articulating module 320, the user presses inwards on an edge of U-shaped collar 350 visible in hole 345, allowing alignment pins 305A, 305B to be easily slid out of alignment pin receptacles 325A, 325B.

The primary interlocking mechanism of electrical interface connectors used in piece 300 and improved articulating module 320 is prone to breakage over time when the electrical interface connectors are improperly used. That is, proper usage involves pulling back an outer collar on the male connector before pulling apart the electrical interfaces. Improper usage involves just pushing together or pulling apart the electrical connectors without pulling back the outer collar on the male connector. The secondary interlock mechanism provided by U-shaped collar 350 interacting with alignment pins 305A, 305B ensures a solid connection even when the primary interlock of electrical connectors 301, 321 does not function properly due to wear from improper usage.

Advantageously, piece 300 is easy to insert and easy to deliberately remove, but difficult to accidentally remove.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:
1. A modular imaging system, comprising:
a camera module having a camera for generating a baseband video signal representing an image picked up by the camera, and an electrical interface for providing the generated baseband video signal;
a wireless transmitter module being devoid of a display, being devoid of a camera, being unable to connect directly to the camera module, and having
(i) a first electrical interface for receiving the generated baseband video signal, the first electrical interface being between a first male mechanical interface having two pins disposed around the first electrical interface, the first electrical interface also being between a second male mechanical interface having two double-pins disposed around the first electrical interface,
(ii) a conversion circuit for converting the baseband video signal to a high frequency signal, and
(iii) a second electrical interface for providing the high frequency signal, the second electrical interface being between a first female mechanical interface having two pin receptacles disposed around the second electrical interface, the second electrical interface also being between a second female mechanical interface having two double-pin receptacles disposed around the second electrical interface;
an antenna module for transmitting the high frequency signal;
a wireless receiver module having
(a) an antenna for receiving the transmitted high frequency signal,
(b) a conversion circuit for converting the transmitted high frequency signal to a received baseband signal,
(c) an electrical interface for providing the received baseband video signal; and
a display module having an electrical interface for receiving the received baseband signal, and a display for displaying the received baseband signal;
a first interface component having
(1) a first electrical interface between a male mechanical interface having two pins disposed around the first electrical interface, and
(2) a second electrical interface between a female mechanical interface having two double-pin receptacles disposed around the second electrical interface,
the first and second electrical interfaces of the first interface component being electrically connected;

a second interface component having
(A) a first electrical interface, and
(B) a second electrical interface between a female mechanical interface having two double-pin receptacles disposed around the second electrical interface, the first and second electrical interfaces of the second interface component being electrically connected;
wherein the first and second interface components are each for coupling between the wireless transmitter module and a module chosen from the set comprising an articulating module and a cord module.

2. The modular imaging system of claim 1, wherein each of at least two of the electrical interfaces further includes a secondary interlock mechanism, comprising:
a U-shaped collar having eccentrically shaped holes and a depression for receiving a spring, and
a module having alignment pin receptacles for receiving alignment pins having radial channels, and having the U-shaped collar inserted into the module and the spring so that the eccentrically shaped holes engage with the radial channels on the alignment pins to restrain the alignment pins from moving due to the force exerted on the U-shaped collar from the spring.

3. The modular imaging system of claim 1, wherein the camera is one of a compact active near infrared (NIR) camera, a high performance active NIR camera, an image intensified NIR camera, a color camera, an under-door viewer, an endoscope camera, and a thermal camera.

4. The modular imaging system of claim 1, wherein the display in the display module is one of a flat panel display and a head-mounted display.

5. The modular imaging system of claim 1, wherein the display module further includes harness connectors on opposite sides of the display.

6. The modular imaging system of claim 1, wherein the electrical connector includes an analog video element, a power element and a ground element.

7. The modular imaging system of claim 6, wherein the electrical connector includes two additional elements, and the five elements of the electrical connector are arranged in a quincunx pattern.

8. The modular imaging system of claim 1, wherein each of the two mechanical interfaces surrounding the first electrical interface is a pin, and
each of the two mechanical interfaces surrounding the second electrical interface is a receptacle.

9. The modular imaging system of claim 1, wherein the wireless transmitter module includes an encryption circuit for converting the baseband video signal to an encrypted baseband video signal, and the wireless receiver module includes a decryption circuit for converting the received baseband video signal to a decrypted baseband video signal.

10. The modular imaging system of claim 1, wherein the wireless transmitter module includes a channel selector for selecting the operating frequency of the conversion circuit of the wireless transmitter module.

11. The modular imaging system of claim 1, wherein the wireless receiver module includes a channel selector for selecting the operating frequency of the conversion circuit of the wireless receiver module.

12. The modular imaging system of claim 1, further comprising a pistol grip module for connecting to the camera, the pistol grip module having
a first electrical interface,
a grip section, and a second electrical interface having an electrical connector and two mechanical connectors arranged on opposite sides of the electrical connector.

13. The modular imaging system of claim 1, further comprising an extension pole module having
a first electrical interface,
a pole, and
a second electrical interface,
the extension pole module for connecting to one of the wireless transmitter module, the wireless receiver module, an articulating module, a cord module, an interface module and a battery module,
wherein each of the first and second electrical interfaces of the extension pole module has an electrical connector and two mechanical connectors arranged on opposite sides of the electrical connector.

14. The modular imaging system of claim 13, wherein the pole is made of carbon fiber composite.

15. The modular imaging system of claim 13, wherein the pole is a folding pole.

16. The modular imaging system of claim 13, further comprising a tripod for supporting the pole in a vertical direction.

17. The modular imaging system of claim 13, wherein at least one end of the pole further includes a secondary interlock mechanism.

18. The modular imaging system of claim 13, wherein the pole comprises a plurality of component poles of increasing circumference, so that when retracted they have a concentric arrangement, and when extended they are held in place by a twist lock collar devoid of threads.

19. The modular imaging system of claim 1, further comprising a cord module having
a first electrical interface,
a cord, and
a second electrical interface,
the cord module for connecting to one of the wireless receiver module, the display module, an articulating module, an interface module, a battery module, and an extension pole module.

20. The modular imaging system of claim 1, further comprising a battery module for connecting to one of the wireless transmitter module and the display module, the battery module having
an electrical interface, and
a battery,
wherein the electrical interface of the battery module has an electrical connector and two mechanical connectors arranged on opposite sides of the electrical connector.

21. The modular imaging system of claim 20, further comprising
a second battery module having a second electrical interface and a second battery, and
a dual battery connector having a third electrical interface, a fourth electrical interface, and a fifth electrical interface, wherein each of the second, third, fourth and fifth electrical interfaces has an electrical connector and two mechanical connectors arranged on opposite sides of the electrical connector.

22. The modular imaging system of claim 1, further comprising an articulating module for connecting to one of the camera module and the wireless transmitter module, the articulating module comprising:
a first electrical interface,
a first pole,
a first hinge,
a second pole,
a second hinge,
a third pole,
a second electrical interface, the first electrical interface of the articulating module being connected to the first pole that is connected to the first hinge that is connected to the second pole that is connected to the second hinge that is connected to the third pole that is connected to the second electrical interface of the articulating module.

23. The modular imaging system of claim 22, wherein the articulating module includes a motorized remote control.

24. The modular imaging system of claim 22, wherein the first, second and third short poles are made of carbon fiber composite.

25. The modular imaging system of claim 22, further comprising an interface module connected to each of the articulating module and the wireless transmitter module.

26. The modular imaging system of claim 25, further comprising a battery module that is connected to the wireless transmitter module.

27. The modular imaging system of claim 22, further comprising a first cord module, a second cord module, a first interface module, a second interface module, a dual battery connector, a first battery, and a second battery,
wherein
the camera module is connected to the articulating module,
the articulating module is also connected to the cord module,
the cord module is also connected to the first interface module,
the first interface module is also connected to the wireless transmitter module,
the wireless transmitter module is also connected to the second interface module,
the second interface module is also connected to the second cord module,
the second cord module is also connected to the dual battery interface module, and
the dual battery interface module is also connected to the first and second battery modules.

28. The modular imaging system of claim 22, further comprising a first interface module, an extension pole, a second interface module, a cord module, a dual battery connector, a first battery, and a second battery,
wherein
the camera module is connected to the articulating module,
the articulating module is also connected to the first interface module,
the first interface module is also connected to the wireless transmitter module,
the wireless transmitter module is also connected to the extension pole module,
the extension pole module is also connected to the second interface module,
the second interface module is also connected to the cord module,
the cord module is also connected to the dual battery interface module, and
the dual battery interface module is also connected to the first and second battery modules.

29. The modular imaging system of claim 22, further comprising an extension pole, a first interface module, a cord module, a dual battery connector, a first battery, and a second battery,
wherein
the camera module is connected to the articulating module,
the articulating module is also connected to the extension pole module,
the extension pole module is also connected to the wireless transmitter module,
the wireless transmitter module is also connected to the first interface module,
the first interface module is also connected to the cord module,
the cord module is also connected to the dual battery interface module, and
the dual battery interface module is also connected to the first and second battery modules.

30. The modular imaging system of claim 22, further comprising an extension pole, a first cord module, a second cord module, a first interface module, a second interface module, a dual battery connector, a first battery, and a second battery,
wherein
the camera module is connected to the articulating module,
the articulating module is also connected to the extension pole module,
the extension pole module is also connected to the first cord module,
the first cord module is also connected to the first interface module,
the first interface module is also connected to the wireless transmitter module,
the wireless transmitter module is also connected to the second interface module,
the second interface module is also connected to the second cord module,
the second cord module is also connected to the dual battery interface module, and
the dual battery interface module is also connected to the first and second battery modules.

31. The modular imaging system of claim 22, further comprising a first interface module, an extension pole module, a tripod, a second interface module, a cord module, a dual battery connector, a first battery, and a second battery,
wherein
the camera module is connected to the articulating module,
the articulating module is also connected to the first interface module,
the first interface module is also connected to the wireless transmitter module,
the wireless transmitter module is also connected to the extension pole module,
the extension pole module is also connected to the tripod and the second interface module,
the second interface module is also connected to the second cord module,
the second cord module is also connected to the dual battery interface module, and
the dual battery interface module is also connected to the first and second battery modules.

32. The modular imaging system of claim 22, further comprising an extension pole module, a tripod, a first interface module, a cord module, a dual battery connector, a first battery, and a second battery,
wherein
the camera module is connected to the articulating module,
the articulating module is also connected to the extension pole module,
the extension pole module is also connected to the tripod and the wireless transmitter module,
the wireless transmitter module is also connected to the first interface module,
the first interface module is also connected to the cord module,
the cord module is also connected to the dual battery interface module, and the dual battery interface module is also connected to the first and second battery modules.

33. The modular imaging system of claim 22, further comprising an extension pole module, a tripod, a first cord module, a second cord module, a first interface module, a second interface module, a dual battery connector, a first battery, and a second battery,
wherein
the camera module is connected to the articulating module,
the articulating module is also connected to the extension pole module,
the extension pole module is also connected to the tripod and the first cord module,
the first cord module is also connected to the first interface module,
the first interface module is also connected to the wireless transmitter module,
the wireless transmitter module is also connected to the second interface module,
the second interface module is also connected to the second cord module,
the second cord module is also connected to the dual battery interface module, and
the dual battery interface module is also connected to the first and second battery modules.

34. The modular imaging system of claim 22, further comprising a battery module and a cord module,
wherein
the wireless receiver module is connected to the cord module,
the cord module is also connected to the display module, and
the display module is also connected to the battery module.

35. The modular imaging system of claim 34, further comprising a display accessory tray, wherein
the display accessory tray is connected to the display module and to the wireless receiver module.

36. The modular imaging system of claim 22, further comprising an extension pole module, a tripod, a cord module, a battery module,
wherein
the wireless receiver module is connected to the extension pole module,
the extension pole module is also connected to the tripod and the cord module,
the cord module is also connected to the display module, and
the display module is also connected to the battery module.

* * * * *